(12) United States Patent
Tse et al.

(10) Patent No.: US 8,513,347 B2
(45) Date of Patent: *Aug. 20, 2013

(54) ELASTOMERIC COMPOSITIONS

(75) Inventors: Mun Fu Tse, Seabrook, TX (US); Thottinal Abraham Mathew, Houston, TX (US); Feng Li, Katy, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 942 days.

This patent is subject to a terminal disclaimer.

(21) Appl. No.: 11/482,283

(22) Filed: Jul. 7, 2006

(65) Prior Publication Data

US 2007/0021560 A1    Jan. 25, 2007

Related U.S. Application Data

(60) Provisional application No. 60/699,718, filed on Jul. 15, 2005.

(51) Int. Cl.
| | |
|---|---|
| *C08K 5/01* | (2006.01) |
| *C08L 53/02* | (2006.01) |
| *C08L 23/04* | (2006.01) |
| *C08L 23/10* | (2006.01) |

(52) U.S. Cl.
USPC .............. 524/474; 524/490; 524/491; 525/98

(58) Field of Classification Search
USPC ............................. 525/98; 524/474, 490, 491
See application file for complete search history.

(56) References Cited

U.S. PATENT DOCUMENTS

| | | |
|---|---|---|
| 2,567,016 A | 1/1952 | Gessler et al. |
| 2,817,693 A | 12/1957 | Koome et al. |
| 3,149,178 A | 9/1964 | Hamilton et al. |
| 3,201,364 A | 8/1965 | Salyer |
| 3,228,896 A | 1/1966 | Canterino |
| 3,235,529 A | 2/1966 | Nagle |
| 3,239,478 A | 3/1966 | Harlan, Jr. |
| 3,262,992 A | 7/1966 | Holzer et al. |
| 3,281,390 A | 10/1966 | O'Leary, Jr. |
| 3,299,568 A | 1/1967 | Tobolsky |
| 3,308,086 A | 3/1967 | Wartman |
| 3,318,835 A | 5/1967 | Hagemeyer, Jr. et al. |
| 3,338,778 A | 8/1967 | Hutchins et al. |
| 3,361,702 A | 1/1968 | Wartman et al. |
| 3,378,606 A | 4/1968 | Kontos |
| 3,415,925 A | 12/1968 | Marans |
| 3,437,627 A | 4/1969 | Gude et al. |
| 3,439,088 A | 4/1969 | Edman |
| 3,464,949 A | 9/1969 | Wartman et al. |
| 3,475,368 A | 10/1969 | Metz |
| 3,536,796 A | 10/1970 | Rock |
| 3,541,039 A | 11/1970 | Whiton |
| 3,551,943 A | 1/1971 | Staton et al. |
| 3,563,934 A | 2/1971 | Burnett |
| 3,590,528 A | 7/1971 | Shepherd |
| 3,601,370 A | 8/1971 | Ruettener et al. |
| 3,686,385 A | 8/1972 | Rohn |
| 3,752,779 A | 8/1973 | Maciejewski |
| 3,818,105 A | 6/1974 | Coopersmith et al. |
| 3,821,148 A | 6/1974 | Makowski et al. |
| 3,828,105 A | 8/1974 | Saurano et al. |
| 3,839,261 A | 10/1974 | Aronoff et al. |
| 3,853,969 A | 12/1974 | Kontos |
| 3,860,543 A | 1/1975 | Masuda et al. |
| 3,882,197 A | 5/1975 | Fritz et al. |
| 3,888,949 A | 6/1975 | Shih |
| 3,894,120 A | 7/1975 | Frese et al. |
| 3,925,504 A | 12/1975 | Koleske et al. |
| 3,925,947 A | 12/1975 | Meyers et al. |
| 3,935,344 A | 1/1976 | Haggerty et al. |
| 3,945,975 A | 3/1976 | Strack |
| 3,957,898 A | 5/1976 | Girotti et al. |
| 3,988,276 A | 10/1976 | Kutch et al. |
| 3,999,707 A | 12/1976 | Nielson |
| 4,006,115 A | 2/1977 | Elbert |
| 4,010,127 A | 3/1977 | Taka et al. |

(Continued)

FOREIGN PATENT DOCUMENTS

| | | |
|---|---|---|
| CS | 215313 | 8/1982 |
| DE | 1961981 | 7/1970 |

(Continued)

OTHER PUBLICATIONS

Jens Stehr, Investigation of the Effects of Poly(α-olefin) Plasticizers on the Properties of Elastomers, KGK, Jan./Feb. 2007, pp. 14-19 (translated from German by McElroy Translation Company.
U.S. Appl. No. 60/649,107.
U.S. Appl. No. 60/649,264.
U.S. Appl. No. 61/203,523.
U.S. Appl. No. 61/203,524.
U.S. Appl. No. 12/012,380.
U.S. Appl. No. 12/108,312.
U.S. Appl. No. 12/492,747.
U.S. Appl. No. 12/581,334.
U.S. Appl. No. 12/653,742.
U.S. Appl. No. 12/653,743.
U.S. Appl. No. 12/693,287.
U.S. Appl. No. 12/705,835.
U.S. Appl. No. 12/722,292.
Fink et al., Ed., Ziegler Catalysts—Recent Scientific Innovations and Technological Improvements, Springer-Verlag, Berlin Heidelberg, 1995.
Chemical Additives for Plastics Industry 107-116 (Radian Corp., Noyes Data Corporation, NJ 1987).
Concise Encyclopedia of Polymer Science and Engineering 90-92 (Jacqueline I. Kroschwitz, ed., John Wiley & sons 1990).
CRC Handbook of Chemistry and Physics (David R. Lide, ed. 60th ed.) 1986, p. E-60.

(Continued)

*Primary Examiner* — Jeffrey Mullis
(74) *Attorney, Agent, or Firm* — Nancy T. Krawczyk; Kevin M. Faulkner; Leandro Arechederra, III

(57) ABSTRACT

This invention relates a composition comprising:
(i) at least one low molecular weight polyolefin;
(ii) a block copolymer obtainable by selectively hydrogenating a block copolymer having terminal polymeric blocks of a vinyl aromatic monomer and a mid-block prepared originally with an olefin and subsequently hydrogenated; and
(iii) polypropylene;
(iv) with the proviso that when (i) is a PAO having a molecular weight of between about 400 and 1000 g/mole, either:
(a) (iii) is a homopolymer characterized by an MFR greater than 2 g/10 min,
(b) (iii) is a copolymer; or
(c) (iii) is a polymer or copolymer made by a metallocene catalyst; or
(d) the composition does not contain calcium carbonate.

37 Claims, No Drawings

(56) References Cited

U.S. PATENT DOCUMENTS

| | | |
|---|---|---|
| 4,016,118 A | 4/1977 | Hamada et al. |
| 4,038,237 A | 7/1977 | Snyder |
| 4,038,238 A | 7/1977 | Cravens |
| 4,041,002 A | 8/1977 | Aboshi et al. |
| 4,041,103 A * | 8/1977 | Davison et al. ............ 525/92 B |
| 4,061,805 A | 12/1977 | Thompson et al. |
| 4,063,002 A | 12/1977 | Wilson, Jr. |
| 4,073,782 A | 2/1978 | Kishi et al. |
| 4,087,505 A | 5/1978 | Sugimoto et al. |
| 4,092,282 A | 5/1978 | Callan |
| 4,094,850 A | 6/1978 | Morgan et al. |
| 4,097,543 A | 6/1978 | Haag et al. |
| 4,104,216 A | 8/1978 | Clampitt |
| 4,110,185 A | 8/1978 | Williams et al. |
| 4,113,802 A | 9/1978 | Matteoli et al. |
| 4,118,359 A | 10/1978 | Brenner |
| 4,118,362 A | 10/1978 | Makowski et al. |
| 4,131,587 A | 12/1978 | Brenner |
| 4,132,698 A | 1/1979 | Gessler et al. |
| 4,136,072 A | 1/1979 | Ladish et al. |
| 4,138,378 A | 2/1979 | Doss |
| 4,147,831 A | 4/1979 | Balinth |
| 4,153,582 A | 5/1979 | Puffr et al. |
| 4,153,588 A | 5/1979 | Makowski et al. |
| 4,153,594 A | 5/1979 | Wilson, Jr. |
| 4,154,244 A | 5/1979 | Becker et al. |
| 4,154,712 A | 5/1979 | Lee, Jr. |
| 4,157,992 A | 6/1979 | Lundberg et al. |
| 4,166,057 A | 8/1979 | Takemori |
| 4,169,822 A | 10/1979 | Kutch et al. |
| 4,170,586 A | 10/1979 | Clampitt et al. |
| 4,175,069 A | 11/1979 | Brenner |
| 4,189,411 A | 2/1980 | Haaf |
| 4,206,101 A | 6/1980 | Wysong |
| 4,207,373 A | 6/1980 | Segal |
| 4,210,570 A | 7/1980 | Trotter et al. |
| 4,221,887 A | 9/1980 | Brenner et al. |
| 4,229,337 A | 10/1980 | Brenner |
| 4,237,083 A | 12/1980 | Young et al. |
| 4,274,932 A | 6/1981 | Williams et al. |
| 4,288,358 A | 9/1981 | Trotter et al. |
| 4,288,480 A | 9/1981 | Grzywinski et al. |
| 4,289,668 A | 9/1981 | Li |
| 4,304,713 A | 12/1981 | Perelman |
| 4,311,628 A | 1/1982 | Abdou-Sabet et al. |
| 4,321,334 A | 3/1982 | Chatterjee |
| 4,322,336 A | 3/1982 | Machurat et al. |
| 4,325,850 A | 4/1982 | Mueller |
| 4,327,007 A | 4/1982 | Vanderkooi, Jr. et al. |
| 4,335,026 A | 6/1982 | Balinth |
| 4,335,034 A | 6/1982 | Zuckerman et al. |
| 4,340,513 A | 7/1982 | Moteki et al. |
| 4,347,332 A | 8/1982 | Odorzynski et al. |
| 4,352,823 A | 10/1982 | Cherukuri et al. |
| 4,358,384 A | 11/1982 | Newcomb |
| 4,369,284 A | 1/1983 | Chen |
| 4,379,169 A | 4/1983 | Reggio et al. |
| 4,387,108 A | 6/1983 | Koch et al. |
| 4,399,248 A | 8/1983 | Singh et al. |
| 4,399,251 A | 8/1983 | Lee |
| 4,403,005 A | 9/1983 | Nevins et al. |
| 4,403,007 A | 9/1983 | Coughlin |
| 4,409,345 A | 10/1983 | Moteki et al. |
| 4,430,289 A | 2/1984 | McKinney et al. |
| 4,434,258 A | 2/1984 | Schumacher et al. |
| 4,438,228 A | 3/1984 | Schenck |
| 4,438,229 A | 3/1984 | Fujimori et al. |
| 4,440,829 A | 4/1984 | Gerace et al. |
| 4,450,250 A | 5/1984 | McConnell et al. |
| 4,451,589 A | 5/1984 | Morman et al. |
| 4,452,820 A | 6/1984 | D'Amelia et al. |
| 4,459,311 A | 7/1984 | DeTora et al. |
| 4,460,729 A | 7/1984 | Books |
| 4,461,872 A | 7/1984 | Su |
| 4,467,010 A | 8/1984 | Shii et al. |
| 4,467,065 A | 8/1984 | Williams et al. |
| 4,469,770 A | 9/1984 | Nelson |
| 4,483,886 A | 11/1984 | Kowalski |
| 4,483,952 A | 11/1984 | Uchiyama |
| 4,497,926 A | 2/1985 | Toy |
| 4,504,604 A | 3/1985 | Pilkington et al. |
| 4,518,615 A | 5/1985 | Cherukuri et al. |
| 4,529,666 A | 7/1985 | Salzburg et al. |
| 4,532,305 A | 7/1985 | Dickinson |
| 4,536,537 A | 8/1985 | Klingensmith et al. |
| 4,542,053 A | 9/1985 | Nevins et al. |
| 4,542,122 A | 9/1985 | Payne et al. |
| 4,551,507 A | 11/1985 | Haylock et al. |
| 4,552,801 A | 11/1985 | Odorzynski et al. |
| 4,568,663 A | 2/1986 | Mauldin |
| 4,579,901 A | 4/1986 | Allen et al. |
| 4,584,215 A | 4/1986 | Bré et al. |
| 4,592,851 A | 6/1986 | Stadtmiller et al. |
| 4,594,172 A | 6/1986 | Sie |
| 4,604,322 A | 8/1986 | Reid |
| 4,616,052 A | 10/1986 | Habibullah |
| 4,621,072 A | 11/1986 | Aratz et al. |
| 4,645,791 A | 2/1987 | Theodore et al. |
| 4,659,757 A | 4/1987 | Okamoto et al. |
| 4,663,220 A | 5/1987 | Wisneski et al. |
| 4,663,305 A | 5/1987 | Mauldin et al. |
| 4,665,130 A | 5/1987 | Hwo |
| 4,666,959 A | 5/1987 | Weissberger et al. |
| 4,666,968 A | 5/1987 | Downey et al. |
| 4,670,341 A | 6/1987 | Lundsager |
| 4,684,682 A | 8/1987 | Lee, Jr. |
| 4,693,838 A | 9/1987 | Varma et al. |
| 4,703,078 A | 10/1987 | Machara et al. |
| 4,726,989 A | 2/1988 | Mrozinski |
| 4,745,143 A | 5/1988 | Mason et al. |
| 4,746,388 A | 5/1988 | Inaba et al. |
| 4,749,734 A | 6/1988 | Williams et al. |
| 4,764,535 A | 8/1988 | Leicht |
| 4,772,657 A | 9/1988 | Akiyama et al. |
| 4,774,277 A | 9/1988 | Janac et al. |
| 4,814,375 A | 3/1989 | Esposito |
| 4,822,688 A | 4/1989 | Nogues |
| 4,824,718 A | 4/1989 | Hwang |
| 4,824,891 A | 4/1989 | Laurent et al. |
| 4,827,064 A | 5/1989 | Wu |
| 4,827,073 A | 5/1989 | Wu |
| 4,833,172 A | 5/1989 | Schwarz et al. |
| 4,833,195 A | 5/1989 | Adur et al. |
| 4,840,988 A | 6/1989 | Nakayama et al. |
| 4,845,137 A | 7/1989 | Williams et al. |
| 4,853,428 A | 8/1989 | Theodore et al. |
| 4,857,646 A | 8/1989 | Jaffe |
| 4,863,785 A | 9/1989 | Berman et al. |
| 4,897,178 A | 1/1990 | Best et al. |
| 4,897,452 A | 1/1990 | Berrier et al. |
| 4,900,407 A | 2/1990 | Salto et al. |
| 4,904,731 A | 2/1990 | Holden et al. |
| 4,906,350 A | 3/1990 | Lucien et al. |
| 4,912,148 A | 3/1990 | Kim et al. |
| 4,914,145 A | 4/1990 | Tohdoh et al. |
| 4,919,992 A | 4/1990 | Blundell et al. |
| 4,921,594 A | 5/1990 | Miller |
| 4,921,749 A | 5/1990 | Bossaert et al. |
| 4,923,588 A | 5/1990 | Cody et al. |
| 4,937,399 A | 6/1990 | Wachter et al. |
| 4,939,040 A | 7/1990 | Oreglia et al. |
| 4,943,672 A | 7/1990 | Hamner et al. |
| 4,948,840 A | 8/1990 | Berta |
| 4,952,457 A | 8/1990 | Cartier et al. |
| 4,957,958 A | 9/1990 | Schleifstein |
| 4,959,285 A | 9/1990 | Hoffmann |
| 4,959,396 A | 9/1990 | Yankov et al. |
| 4,959,402 A | 9/1990 | Williams et al. |
| 4,960,820 A | 10/1990 | Hwo |
| 4,975,177 A | 12/1990 | Garwood et al. |
| 4,994,552 A | 2/1991 | Williams et al. |
| 4,995,884 A | 2/1991 | Ross et al. |
| 4,996,094 A | 2/1991 | Dutt |
| 5,026,756 A | 6/1991 | Arendt |

| Patent No. | Date | Name |
|---|---|---|
| 5,028,647 A | 7/1991 | Haylock et al. |
| 5,049,605 A | 9/1991 | Rekers |
| 5,075,269 A | 12/1991 | Degnan et al. |
| 5,076,988 A | 12/1991 | Rifi |
| 5,079,273 A | 1/1992 | Kuroda et al. |
| 5,079,287 A | 1/1992 | Takeshi et al. |
| 5,080,942 A | 1/1992 | Yau |
| 5,091,454 A | 2/1992 | Arendt |
| 5,093,197 A | 3/1992 | Howard et al. |
| 5,105,038 A | 4/1992 | Chen et al. |
| 5,106,447 A | 4/1992 | Di Rado et al. |
| 5,106,899 A | 4/1992 | Maresca |
| 5,114,763 A | 5/1992 | Brant et al. |
| 5,116,626 A | 5/1992 | Synosky et al. |
| 5,124,384 A | 6/1992 | Goldstein |
| 5,143,978 A | 9/1992 | Berta |
| 5,149,736 A | 9/1992 | Gamarra |
| 5,162,436 A | 11/1992 | Davis et al. |
| 5,171,628 A | 12/1992 | Arvedson et al. |
| 5,171,908 A | 12/1992 | Rudnick |
| 5,173,317 A | 12/1992 | Hartman et al. |
| 5,180,865 A | 1/1993 | Heilman et al. |
| 5,185,398 A | 2/1993 | Kehr et al. |
| 5,206,276 A | 4/1993 | Lee, Jr. |
| 5,213,744 A | 5/1993 | Bossaert |
| 5,230,843 A | 7/1993 | Howard et al. |
| 5,231,128 A | 7/1993 | Nakata et al. |
| 5,238,735 A | 8/1993 | Nagou et al. |
| 5,240,966 A | 8/1993 | Iwasaki et al. |
| 5,250,628 A | 10/1993 | Seguela et al. |
| 5,254,378 A | 10/1993 | Krueger et al. |
| 5,256,717 A | 10/1993 | Stauffer et al. |
| 5,258,419 A | 11/1993 | Rolando et al. |
| 5,264,277 A | 11/1993 | Frognet et al. |
| 5,264,474 A | 11/1993 | Schleifstein et al. |
| 5,264,493 A | 11/1993 | Palate et al. |
| 5,278,220 A | 1/1994 | Vermeire et al. |
| 5,286,500 A | 2/1994 | Synosky et al. |
| 5,290,635 A | 3/1994 | Matsumura et al. |
| 5,290,886 A | 3/1994 | Ellul |
| 5,298,561 A | 3/1994 | Cecchin et al. |
| 5,308,395 A | 5/1994 | Burditt et al. |
| 5,308,904 A | 5/1994 | Fujii et al. |
| 5,312,856 A | 5/1994 | Hert et al. |
| 5,324,580 A | 6/1994 | Allan et al. |
| 5,331,047 A | 7/1994 | Giacobbe |
| 5,340,848 A | 8/1994 | Asanuma et al. |
| 5,350,817 A | 9/1994 | Winter et al. |
| 5,356,709 A | 10/1994 | Woo et al. |
| 5,356,948 A | 10/1994 | Payne, Jr. et al. |
| 5,356,986 A | 10/1994 | Stewart et al. |
| 5,360,868 A | 11/1994 | Mosier et al. |
| 5,376,716 A | 12/1994 | Nayak et al. |
| 5,389,711 A | 2/1995 | Westbrook et al. |
| 5,397,832 A | 3/1995 | Ellul |
| 5,409,041 A | 4/1995 | Yoshida et al. |
| 5,412,020 A * | 5/1995 | Yamamoto et al. .......... 524/505 |
| 5,415,791 A | 5/1995 | Chou et al. |
| 5,424,080 A | 6/1995 | Synosky et al. |
| 5,437,877 A | 8/1995 | Synosky et al. |
| 5,442,004 A | 8/1995 | Sutherland et al. |
| 5,453,318 A | 9/1995 | Giacobbe |
| 5,459,193 A | 10/1995 | Anderson et al. |
| 5,462,754 A | 10/1995 | Synosky et al. |
| 5,462,981 A | 10/1995 | Bastioli et al. |
| 5,476,914 A | 12/1995 | Ewen et al. |
| 5,482,780 A | 1/1996 | Wilkie et al. |
| 5,489,646 A | 2/1996 | Tatman et al. |
| 5,492,943 A | 2/1996 | Stempei |
| 5,494,962 A | 2/1996 | Gauthy et al. |
| 5,504,172 A | 4/1996 | Imuta et al. |
| 5,505,773 A * | 4/1996 | Vitands et al. .............. 516/100 |
| 5,512,625 A | 4/1996 | Butterbach et al. |
| 5,548,008 A | 8/1996 | Asanuma et al. |
| 5,552,482 A | 9/1996 | Berta |
| 5,563,222 A | 10/1996 | Fukuda et al. |
| 5,569,693 A | 10/1996 | Doshi et al. |
| 5,591,817 A | 1/1997 | Asanuma et al. |
| 5,594,074 A | 1/1997 | Hwo et al. |
| 5,601,858 A | 2/1997 | Mansukhani et al. |
| 5,610,217 A | 3/1997 | Yarnell et al. |
| 5,614,297 A | 3/1997 | Velazquez |
| 5,624,627 A | 4/1997 | Yagi et al. |
| 5,624,986 A | 4/1997 | Bunnelle et al. |
| 5,652,308 A | 7/1997 | Merrill et al. |
| 5,663,230 A | 9/1997 | Haman |
| 5,681,897 A | 10/1997 | Silvis et al. |
| 5,683,634 A | 11/1997 | Fujii et al. |
| 5,683,815 A | 11/1997 | Leiss |
| 5,688,850 A | 11/1997 | Wyffels |
| 5,696,045 A | 12/1997 | Winter et al. |
| 5,698,650 A | 12/1997 | Jourdain et al. |
| 5,700,312 A | 12/1997 | Fausnight et al. |
| 5,723,217 A | 3/1998 | Stahl et al. |
| 5,726,103 A | 3/1998 | Stahl et al. |
| 5,726,239 A | 3/1998 | Maes et al. |
| 5,728,754 A | 3/1998 | Lakshmanan et al. |
| 5,728,760 A | 3/1998 | Rose et al. |
| 5,736,197 A | 4/1998 | Gaveske |
| 5,736,465 A | 4/1998 | Stahl et al. |
| 5,739,200 A | 4/1998 | Cheung et al. |
| 5,741,563 A | 4/1998 | Mehta et al. |
| 5,741,840 A | 4/1998 | Lindquist et al. |
| 5,747,573 A | 5/1998 | Ryan |
| 5,753,773 A | 5/1998 | Langhauser et al. |
| 5,763,080 A | 6/1998 | Stahl et al. |
| 5,776,589 A | 7/1998 | Mace et al. |
| 5,783,531 A | 7/1998 | Andrew et al. |
| 5,786,418 A | 7/1998 | Strelow et al. |
| 5,789,529 A | 8/1998 | Matsumura et al. |
| 5,804,630 A | 9/1998 | Heyer et al. |
| 5,834,562 A | 11/1998 | Silvestri et al. |
| 5,837,769 A | 11/1998 | Graafland et al. |
| 5,849,806 A | 12/1998 | St. Clair et al. |
| 5,869,555 A | 2/1999 | Simmons et al. |
| 5,869,560 A | 2/1999 | Kobayashi et al. |
| 5,869,562 A | 2/1999 | Lindquist et al. |
| 5,872,183 A | 2/1999 | Bonnet et al. |
| 5,891,814 A | 4/1999 | Richeson et al. |
| 5,891,946 A | 4/1999 | Nohara et al. |
| 5,906,727 A | 5/1999 | Wittenbrink et al. |
| 5,908,412 A | 6/1999 | Koczab et al. |
| 5,910,362 A | 6/1999 | Aratake et al. |
| 5,916,953 A | 6/1999 | Jacoby et al. |
| 5,916,959 A | 6/1999 | Lindquist et al. |
| 5,925,707 A | 7/1999 | Shafer et al. |
| 5,929,147 A | 7/1999 | Pierick et al. |
| 5,939,483 A | 8/1999 | Kueppers |
| 5,948,557 A | 9/1999 | Ondeck et al. |
| 5,959,006 A | 9/1999 | Pungtrakul |
| 5,968,455 A | 10/1999 | Brickley |
| 5,969,021 A | 10/1999 | Reddy et al. |
| 5,998,547 A | 12/1999 | Hohner |
| 6,001,455 A | 12/1999 | Nishio et al. |
| 6,010,588 A | 1/2000 | Stahl et al. |
| 6,013,727 A | 1/2000 | Dharmarajan et al. |
| 6,017,615 A | 1/2000 | Thakker et al. |
| 6,017,986 A | 1/2000 | Burton |
| 6,025,448 A | 2/2000 | Swindoll et al. |
| 6,027,557 A | 2/2000 | Hayner |
| 6,027,674 A | 2/2000 | Yates |
| 6,037,384 A | 3/2000 | Kakizawa et al. |
| 6,042,902 A | 3/2000 | Kuder et al. |
| 6,045,922 A | 4/2000 | Janssen et al. |
| 6,060,561 A | 5/2000 | Wolfschwenger et al. |
| 6,069,196 A | 5/2000 | Akao et al. |
| 6,077,899 A | 6/2000 | Yatsuyanagi et al. |
| 6,080,301 A | 6/2000 | Berlowitz et al. |
| 6,080,818 A | 6/2000 | Thakker et al. |
| 6,084,031 A | 7/2000 | Medsker et al. |
| 6,086,996 A | 7/2000 | Rancich et al. |
| 6,090,081 A | 7/2000 | Sudo et al. |
| 6,090,989 A | 7/2000 | Trewella et al. |
| 6,096,420 A | 8/2000 | Wilhoit et al. |
| 6,107,240 A | 8/2000 | Wu et al. |
| 6,111,039 A | 8/2000 | Miro et al. |
| 6,114,457 A | 9/2000 | Markel et al. |
| 6,124,428 A | 9/2000 | Schmieg et al. |

| Patent No. | Date | Name |
|---|---|---|
| 6,127,444 A | 10/2000 | Kadri |
| 6,133,414 A | 10/2000 | Pfaendaer et al. |
| 6,143,818 A | 11/2000 | Huang et al. |
| 6,143,846 A | 11/2000 | Herrmann et al. |
| 6,147,180 A | 11/2000 | Markel et al. |
| 6,153,703 A | 11/2000 | Lustiger et al. |
| 6,165,599 A | 12/2000 | Demeuse |
| 6,165,949 A | 12/2000 | Berlowitz et al. |
| 6,177,190 B1 | 1/2001 | Gehlsen et al. |
| 6,184,326 B1 | 2/2001 | Razavi et al. |
| 6,184,327 B1 | 2/2001 | Weng et al. |
| 6,187,449 B1 | 2/2001 | Sasaki et al. |
| 6,190,769 B1 | 2/2001 | Wang |
| 6,191,078 B1 | 2/2001 | Shlomo et al. |
| 6,194,498 B1 | 2/2001 | Anderson et al. |
| 6,197,285 B1 | 3/2001 | Kowalik et al. |
| 6,207,606 B1 | 3/2001 | Lue et al. |
| 6,207,754 B1 | 3/2001 | Yu |
| 6,225,432 B1 | 5/2001 | Weng et al. |
| 6,228,171 B1 | 5/2001 | Shirakawa |
| 6,231,936 B1 | 5/2001 | Kozimor et al. |
| 6,231,970 B1 | 5/2001 | Anderson et al. |
| 6,245,856 B1 | 6/2001 | Kaufman et al. |
| 6,245,870 B1 | 6/2001 | Razavi |
| 6,258,903 B1 | 7/2001 | Mawson et al. |
| 6,271,294 B1 | 8/2001 | Lasson et al. |
| 6,271,323 B1 | 8/2001 | Loveday et al. |
| 6,288,171 B2 | 9/2001 | Finerman et al. |
| 6,294,631 B1 | 9/2001 | Brant |
| 6,297,301 B1 | 10/2001 | Erderly et al. |
| 6,303,067 B1 | 10/2001 | Wong et al. |
| 6,310,134 B1 | 10/2001 | Templeton et al. |
| 6,316,068 B1 | 11/2001 | Masubuchi et al. |
| 6,326,426 B1 | 12/2001 | Ellul |
| 6,329,468 B1 | 12/2001 | Wang |
| 6,337,364 B1 | 1/2002 | Sakaki et al. |
| 6,340,703 B1 | 1/2002 | Kelly |
| 6,342,209 B1 | 1/2002 | Patil et al. |
| 6,342,320 B1 | 1/2002 | Liu et al. |
| 6,342,565 B1 | 1/2002 | Cheng et al. |
| 6,342,566 B2 | 1/2002 | Burkhardt et al. |
| 6,342,574 B1 | 1/2002 | Weng et al. |
| 6,348,563 B1 | 2/2002 | Fukuda et al. |
| 6,362,252 B1 | 3/2002 | Prutkin |
| 6,372,379 B1 | 4/2002 | Samii et al. |
| 6,372,847 B1 | 4/2002 | Wouters |
| 6,380,292 B1 | 4/2002 | Gibes et al. |
| 6,383,634 B1 | 5/2002 | Kornfeldt et al. |
| 6,384,115 B1 | 5/2002 | Van Gysel et al. |
| 6,388,013 B1 | 5/2002 | Saraf et al. |
| 6,399,200 B1 | 6/2002 | Sugimoto et al. |
| 6,399,707 B1 | 6/2002 | Meka et al. |
| 6,403,692 B1 | 6/2002 | Traugott et al. |
| 6,410,200 B1 | 6/2002 | Williams et al. |
| 6,413,458 B1 | 7/2002 | Pearce |
| 6,423,800 B1 * | 7/2002 | Musgrave ..................... 526/227 |
| 6,448,338 B1 | 9/2002 | Born et al. |
| 6,448,349 B1 | 9/2002 | Razavi |
| 6,451,915 B1 | 9/2002 | Ellul et al. |
| 6,465,109 B2 | 10/2002 | Ohtsuka |
| 6,476,135 B1 | 11/2002 | Bugada et al. |
| 6,482,281 B1 | 11/2002 | Schmidt |
| 6,498,213 B2 | 12/2002 | Jeong et al. |
| 6,500,563 B1 | 12/2002 | Datta et al. |
| 6,503,588 B1 | 1/2003 | Hayashi et al. |
| 6,509,128 B1 | 1/2003 | Everaerts et al. |
| 6,515,231 B1 | 2/2003 | Strobech et al. |
| 6,525,157 B2 | 2/2003 | Cozewith et al. |
| 6,531,214 B2 | 3/2003 | Carter et al. |
| 6,538,066 B2 | 3/2003 | Watanabe et al. |
| 6,545,101 B2 * | 4/2003 | Agarwal et al. ............ 525/333.7 |
| 6,559,232 B2 | 5/2003 | Inoue et al. |
| 6,583,076 B1 | 6/2003 | Pekrul et al. |
| 6,583,207 B2 | 6/2003 | Stanhope et al. |
| 6,610,768 B1 | 8/2003 | Jelenic et al. |
| 6,620,892 B1 | 9/2003 | Bertin et al. |
| 6,623,847 B2 | 9/2003 | Yates |
| 6,627,723 B2 | 9/2003 | Karandinos et al. |
| 6,632,385 B2 | 10/2003 | Kauschke et al. |
| 6,632,974 B1 | 10/2003 | Suzuki et al. |
| 6,635,715 B1 | 10/2003 | Datta et al. |
| 6,639,020 B1 | 10/2003 | Brant |
| 6,642,316 B1 | 11/2003 | Datta et al. |
| 6,656,385 B2 | 12/2003 | Lynch et al. |
| 6,659,965 B1 | 12/2003 | Kensey et al. |
| 6,706,828 B2 | 3/2004 | DiMaio |
| 6,720,376 B2 | 4/2004 | Itoh et al. |
| 6,730,739 B2 | 5/2004 | Gipson |
| 6,730,754 B2 | 5/2004 | Resconi et al. |
| 6,747,114 B2 | 6/2004 | Karandinos et al. |
| 6,750,284 B1 | 6/2004 | Dharmarajan et al. |
| 6,750,292 B2 | 6/2004 | Dozeman et al. |
| 6,750,306 B2 | 6/2004 | Brant |
| 6,753,373 B2 | 6/2004 | Winowiecki |
| 6,787,593 B2 | 9/2004 | Bell et al. |
| 6,803,103 B2 | 10/2004 | Kauschke et al. |
| 6,803,415 B1 | 10/2004 | Mikielski et al. |
| 6,818,704 B2 | 11/2004 | Brant |
| 6,855,777 B2 | 2/2005 | McLoughlin et al. |
| 6,858,767 B1 | 2/2005 | DiMaio |
| 6,861,143 B2 | 3/2005 | Castellani et al. |
| 6,867,253 B1 | 3/2005 | Chen |
| 6,875,485 B2 | 4/2005 | Kanai et al. |
| 6,887,941 B2 | 5/2005 | Zhou |
| 6,887,944 B2 | 5/2005 | Wakabayashi et al. |
| 6,900,147 B2 | 5/2005 | Morman et al. |
| 6,905,760 B1 | 6/2005 | Mukohara et al. |
| 6,906,160 B2 | 6/2005 | Stevens et al. |
| 6,916,882 B2 | 7/2005 | Brant |
| 6,921,794 B2 | 7/2005 | Cozewith et al. |
| 6,984,696 B2 | 1/2006 | Curry et al. |
| 6,992,131 B2 | 1/2006 | Faissat et al. |
| 6,992,146 B2 | 1/2006 | McLoughlin et al. |
| 7,015,283 B2 | 3/2006 | Schauder et al. |
| 7,037,989 B2 | 5/2006 | Kacker et al. |
| 7,049,356 B2 | 5/2006 | Itoh et al. |
| 7,153,571 B2 | 12/2006 | Allermann |
| 7,223,822 B2 | 5/2007 | Abhari et al. |
| 7,226,977 B2 | 6/2007 | Kim et al. |
| 7,238,747 B2 | 7/2007 | Brant |
| 7,271,209 B2 | 9/2007 | Li et al. |
| 7,294,681 B2 | 11/2007 | Jiang et al. |
| 7,319,077 B2 | 1/2008 | Mehta et al. |
| 7,365,137 B2 | 4/2008 | Resconi et al. |
| 7,413,784 B2 | 8/2008 | Ouhadi |
| 7,459,635 B2 | 12/2008 | Belli et al. |
| 7,470,740 B2 | 12/2008 | Givord et al. |
| 7,476,710 B2 | 1/2009 | Mehta et al. |
| 7,524,910 B2 | 4/2009 | Jiang et al. |
| 7,531,594 B2 | 5/2009 | Lin et al. |
| 7,541,402 B2 | 6/2009 | Abhari et al. |
| 7,595,365 B2 | 9/2009 | Kappes et al. |
| 7,615,589 B2 | 11/2009 | Westwood et al. |
| 7,619,026 B2 | 11/2009 | Yang et al. |
| 7,619,027 B2 | 11/2009 | Lundmark et al. |
| 7,622,523 B2 | 11/2009 | Li et al. |
| 7,629,416 B2 | 12/2009 | Li et al. |
| 7,632,887 B2 | 12/2009 | Lin et al. |
| 7,645,829 B2 | 1/2010 | Tse et al. |
| 7,652,092 B2 | 1/2010 | Tse et al. |
| 7,652,093 B2 | 1/2010 | Yang et al. |
| 7,652,094 B2 | 1/2010 | Lin et al. |
| 7,662,885 B2 | 2/2010 | Coffey et al. |
| 7,683,129 B2 | 3/2010 | Mehta et al. |
| 2001/0007896 A1 | 7/2001 | Agarwal et al. |
| 2001/0051265 A1 | 12/2001 | Williams et al. |
| 2001/0056159 A1 | 12/2001 | Jeong et al. |
| 2002/0007696 A1 | 1/2002 | Peyre |
| 2002/0010257 A1 | 1/2002 | Templeton et al. |
| 2002/0049276 A1 | 4/2002 | Zwick |
| 2002/0050124 A1 | 5/2002 | Jaeger |
| 2002/0077409 A1 | 6/2002 | Sakaki et al. |
| 2002/0082328 A1 | 6/2002 | Yu et al. |
| 2002/0147266 A1 | 10/2002 | Rawlinson et al. |
| 2002/0155267 A1 | 10/2002 | Bader |
| 2002/0156165 A1 * | 10/2002 | Webster ........................ 524/323 |
| 2002/0160137 A1 * | 10/2002 | Varma .......................... 428/35.7 |
| 2002/0168518 A1 | 11/2002 | Bond et al. |

| | | | |
|---|---|---|---|
| 2002/0183429 A1 | 12/2002 | Itoh et al. | |
| 2002/0188057 A1* | 12/2002 | Chen ............................ 524/575 | |
| 2002/0198327 A1* | 12/2002 | Chung .......................... 525/251 | |
| 2003/0004266 A1 | 1/2003 | Kitazaki et al. | |
| 2003/0022977 A1* | 1/2003 | Hall .............................. 524/481 | |
| 2003/0032696 A1 | 2/2003 | Sime et al. | |
| 2003/0035951 A1 | 2/2003 | Magill et al. | |
| 2003/0036577 A1 | 2/2003 | Hughes et al. | |
| 2003/0036592 A1 | 2/2003 | Longmoore et al. | |
| 2003/0060525 A1 | 3/2003 | Gupta | |
| 2003/0060557 A1 | 3/2003 | Tasaka et al. | |
| 2003/0091803 A1 | 5/2003 | Bond et al. | |
| 2003/0092826 A1 | 5/2003 | Pearce | |
| 2003/0100238 A1 | 5/2003 | Morman et al. | |
| 2003/0119988 A1 | 6/2003 | Johnson et al. | |
| 2003/0130430 A1 | 7/2003 | Cozewith et al. | |
| 2003/0134552 A1 | 7/2003 | Mehawej et al. | |
| 2003/0144415 A1 | 7/2003 | Wang et al. | |
| 2003/0157859 A1 | 8/2003 | Ishikawa | |
| 2003/0181575 A1 | 9/2003 | Schmidt et al. | |
| 2003/0181584 A1 | 9/2003 | Handin, Jr. et al. | |
| 2003/0187081 A1 | 10/2003 | Cui | |
| 2003/0204017 A1 | 10/2003 | Stevens et al. | |
| 2003/0213938 A1 | 11/2003 | Farley et al. | |
| 2004/0030287 A1 | 2/2004 | Matthijs et al. | |
| 2004/0034148 A1 | 2/2004 | Kelly et al. | |
| 2004/0038058 A1 | 2/2004 | Zhou | |
| 2004/0054086 A1 | 3/2004 | Schauder et al. | |
| 2004/0063806 A1 | 4/2004 | Kaarnakari | |
| 2004/0070653 A1 | 4/2004 | Mashita et al. | |
| 2004/0091631 A1 | 5/2004 | Belli et al. | |
| 2004/0116515 A1 | 6/2004 | Anderson et al. | |
| 2004/0122388 A1 | 6/2004 | McCormack et al. | |
| 2004/0214498 A1 | 10/2004 | Webb et al. | |
| 2004/0241309 A1 | 12/2004 | Garnier | |
| 2004/0249046 A1 | 12/2004 | Abhari et al. | |
| 2004/0266948 A1* | 12/2004 | Jacob et al. .................... 525/98 | |
| 2005/0009993 A1 | 1/2005 | Morioka et al. | |
| 2005/0018983 A1 | 1/2005 | Brown et al. | |
| 2005/0043484 A1 | 2/2005 | Wang et al. | |
| 2005/0101210 A1 | 5/2005 | Bindschedler et al. | |
| 2005/0106978 A1 | 5/2005 | Cheng et al. | |
| 2005/0107534 A1 | 5/2005 | Datta et al. | |
| 2005/0130544 A1 | 6/2005 | Cheng et al. | |
| 2005/0170117 A1 | 8/2005 | Cleveland et al. | |
| 2005/0215717 A1 | 9/2005 | Dozeman | |
| 2005/0222861 A1 | 10/2005 | Silverman et al. | |
| 2005/0250894 A1 | 11/2005 | Null | |
| 2005/0262464 A1 | 11/2005 | Esch, Jr. et al. | |
| 2005/0271851 A1 | 12/2005 | Shibatou et al. | |
| 2005/0277738 A1 | 12/2005 | Hoyweghen et al. | |
| 2006/0008643 A1 | 1/2006 | Lin et al. | |
| 2006/0020067 A1 | 1/2006 | Brant et al. | |
| 2006/0079617 A1 | 4/2006 | Kappes et al. | |
| 2006/0100347 A1 | 5/2006 | Ouhadi et al. | |
| 2006/0100379 A1 | 5/2006 | Ouhadi | |
| 2006/0167184 A1 | 7/2006 | Waddell et al. | |
| 2006/0173123 A1 | 8/2006 | Yang et al. | |
| 2006/0183860 A1 | 8/2006 | Mehta et al. | |
| 2006/0247332 A1 | 11/2006 | Coffey et al. | |
| 2006/0293460 A1 | 12/2006 | Jacob et al. | |
| 2007/0021560 A1 | 1/2007 | Tse et al. | |
| 2007/0021561 A1 | 1/2007 | Tse et al. | |
| 2007/0167553 A1 | 7/2007 | Westwood et al. | |
| 2007/0203273 A1 | 8/2007 | Van Riel et al. | |
| 2007/0240605 A1 | 10/2007 | Iyer et al. | |
| 2008/0045638 A1 | 2/2008 | Chapman et al. | |
| 2008/0070994 A1 | 3/2008 | Li et al. | |
| 2008/0177123 A1 | 7/2008 | Blais et al. | |
| 2008/0221274 A1 | 9/2008 | Jourdain | |
| 2008/0227919 A9 | 9/2008 | Li et al. | |
| 2008/0234157 A1 | 9/2008 | Yoon et al. | |
| 2008/0268272 A1 | 10/2008 | Jourdain | |
| 2008/0317990 A1 | 12/2008 | Runyan et al. | |
| 2009/0003781 A1 | 1/2009 | Parris et al. | |
| 2009/0043049 A1 | 2/2009 | Chapman et al. | |
| 2009/0062429 A9 | 3/2009 | Coffey et al. | |
| 2009/0171001 A1 | 7/2009 | Lin et al. | |
| 2009/0197995 A1 | 8/2009 | Tracey et al. | |
| 2010/0036038 A1 | 2/2010 | Rodgers et al. | |

FOREIGN PATENT DOCUMENTS

| | | |
|---|---|---|
| DE | 1921649 | 11/1970 |
| DE | 2019945 | 11/1971 |
| DE | 1769723 | 2/1972 |
| DE | 2108293 | 8/1972 |
| DE | 2632957 | 1/1978 |
| DE | 3735502 | 5/1989 |
| DE | 3911725 | 10/1990 |
| DE | 4417191 | 8/1995 |
| DE | 4420991 | 12/1995 |
| DE | 19841303 | 3/2000 |
| EP | 0 210 733 | 2/1972 |
| EP | 0 039 126 | 11/1981 |
| EP | 0 046 536 | 3/1982 |
| EP | 0 083 049 | 7/1983 |
| EP | 0 087 294 | 8/1983 |
| EP | 0 097 969 | 1/1984 |
| EP | 0 050 548 | 1/1985 |
| EP | 0 058 331 | 6/1985 |
| EP | 0 058 404 | 1/1986 |
| EP | 0 168 923 | 1/1986 |
| EP | 0 214 112 | 3/1987 |
| EP | 0 217 516 | 4/1987 |
| EP | 0 073 042 | 10/1987 |
| EP | 0 240 563 | 10/1987 |
| EP | 0 255 735 | 2/1988 |
| EP | 0 332 802 | 3/1988 |
| EP | 0 315 363 | 10/1988 |
| EP | 0 299 718 | 1/1989 |
| EP | 0 300 682 | 1/1989 |
| EP | 0 300 689 | 1/1989 |
| EP | 0 308 286 | 3/1989 |
| EP | 0 321 868 | 6/1989 |
| EP | 0 322 169 | 6/1989 |
| EP | 0 315 481 | 8/1989 |
| EP | 0 326 753 | 8/1989 |
| EP | 0 343 943 | 11/1989 |
| EP | 0 344 014 | 11/1989 |
| EP | 0 369 164 | 5/1990 |
| EP | 0 374 695 | 6/1990 |
| EP | 0 389 695 | 10/1990 |
| EP | 0 400 333 | 12/1990 |
| EP | 0 404 011 | 12/1990 |
| EP | 0 407 098 | 1/1991 |
| EP | 0 409 155 | 1/1991 |
| EP | 0 416 939 | 3/1991 |
| EP | 0 428 153 | 5/1991 |
| EP | 0 431 475 | 6/1991 |
| EP | 0 448 259 | 9/1991 |
| EP | 0 462 574 | 12/1991 |
| EP | 0 464 546 | 1/1992 |
| EP | 0 464 547 | 1/1992 |
| EP | 0 476 401 | 3/1992 |
| EP | 0 476 700 | 3/1992 |
| EP | 0 477 748 | 4/1992 |
| EP | 0 513 470 | 11/1992 |
| EP | 0 548 040 | 6/1993 |
| EP | 0 565 073 | 10/1993 |
| EP | 0 583 836 | 2/1994 |
| EP | 0 604 917 | 7/1994 |
| EP | 0 614 939 | 9/1994 |
| EP | 0 617 077 | 9/1994 |
| EP | 0 618 261 | 10/1994 |
| EP | 0 622 432 | 11/1994 |
| EP | 0 629 631 | 12/1994 |
| EP | 0 629 632 | 12/1994 |
| EP | 0 654 070 | 5/1995 |
| EP | 0 664 315 | 7/1995 |
| EP | 0 677 548 | 10/1995 |
| EP | 0 682 074 | 11/1995 |
| EP | 0 373 660 | 2/1996 |
| EP | 0 699 519 | 3/1996 |
| EP | 0 716 124 | 6/1996 |
| EP | 0 733 677 | 9/1996 |
| EP | 0 742 227 | 11/1996 |

| | | | | | |
|---|---|---|---|---|---|
| EP | 0 755 970 | 1/1997 | JP | 64-017495 | 1/1989 |
| EP | 0 757 076 | 2/1997 | JP | 64-066253 | 3/1989 |
| EP | 0 774 347 | 5/1997 | JP | 01-106628 | 4/1989 |
| EP | 0 801 104 | 10/1997 | JP | 01-152448 | 6/1989 |
| EP | 0 827 526 | 3/1998 | JP | 01-192365 | 8/1989 |
| EP | 0 886 656 | 12/1998 | JP | 01-282280 | 11/1989 |
| EP | 0 902 051 | 3/1999 | JP | 02-038114 | 2/1990 |
| EP | 0 909 280 | 4/1999 | JP | 02-067344 | 3/1990 |
| EP | 0 940 433 | 9/1999 | JP | 02-080445 | 3/1990 |
| EP | 0 969 043 | 1/2000 | JP | 03-037481 | 2/1991 |
| EP | 0 990 675 | 5/2000 | JP | 03-269036 | 11/1991 |
| EP | 1 002 814 | 5/2000 | JP | 04-063851 | 2/1992 |
| EP | 1 003 814 | 5/2000 | JP | 04-214709 | 8/1992 |
| EP | 1 028 145 | 8/2000 | JP | 04-257361 | 9/1992 |
| EP | 1 104 783 | 6/2001 | JP | 05-098088 | 4/1993 |
| EP | 1 138 478 | 10/2001 | JP | 05-112842 | 5/1993 |
| EP | 1 357 150 | 4/2002 | JP | 05-202339 | 8/1993 |
| EP | 1 201 391 | 5/2002 | JP | 93-287132 | 11/1993 |
| EP | 1 201 406 | 5/2002 | JP | 06-001892 | 1/1994 |
| EP | 1 211 285 | 6/2002 | JP | 06-316659 | 11/1994 |
| EP | 1 214 386 | 6/2002 | JP | 06-345893 | 12/1994 |
| EP | 1 223 191 | 7/2002 | JP | 07-118492 | 5/1995 |
| EP | 1 239 004 | 9/2002 | JP | 07-214685 | 8/1995 |
| EP | 1 241 224 | 9/2002 | JP | 07-216143 | 8/1995 |
| EP | 1 252 231 | 10/2002 | JP | 07-085907 | 9/1995 |
| EP | 1 313 805 | 5/2003 | JP | 07-247387 | 9/1995 |
| EP | 1 331 258 | 7/2003 | JP | 07-292167 | 11/1995 |
| EP | 1 366 087 | 12/2003 | JP | 08-019286 | 2/1996 |
| EP | 1 453 912 | 9/2004 | JP | 08-019287 | 2/1996 |
| EP | 1 505 181 | 2/2005 | JP | 08-034862 | 2/1996 |
| EP | 1 607 440 | 12/2005 | JP | 08-067782 | 3/1996 |
| EP | 1 342 249 | 1/2009 | JP | 08-246232 | 9/1996 |
| FR | 1167244 | 11/1958 | JP | 08-253754 | 10/1996 |
| FR | 1566388 | 5/1969 | JP | 08-269417 | 10/1996 |
| FR | 2094870 | 3/1972 | JP | 08-333557 | 12/1996 |
| FR | 2602515 | 2/1988 | JP | 09-076260 | 3/1997 |
| GB | 0511319 | 8/1939 | JP | 09-077901 | 3/1997 |
| GB | 0511320 | 8/1939 | JP | 09-087435 | 3/1997 |
| GB | 0964845 | 7/1964 | JP | 09-104801 | 4/1997 |
| GB | 0977113 | 12/1964 | JP | 97-111061 | 4/1997 |
| GB | 1044028 | 9/1966 | JP | 09-176359 | 7/1997 |
| GB | 1044502 | 10/1966 | JP | 09-208761 | 8/1997 |
| GB | 1044503 | 10/1966 | JP | 10-017693 | 1/1998 |
| GB | 1068783 | 5/1967 | JP | 10-036569 | 2/1998 |
| GB | 1108298 | 4/1968 | JP | 10-158971 | 6/1998 |
| GB | 1134422 | 11/1968 | JP | 10-168252 | 6/1998 |
| GB | 1166664 | 10/1969 | JP | 10-279750 | 10/1998 |
| GB | 1252638 | 11/1971 | JP | 10-324783 | 12/1998 |
| GB | 1329915 | 9/1973 | JP | 10-325060 | 12/1998 |
| GB | 1331988 | 9/1973 | JP | 11-012402 | 1/1999 |
| GB | 1350257 | 4/1974 | JP | 11-020397 | 1/1999 |
| GB | 1352311 | 5/1974 | JP | 11-049903 | 2/1999 |
| GB | 1390359 | 4/1975 | JP | 11-060789 | 3/1999 |
| GB | 1429494 | 3/1976 | JP | 11-080455 | 3/1999 |
| GB | 1440230 | 6/1976 | JP | 11-239587 | 9/1999 |
| GB | 1452911 | 10/1976 | JP | 11-291422 | 10/1999 |
| GB | 1458915 | 12/1976 | JP | 2000-109640 | 4/2000 |
| GB | 1559058 | 1/1980 | JP | 2000-154281 | 6/2000 |
| GB | 2061339 | 5/1981 | JP | 2001-049056 | 2/2001 |
| GB | 2180790 | 4/1987 | JP | 2001-064523 | 3/2001 |
| GB | 2195642 | 4/1988 | JP | 2001-131509 | 5/2001 |
| GB | 2187455 | 9/1989 | JP | 2001-233992 | 8/2001 |
| JP | 68-013376 | 6/1943 | JP | 2001-279031 | 10/2001 |
| JP | 44-029554 | 12/1969 | JP | 2001-342355 | 12/2001 |
| JP | 74-041101 | 11/1974 | JP | 3325376 | 9/2002 |
| JP | 50-123148 | 9/1975 | JP | 3325377 | 9/2002 |
| JP | 50-151243 | 12/1975 | JP | 2003-003023 | 1/2003 |
| JP | 76-029170 | 3/1976 | JP | 2003-155387 | 5/2003 |
| JP | 51-144998 | 12/1976 | JP | 3474677 | 12/2003 |
| JP | 53-023388 | 3/1978 | JP | 4345327 | 10/2009 |
| JP | 53-060383 | 5/1978 | SU | 455976 | 1/1975 |
| JP | 53-102381 | 9/1978 | SU | 812800 | 12/1978 |
| JP | 56-045932 | 4/1981 | SU | 857179 | 3/1979 |
| JP | 56-095938 | 8/1981 | WO | WO 80/00028 | 1/1989 |
| JP | 60-112439 | 6/1985 | WO | WO 89/08681 | 9/1989 |
| JP | 62-132943 | 6/1987 | WO | WO 91/18045 | 11/1991 |
| JP | 62-223245 | 10/1987 | WO | WO 92/14784 | 9/1992 |
| JP | 63-251436 | 10/1988 | WO | WO 92/16583 | 10/1992 |
| JP | 64-016638 | 1/1989 | WO | WO 94/15014 | 7/1994 |

| | | |
|---|---|---|
| WO | WO 95/13316 | 5/1995 |
| WO | WO 96/04419 | 2/1996 |
| WO | WO 96/11231 | 4/1996 |
| WO | WO 96/11232 | 4/1996 |
| WO | WO 96/26242 | 8/1996 |
| WO | WO 97/10298 | 3/1997 |
| WO | WO 97/19582 | 6/1997 |
| WO | WO 97/22662 | 6/1997 |
| WO | WO 97/33921 | 9/1997 |
| WO | WO 97/49737 | 12/1997 |
| WO | WO 98/32784 | 7/1998 |
| WO | WO 98/36783 | 8/1998 |
| WO | WO 98/42437 | 10/1998 |
| WO | WO 98/44041 | 10/1998 |
| WO | WO 98/46694 | 10/1998 |
| WO | WO 98/49229 | 11/1998 |
| WO | WO 99/07788 | 2/1999 |
| WO | WO 99/13016 | 3/1999 |
| WO | WO 99/19547 | 4/1999 |
| WO | WO 99/24501 | 5/1999 |
| WO | WO 99/24506 | 5/1999 |
| WO | WO 99/62987 | 12/1999 |
| WO | WO 00/00564 | 1/2000 |
| WO | WO 00/01745 | 1/2000 |
| WO | WO 00/37514 | 6/2000 |
| WO | WO 00/66662 | 11/2000 |
| WO | WO 00/69963 | 11/2000 |
| WO | WO 00/69965 | 11/2000 |
| WO | WO 00/69966 | 11/2000 |
| WO | WO 01/02263 | 1/2001 |
| WO | WO 01/09200 | 2/2001 |
| WO | WO 01/18109 | 3/2001 |
| WO | WO 01/43963 | 6/2001 |
| WO | WO 01/48034 | 7/2001 |
| WO | WO 01/81493 | 11/2001 |
| WO | WO 01/90113 | 11/2001 |
| WO | WO 02/10310 | 2/2002 |
| WO | WO 02/17973 | 3/2002 |
| WO | WO 02/18487 | 3/2002 |
| WO | WO 02/24767 | 3/2002 |
| WO | WO 02/30194 | 4/2002 |
| WO | WO 02/31044 | 4/2002 |
| WO | WO 02/36651 | 5/2002 |
| WO | WO 02/47092 | 6/2002 |
| WO | WO 02/051634 | 7/2002 |
| WO | WO 02/053629 | 7/2002 |
| WO | WO 02/062891 | 8/2002 |
| WO | WO 02/072689 | 9/2002 |
| WO | WO 02/074873 | 9/2002 |
| WO | WO 02/083753 | 10/2002 |
| WO | WO 02/088238 | 11/2002 |
| WO | WO 02/100153 | 12/2002 |
| WO | WO 03/021569 | 3/2003 |
| WO | WO 03/029379 | 4/2003 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 03/048252 | 6/2003 |
| WO | WO 03/060004 | 7/2003 |
| WO | WO 03/066729 | 8/2003 |
| WO | WO 03/083003 | 10/2003 |
| WO | WO 2004/009699 | 1/2004 |
| WO | WO 2004/014988 | 2/2004 |
| WO | WO 2004/014994 | 2/2004 |
| WO | WO 2004/014997 | 2/2004 |
| WO | WO 2004/014998 | 2/2004 |
| WO | WO 2004/020195 | 3/2004 |
| WO | WO 2004/031292 | 4/2004 |
| WO | WO 2004/035681 | 4/2004 |
| WO | WO 2004/060994 | 7/2004 |
| WO | WO 2004/087806 | 10/2004 |
| WO | WO 2004/113438 | 12/2004 |
| WO | WO 2005/010094 | 2/2005 |
| WO | WO 2005/014872 | 2/2005 |
| WO | WO 2005/049670 | 6/2005 |
| WO | WO 2005/052052 | 6/2005 |
| WO | WO 2005/080495 | 9/2005 |
| WO | WO 2006/006346 | 1/2006 |
| WO | WO 2006/027327 | 3/2006 |
| WO | WO 2006/044149 | 4/2006 |
| WO | WO 2006/083540 | 8/2006 |
| WO | WO 2006/118674 | 11/2006 |
| WO | WO 2006/128467 | 12/2006 |
| WO | WO 2006/128646 | 12/2006 |
| WO | WO 2007/048422 | 5/2007 |
| WO | WO 07/145713 | 12/2007 |

OTHER PUBLICATIONS

Blomenhofer et al., "Designer" Nucleating Agents for Polypropylene, Macromol., 2005, vol. 38, p. 3688-3695.

Wild, et al., Determination of Branching Distributions in Polyethylene and Ethylene Copolymers, J. Poly. Sci., Poly. Phys. Ed., vol. 20, p. 441 (1982).

Sun et al., Effect of Short chain Branching on the Coil Dimensions of Polyolefins in Dilute Solution, T. Macromol., vol. 34, No. 19, 6812-6820 (2001).

Collette et al., "Elastomeric Polypropylenes from Alumina-Supported Tetraalkyl Group IBV Catalysts, 1. Synthesis and Properties of High Molecular Weight Stereoblock Homopolymers and 2. Chain Microstructure, Crystallinity, and Morphology", Macromol., vol. 22, 3851-3866, 1989.

Bovey, Polymer Conformation and Configuration, A Polytechnic Press of the Polytechnic Institute of Brooklyn Book, Academic Press, New York, London, 1969.

Cheng et al., 13C Nuclear Magnetic Resonance Characterization of Poly(propylene) Prepared With Homogeneous Catalysts, Makromol. Chem., 1989, 190, pp. 1931-1943.

Metallocene-based Polyolefins, Preparation, properties and technology, Scheirs et al. Editors, Wiley Series in Polymer Science, vol. 2, John Wiley & Sons, Ltd., England, 2000.

*Rubber Technology Handbook*, Werner Hoffman, Hanser Publishers, New York, 1989, p. 294-305.

K. Nitta et al., "Plasticizing of isotactic polypropylene upon addition of hydrocarbon oils", e-Polymers, vol. 021, 2004, pp. 1-11.

Plastics Additives and A-Z Reference, 499-504 (Geoffrey Pritchard, ed., Chapman & Hall 1998).

*Additives for Plastics*, J. Stepek, H. Daoust, Springer Verlag, New York, 1983, p. 6-69.

Synthetic Lubricants and High-Performance Functional Fluids (Leslie R. Rudnick & Ronald L. Shubkin, ed. Marcel Dekker, Inc. 1999) p. 3-52.

Polypropylene Handbook pp. 304-348 (Edward P. Moore, Jr. ed., Hanser Publishers 1996).

Resconi et al., Selectivity in Propene Polymerization with Metallocene Catalysts, 100 Chem. Rev. 1253-1345 (2000).

Risch, Ph.D., "Swelling Interaction, Plasticization, and Antioxidant extraction Between Fiber Optic Cable Gels and Polyolefins", SPE-ANTEC, 1999, pp. 1-5.

McShane, et al., The Effect of Oil Type and Content on the Rheological, Mechanical and Thermal Proper6ties of a Polyolefinic Based Thermoplastic Elastomer, SPE ANTEC 2002, p. 1-5.

B.J. Gedeon et al., "Use of "Clean" paraffinic Processing Oils to Improve TPE Properties", TPEs, 2000, pp. 157-170.

Wheeler et al., Gel Permeation Chromatography/Fourier Transform Infrared Interface for Polymer Analysis, Applied Spectroscopy, 1993, vol. 47, pp. 1128-1130.

Wu et al., "Plasticizing Characteristics of High-Density polyethylene", Suliao, 1988, 17 (4), 3-8 (Abstract).

Kanauzov et al., "Effect of Technological Additives on Properties of Thermoplastic vulcanizates Base don Ethylene Propylene rubber and Polyolefins", Kauchuk I Rezina, 2000, (40), 12-15 (Abstract).

J.D. Fotheringham, Polybutenes: a versatile modifier for plastics, AddCon Asia (RAPRA), International Plastics Additives and Modifiers Conference, Singapore, Oct. 28-29, 1997 (Abstract).

M.D. Nasibova et al., "Effect of Petroleum Plasticizers and Synthetic Oils on Rheological and service Properties of Polyolefins", Olefinovs Opyt. Z-dom, 1991 (14), 60-66 (Abstract).

Handbook of Plastics, Elastomers, and Composites, Charles A. Harper Editor in Chief, 2nd Edition, McGraw-Hill, Inc., 1992, pp. 1.13-1.14.

Maltby et al., "Slip Additives for Film Extrusion", Journal of Plastic Film & Sheeting, Boston, MA, Apr. 1998, vol. 14, pp. 111-120.

Encyclopedia of Polymer Science and Engineering, G. ver Strate, vol. 6, $2^{nd}$ Ed., 1986, pp. 522-564.

Polypropylene Handbook, $2^{nd}$ Ed., N. Pasquini, Ed. (Hanser, 2005), p. 314-330.

Polymer Blends, D.R. Paul and C.B. Bucknall, Eds. (Wiley-Interscience, 2000), vol. 2, pp. 177-224.

Maier et al., Polypropylene—The Definitive User's Guide and Databook, 1998, pp. 11-25 and 97-106.

Gande et al. Of CIBA Chemicals, Peroxide-Free Vis-Breaking Additive for Improved Qualities in Meltblown Fabrics, CR76 TANDEC Conference 2006.

Hawley's Condensed Chemical Dictionary, $14^{th}$ Ed. (2001) p. 835.

Dharmarajan et al., Modifying Polypropylene with a Metallocene Plastomer, Plastics Engr., Aug. 1996, pp. 33-35.

Synthetic Lubricants and High-Performance Functional Fluids (Rudnick et al. ed., Marcel Dekker 1999), pp. 357-392.

Stehr, Investigation of the Effects of Poly(α-olefin) Plasticizers on the Properties of Elastomers, KGK, Jan./Feb. 2007, pp. 14-19 (translation).

Khungar, Flexible Films of Polypropylene Plasticized with Polybutenes, Amoco Chemicals, 1996, pp. 2992-2996.

Pratt et al., Control of Phase Separation and Voiding in Oil-Filled Polypropylene, Journal of Applied Polymers Science, vol. 18, 1974, pp. 3621-3631.

Synthetic Lubricants and High-Performance Functional Fluids (Rudnick et al. ed., Marcel Dekker 1999), pp. 393-411.

Hawleys Condensed Chemical Dictionary, 1997, pp. 888, 889, 903, 1097.

Nucleation of Polypropylene, Polymer Additives and Colors, Nov. 27, 2000, Provided by www.specialchem4polymers.com.

Indopol Product Sheet, Ineos™ Oligomers, Typical Properties, Indopol® Polybutene, Grade H-300, Sep. 2008, p. 1.

"Who We Are", Ineos™ Oligomers, http://www.ineosoligomers.com/86-Who_we_are.htm, 2007.

Durasyn® 168 Polyalphaolefin Product Sheet, Ineos™ Oligomers.

Synfluid® PAO 8 cSt Product Sheet, Chevron Phillips Chemical Company LP, Dec. 2008, p. 1 of 1.

Indopol Product Sheet, Ineos Oligomers, Typical Properties, Indopol® Polybutene, Grade H-300.

* cited by examiner

ELASTOMERIC COMPOSITIONS

PRIORITY CLAIM

This invention claims the benefit of and priority to U.S. Ser. No. 60/699,718, filed Jul. 15, 2005.

FIELD OF THE INVENTION

The invention relates to modification of compositions comprising hydrogenated block copolymers, particularly styrenic block copolymers, to make elastomeric-like compositions with improved flexibility after prolonged heat-aging and/or cooling with less surface blooming.

BACKGROUND OF THE INVENTION

Hydrogenated styrenic block copolymers, such as those having a saturated ethylene-butene-1 mid-block (i.e., SEBS), possess good thermal stability. However, use of such copolymers in certain processes, including thermoforming operations, is limited because of poor processability. This is thought to be a result of the high incompatibility of the styrene end-block and the EB mid-block even in the melt state.

Polypropylene (PP) and high levels of process oils have been added to SEBSs in an attempt to improve processability. In the injection molding or extrusion molding of useful parts, the PP/SEBS/oil mixture will form two co-continuous phases, a first continuous phase of PP and a second continuous phase of oil and SEBS. The continuous, high melting-point PP phase enhances the solvent resistance and heat resistance of the compounds. The combination of phases facilitates the production of soft, flexible parts such as wire and cable insulation and automotive interior outer layers such as instrument panels, seats, and the like.

However, difficulties exist in using high levels of process oil in the blends to achieve lower values of hardness because the oil tends to bloom to the surface ("surface blooming") and/or emit from the polymers during service. Oils also have a yellowish appearance which detracts from the optical properties in the final product. Further, oils tend to emit a distinct odor which detracts from its use in closed or contained environments, such as automotive interiors.

Typically, mineral oils or synthetic oils are added as the processing oil to improve processability. Mineral oils are any petroleum-based oil that is derived from petroleum crude oil and subjected to refining steps, such as distillation, solvent processing, hydroprocessing, and/or dewaxing to achieve the final oil. This also includes petroleum-based oils that are extensively purified and/or modified through severe processing treatments. Examples of commercially available mineral oils include but are not limited to Drakeol from Penreco (USA), Paralux from Chevron (USA), Sunpar from Sunoco (USA), Plastol and Flexon from ExxonMobil (USA), Shellflex from Royal Dutch Shell (UK/Netherlands), and Diana from Idemitsu (Japan).

Other block copolymer blends have been proposed to improve processability and maintain thermal stability. For example, U.S. Pat. No. 4,904,731 teaches polymeric compositions of a C2-C10 olefin polymer, a hydrogenated block copolymer, and an LLDPE, useful for shaped structures having good clarity and good impact strength. U.S. Pat. No. 5,925,707 discloses oil gel compositions of styrene block copolymers, oil, and optionally a polyolefin wax and/or liquid extender. WO 02/31044 discloses a composition of SEBS, polypropylene, and a polydecene having a molecular weight of from about 400 and 1000 g/mol to make flexible products. Other references include U.S. Pat. No. 4,132,698; U.S. Pat. No. 4,960,820; WO 01/18109; WO 2004/014998; and EP 0300689.

SUMMARY OF THE INVENTION

Compositions comprising hydrogenated block copolymers that have improved flexibility after prolonged heat-aging and/or cooling with less surface blooming and methods for making the same are provided. In one or more embodiments, this invention relates to a composition comprising:
 (i) at least one low molecular weight polyolefin;
 (ii) a block copolymer obtainable by selectively hydrogenating a block copolymer having terminal polymeric blocks of a vinyl aromatic monomer and a mid-block prepared originally with an olefin and subsequently hydrogenated; and
 (iii) polypropylene;
 (iv) with the proviso that when (i) is a PAO having a molecular weight of between about 400 and 1000 g/mole, either:
  (a) (iii) is a homopolymer characterized by an MFR greater than 2 g/10 min,
  (b) (iii) is a copolymer; or
  (c) (iii) is a polymer or copolymer made by a metallocene catalyst; or
  (d) the composition does not contain calcium carbonate.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

A composition having surprisingly improved flexibility after prolonged heat-aging and/or cooling with decreased surface blooming, and methods for making the same are provided. In one or more embodiments, the composition comprises one or more low molecular weight polyolefins, selectively hydrogenated block copolymers, and polypropylene. Surprisingly, it has been discovered that the addition of the one or more low molecular weight polyolefins to a blend of selectively hydrogenated block copolymers and polypropylene provides for compositions having improved flexibility after prolonged heat-aging and/or cooling. The compositions also surprisingly have decreased surface blooming.

Low Molecular Weight Polyolefins

The one or more low molecular weight polyolefins according to the present invention can be any polyolefin having a number-average molecular weight (Mn) of less than 21,000 g/mol. Such polyolefins include oligomers such as C5-C14 alphaolefins, including copolymers thereof, and oligomers of ethylene/butene-1 and isobutylene/butene-1.

Non-Functionalized Plasticizer (NFP)

In one or more embodiments, the low molecular weight polyolefins can be or include at least one non-functionalized plasticizer ("NFP"). A NFP is a hydrocarbon liquid, that is a liquid compound comprising carbon and hydrogen, which does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent", it is meant that these groups and compounds comprising these groups are not deliberately added to the NFP, and if present at all, are present at less than 5 wt % by weight of the NFP in one embodiment, more preferably less than 4 wt %, more preferably less than 3 wt %, more preferably less than 2 wt %, more preferably less than 1 wt %, more preferably less than 0.7 wt %, more preferably less than 0.5 wt %, more preferably less than 0.3 wt %, more preferably less than 0.1 wt %, more preferably less than 0.05 wt %, more preferably less than 0.01 wt %, more preferably less than 0.001 wt %, based upon the weight of the NFP.

In one embodiment, aromatic moieties (including any compound whose molecules have the ring structure characteristic of benzene, naphthalene, phenanthrene, anthracene, etc.) are substantially absent from the NFP. By "substantially absent", it is meant that these compounds are not added deliberately to the compositions and if present at all, are present at less than 0.5 wt %, preferably less than 0.1 wt %.

In another embodiment, naphthenic moieties (including any compound whose molecules have a saturated ring structure such as would be produced by hydrogenating benzene, naphthalene, phenanthrene, anthracene, etc.) are substantially absent from the NFP. By "substantially absent", it is meant that these compounds are not added deliberately to the compositions and if present at all, are present at less than 0.5 wt %, preferably less than 0.1 wt %.

In another embodiment, the NFP is a hydrocarbon that does not contain olefinic unsaturation to an appreciable extent. By "appreciable extent of olefinic unsaturation" it is meant that the carbons involved in olefinic bonds account for less than 10% (preferably less than 8%, more preferably less than 6%, more preferably less than 4%, more preferably less than 2%, more preferably less than 1%, more preferably less than 0.7%, more preferably less than 0.5%, more preferably less than 0.3%, more preferably less than 0.1%, more preferably less than 0.05%, more preferably less than 0.01%, more preferably less than 0.001%) of the total number of carbons. In some embodiments, the percent of carbons of the NFP involved in olefinic bonds is between 0.001 and 10% of the total number of carbon atoms in the NFP, preferably between 0.01 and 5%, preferably between 0.1 and 2%, more preferably less than 1%.

Particularly preferred NFPs include isoparaffins, PAOs, Group III basestocks or mineral oils, high purity hydrocarbon fluids derived from a so-called Gas-To-Liquids processes, and mineral oils with a viscosity index greater than 100, pour point less than −20° C., specific gravity less than 0.86, and flash point greater than 200° C.

In another embodiment, the NFP comprises C6 to C200 paraffins, and C8 to C100 paraffins in another embodiment. In another embodiment, the NFP consists essentially of C6 to C200 paraffins, or essentially of C8 to C100 paraffins in another embodiment. In yet another embodiment, the NFP comprises C20 to C1500 paraffins, preferably C25 to C500 paraffins, preferably C25 to C500 paraffins, preferably C30 to C500 paraffins, preferably C40 to C500 paraffins, preferably C40 to C250 paraffins, preferably C30 to C150 paraffins, preferably C20 to C100 paraffins. In a preferred embodiment, the NFP comprises oligomers of C5 to C24 olefins.

Isoparaffins

In one embodiment of the present invention, the NFP is an isoparaffin-rich hydrocarbon liquid with a pour point of −50° C. or less (preferably −60° C. or less) and a specific gravity of 0.84 or less (preferably 0.83 or less). By isoparaffin-rich is meant that the NFP comprises at least 50 wt % (preferably at least 60 wt %, preferably at least 70 wt %, preferably at least 80 wt %, preferably at least 90 wt %, preferably 100 wt %) of C6 to C150 (preferably C6 to C100, preferably C6 to C25, preferably C8 to C20) isoparaffins. Preferably the paraffin chains possess C1 to C10 alkyl branching along at least a portion of each paraffin chain. More preferably, the isoparaffins are saturated aliphatic hydrocarbons whose molecules have at least one carbon atom bonded to at least three other carbon atoms or at least one side chain (i.e., a molecule having one or more tertiary or quaternary carbon atoms), wherein the number-average molecular weight is in the range of 100 to 1000 (preferably 120 to 500, preferably 150 to 300) g/mol.

In another embodiment, the isoparaffin-rich NFP has a kinematic viscosity at 25° C. of 30 cSt or less (preferably 25 cSt or less, preferably 20 cSt or less, preferably 15 cSt or less) and a glass transition temperature (Tg) that cannot be determined by ASTM E 1356 or if it can be determined then the Tg according to ASTM E 1356 is preferably less than 0° C., more preferably less than −10° C., more preferably less than −20° C., more preferably less than −30° C. Preferably the number-average molecular weight of the isoparaffin-rich NFP is in the range of 100 to 300 g/mol.

In another embodiment, the isoparaffin-rich NFP is a mixture of branched and normal paraffins having from 6 to 50 carbon atoms, and from 10 to 24 carbon atoms in another embodiment, in the molecule. The isoparaffin composition has a ratio of branch paraffin to n-paraffin ratio (branch paraffin:n-paraffin) ranging from 0.5:1 to 9:1 in one embodiment, and from 1:1 to 4:1 in another embodiment. The isoparaffins of the mixture in this embodiment contain greater than 50 wt % (by total weight of the isoparaffin composition) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like, based on the total weight of isoparaffins in the mixture. In one embodiment, the isoparaffins of the mixture contain greater than 70 wt % of the mono-methyl species, based on the total weight of the isoparaffins in the mixture. The isoparaffinic mixture boils within a range of from 100° C. to 350° C. in one embodiment, and within a range of from 110° C. to 320° C. in another embodiment. In preparing the different grades, the paraffinic mixture is generally fractionated into cuts having narrow boiling ranges, for example, 35° C. boiling ranges. These branch paraffin/n-paraffin blends are described in, for example, U.S. Pat. No. 5,906,727.

Suitable isoparaffin-rich hydrocarbon liquids are described in, for example, U.S. Pat. No. 6,197,285, U.S. Pat. No. 3,818,105 and U.S. Pat. No. 3,439,088, and are commercially available under the tradename ISOPAR™ (ExxonMobil Chemical), some of which are summarized in Table B. Other suitable isoparaffin-rich hydrocarbon liquids are commercial available under the trade names SHELLSOL™ (Royal Dutch/Shell), SOLTROL™ (Chevron Phillips) and SASOL™ (Sasol Limited). The percentage of carbons in chain-type paraffinic structures (CP) in such liquids is close to 100% (95% or more).

TABLE A

ISOPAR™ Series Isoparaffins

| | KV @ 25° C. (cSt) | pour point (° C.) | specific gravity | flash point (° C.) | distillation range (° C.) |
|---|---|---|---|---|---|
| ISOPAR G | 1.5 | −57 | 0.75 | 106 | 161-176 |
| ISOPAR H | 1.8 | −63 | 0.76 | 127 | 178-188 |
| ISOPAR K | 1.9 | −60 | 0.76 | 131 | 179-196 |
| ISOPAR L | 2.0 | −57 | 0.77 | 144 | 188-207 |
| ISOPAR M | 3.8 | −57 | 0.79 | 198 | 223-254 |
| ISOPAR V | 14.8 | −63 | 0.82 | 266 | 272-311 |

In another embodiment the isoparaffin-rich NFP has one or more of the following properties: a distillation range (as determined by ASTM D 86) having a difference between the upper temperature and the lower temperature of 40° C. or less, preferably 30° C. or less, preferably 20° C. or less, preferably 10° C. or less, preferably between 6 and 40° C.; and or a glass transition temperature (Tg) determined by ASTM E1356 of less than 0° C., preferably less than −10° C., more preferably less than −20° C., more preferably less than −30° C., more preferably less than −50° C., or most preferably a Tg that can not be determined by ASTM E1356; and or a pour point (as determined by ASTM D 97) of −40° C. or less, preferably −50° C. or less, preferably −60° C. or less; and or a specific gravity (as determined by ASTM D 4052, 15.6/15.6° C.) of less than 0.85, preferably less than 0.84, preferably less than 0.83, preferably from 0.65 to 0.85, preferably from 0.70 to 0.84, preferably from 0.75 to 0.83, preferably from 0.800 to 0.840; and or a final boiling point (as determined by ASTM D 1160) of from 115 to 500° C., preferably from 200 to 450° C., preferably from 250 to 400° C.; and or a number average molecular weight (Mn) between 2,000 and 100 g/mol, preferably between 1500 and 150, more preferably between 1000 and 200; and or a flash point as measured by ASTM D 56 of 0 to 150° C., and or a density (ASTM D4052, 15.6° C.) of from 0.70 to 0.83 g/cm3; and or a kinematic viscosity (ASTM D445) of from 0.5 to 20 cSt at 25° C.

Polyalphaolefins

In another embodiment of the present invention, the NFP comprises a polyalphaolefin (PAO) liquid with a pour point (as measured by ASTM D 97) of −10° C. or less and a kinematic viscosity at 100° C. (measured by ASTM D 445) of 3 cSt or more. PAO liquids are described in, for example, U.S. Pat. No. 3,149,178; U.S. Pat. No. 4,827,064; U.S. Pat. No. 4,827,073; U.S. Pat. No. 5,171,908; and U.S. Pat. No. 5,783,531 and in Synthetic Lubricants and High-Performance Functional Fluids (Leslie R. Rudnick & Ronald L. Shubkin, ed. Marcel Dekker, Inc. 1999), p. 3-52.

PAO liquids can be conveniently prepared by the oligomerization of an alpha-olefin in the presence of a polymerization catalyst, such as a Friedel-Crafts catalyst (including, for example, AlCl3, BF3, and complexes of BF3 with water, alcohols, carboxylic acids, or esters), a coordination complex catalyst (including, for example, the ethylaluminum sesquichloride+TiCl4 system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one embodiment, the PAO comprises C20 to C1500 (preferably C30 to C800, more preferably C35 to C400, most preferably C40 to C250) oligomers of α-olefins. These oligomers are dimers, trimers, tetramers, pentamers, etc. of C3 to C24 (preferably C5 to C18, more preferably C6 to C14, even more preferably C8 to C12, most preferably C10) branched or linear α-olefins, provided that C3 and C4 alpha-olefins are present at 10 wt % or less. In another embodiment, the PAO comprises C3 to C24 (preferably C5 to C18, more preferably C6 to C14, most preferably C8 to C12) linear alpha-olefins (LAOs), provided that C3 and C4 LAOs are present at 10 wt % or less. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred.

In one embodiment, a single LAO is used to prepare the oligomers. In this case, a preferred embodiment involves the oligomerization of 1-decene, and the PAO is a mixture of oligomers (including, for example, dimers, trimers, tetramers, pentamers, and higher) of 1-decene. In another embodiment, the PAO comprises oligomers of two or more C3 to C 18 LAOs, to make 'bipolymer' or 'terpolymer' or higher-order copolymer combinations, provided that C3 and C4 LAOs are present at 10 wt % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In another embodiment, the PAO comprises oligomers of a single alpha-olefin species having a carbon number of 5 to 24 (preferably 6 to 18, more preferably 8 to 12, most preferably 10). In another embodiment, the NFP comprises oligomers of mixed alpha-olefins (i.e., involving two or more alpha-olefin species), each alpha-olefin having a carbon number of 3 to 24 (preferably 5 to 24, more preferably 6 to 18, most preferably 8 to 12), provided that alpha-olefins having a carbon number of 3 or 4 are present at 10 wt % or less. In a particularly preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In another embodiment, the PAO comprises oligomers of one or more alpha-olefin with repeat unit formulas of

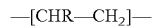

—[CHR—CH$_2$]— where R is a C3 to C18 saturated hydrocarbon branch. In a preferred embodiment, R is constant for all oligomers. In another embodiment, there is a range of R substituents covering carbon numbers from 3 to 18. Preferably, R is linear, i.e., R is (CH$_2$)nCH$_3$, where n is 3 to 17, preferably 4 to 11, and preferably 5 to 9. Optionally, R can contain one methyl or ethyl branch, i.e., R is (CH$_2$)m[CH(CH$_3$)](CH$_2$)zCH$_3$ or R is (CH$_2$)x[CH(CH$_2$CH$_3$)](CH$_2$)yCH$_3$, where (m+z) is 1 to 15, preferably 1 to 9, preferably 3 to 7, and (x+y) is 1 to 14, preferably 1 to 8, preferably 2 to 6. Preferably m>z; more preferably m is 0 to 15, more preferably 2 to 15, more preferably 3 to 12, more preferably 4 to 9; and n is 0 to 10, preferably 1 to 8, preferably 1 to 6, preferably 1 to 4. Preferably x>y; more preferably x is 0 to 14, more preferably 1 to 14, more preferably 2 to 11, more preferably 3 to 8; and y is 0 to 10, preferably 1 to 8, preferably 1 to 6, preferably 1 to 4. Preferably, the repeat units are arranged in a head-to-tail fashion with minimal heat-to-head connections.

The PAO can be atactic, isotactic, or syndiotactic. In one embodiment, the PAO has essentially the same population of meso and racemic dyads, on average, making it atactic. In another embodiment, the PAO has more than 50% (preferably more than 60%, preferably more than 70%, preferably more than 80%, preferably more than 90%) meso dyads (i.e., [m]) as measured by 13C-NMR. In another embodiment, the PAO has more than 50% (preferably more than 60%, preferably more than 70%, preferably more than 80%, preferably more than 90%) racemic dyads (i.e., [r]) as measured by 13C-NMR. In one embodiment, [m]/[r] determined by 13C-NMR is between 0.9 and 1.1 in one embodiment, [m]/[r] is greater than 1 in another embodiment, and [m]/[r] is less than 1 in yet another embodiment.

The PAO liquid can be comprised of one or more distinct PAO components. In one embodiment, the NFP is a blend of one or more PAOs with different compositions (e.g., different alpha-olefin(s) were used to make the oligomers) and/or different physical properties (e.g., kinematic viscosity, pour point, viscosity index, and/or glass transition temperature).

In one embodiment of the present invention, the PAO or blend of PAOs has a number average molecular weight of from 100 to 20,000 g/mol (preferably 300 to 15,000 g/mol, preferably 400 to 10,000 g/mol, preferably 500 to 5,000 g/mol, preferably 600 to 3,000 g/mol, preferably 600 to 1,500 g/mol).

In a preferred embodiment, the PAO or blend of PAOs has a kinematic viscosity at 100° C. of 3 cSt or more (preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In another embodiment, the PAO or blend of PAOs has a kinematic viscosity at 100° C. of 300 cSt or less (preferably 100 cSt or less). In another embodiment, the PAO has a kinematic viscosity at 100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In another embodiment, the PAO or blend of PAOs has a kinematic viscosity at 100° C. of 10 to 1000 cSt (preferably 10 to 300 cSt, preferably 10 to 100 cSt). In yet another embodiment, the PAO or blend of PAOs has a kinematic viscosity at 100° C. of about 4 to 8 cSt.

In another preferred embodiment, the PAO or blend of PAOs has a Viscosity Index of 120 or more (preferably 130 or more, preferably 140 or more, preferably 150 or more, preferably 170 or more, preferably 190 or more, preferably 200 or more, preferably 250 or more, preferably 300 or more). In another embodiment, the PAO or blend of PAOs has a viscosity Index of 120 to 350 (preferably 130 to 250).

In yet another preferred embodiment, the PAO or blend of PAOs has a pour point of −10° C. or less (preferably −20° C. or less, preferably −25° C. or less, preferably −30° C. or less, preferably −35° C. or less, preferably −40° C. or less, preferably −50° C. or less). In another embodiment, the PAO or blend of PAOs has a pour point of −15 to −70° C. (preferably −25 to −60° C.).

In yet another preferred embodiment, the PAO or blend of PAOs has a glass transition temperature (Tg) of −40° C. or less (preferably −50° C. or less, preferably −60° C. or less, preferably −70° C. or less, preferably −80° C. or less). In another embodiment, the PAO or blend of PAOs has a Tg of −50 to −120° C. (preferably −60 to −100° C., preferably −70 to −90° C.).

In yet another preferred embodiment, the PAO or blend of PAOs has a flash point of 200° C. or more (preferably 210° C. or more, preferably 220° C. or more, preferably 230° C. or more), preferably between 240° C. and 290° C.

In yet another preferred embodiment, the PAO or blend of PAOs has a specific gravity (15.6/15.6° C.) of 0.86 or less (preferably 0.855 or less, preferably 0.85 or less, preferably 0.84 or less).

Particularly preferred PAOs and blends of PAOs are those having A) a flash point of 200° C. or more (preferably 210° C. or more, preferably 220° C. or more, preferably 230° C. or more); and B) a pour point less than −20° C. (preferably less than −25° C., preferably less than −30° C., preferably less than −35°, preferably less than −40° C.) and/or a kinematic viscosity at 100° C. of 10 cSt or more (preferably 35 cSt or more, preferably 40 cSt or more, preferably 50 cSt or more).

Further preferred PAOs or blends of PAOs have a kinematic viscosity at 100° C. of at least 3 cSt (preferably at least 6 cSt, more preferably at least 8 cSt, most preferably at least 10 cSt, as measured by ASTM D445); a viscosity index of at least 120 (preferably at least 130, more preferably at least 140, most preferably at least 150, as determined by ASTM D2270); a pour point of −10° C. or less (preferably −20° C. or less, more preferably −30° C. or less, most preferably −40° C. or less, as determined by ASTM D97); and a specific gravity (15.6/15.6° C.) of 0.86 or less (preferably 0.855 or less, more preferably 0.85 or less, most preferably 0.84 or less, as determined by ASTM D 4052).

Desirable PAOs are commercially available as SpectraSyn™ and SpectraSyn Ultra™ from ExxonMobil Chemical in Houston, Tex. (previously sold under the SHF and SuperSyn™ tradenames by ExxonMobil Chemical Company), some of which are summarized in Table B. Other useful PAOs include those sold under the tradenames Synfluid™ available from ChevronPhillips Chemical Company (Pasadena, Tex.), Durasyn™ available from Innovene (Chicago, Ill.), Nexbase™ available from Neste Oil (Keilaniemi, Finland), and Synton™ available from Chemtura Corporation (Middlebury, Conn.). For PAOs, the percentage of carbons in chain-type paraffinic structures (CP) is close to 100% (typically greater than 98% or even 99%).

TABLE B

SpectraSyn ™ Series Polyalphaolefins

| | KV @ 100° C., cSt | KV @ 40° C., cSt | VI | Pour Point, ° C. | Specific gravity | Flash Point, ° C. | APHA Color |
|---|---|---|---|---|---|---|---|
| SpectraSyn 4 | 4 | 19 | 126 | −66 | 0.820 | 220 | 10 |
| SpectraSyn Plus 4 | 4 | 17 | 122 | −60 | 0.820 | 228 | 10 |
| SpectraSyn 6 | 6 | 31 | 138 | −57 | 0.827 | 246 | 10 |
| SpectraSyn Plus 6 | 6 | 30 | 140 | −54 | 0.827 | 246 | 10 |
| SpectraSyn 8 | 8 | 48 | 139 | −48 | 0.833 | 260 | 10 |
| SpectraSyn 10 | 10 | 66 | 137 | −48 | 0.835 | 266 | 10 |
| SpectraSyn 40 | 39 | 396 | 147 | −36 | 0.850 | 281 | 10 |
| SpectraSyn 100 | 100 | 1240 | 170 | −30 | 0.853 | 283 | 60 |
| SpectraSyn Ultra 150 | 150 | 1,500 | 218 | −33 | 0.850 | >265 | 10 |
| SpectraSyn Ultra 300 | 300 | 3,100 | 241 | −27 | 0.852 | >265 | 20 |
| SpectraSyn Ultra 1000 | 1,000 | 10,000 | 307 | −18 | 0.855 | >265 | 30 |

In some embodiments of the present invention, the PAO comprises oligomers of C4 olefins (including n-butene, 2-butene, isobutylene, and butadiene, and mixtures thereof) and up to 10 wt % of other olefins, having a kinematic viscosity at 100° C. of 5 to 4000 cSt and a pour point of 10 to −60° C. Such a material is referred to as a "polybutenes" liquid when the oligomers comprise isobutylene and/or 1-butene and/or 2-butene. It is commonly used as an additive for polyolefins; e.g. to introduce tack or as a processing aid. The ratio of C4 olefin isomers can vary by manufacturer and by grade, and the material can or can not be hydrogenated after synthesis. In some cases, the polybutenes liquid is a polymer of a C4 raffinate stream. In other cases, it consists essentially of polyisobutylene or poly(n-butene) oligomers. Typically, the polybutenes liquid has a number-average molecular weight of less than 15,000 g/mol, and commonly less than 5,000 g/mol or even less than 1,000 g/mol. They are described in, for example, Synthetic Lubricants and High-Performance Functional Fluids (Leslie R. Rudnick & Ronald L. Shubkin, ed., Marcel Dekker 1999), p. 357-392.

Desirable polybutenes liquids are commercially available from a variety of sources including Innovene (Indopol grades) and Infineum (C-Series grades). When the C4 olefin is exclusively isobutylene, the material is referred to as "poly-isobutylene" or PIB. Commercial sources of PIB include Texas Petrochemical (TPC Enhanced PIB grades). When the C4 olefin is exclusively 1-butene, the material is referred to as "poly-n-butene" or PNB. Properties of some liquids made from C4 olefin(s) are summarized in Table C. In general, grades with a flash point of 200° C. or more also have a pour point greater than −10° C. and/or a VI less than 120.

(preferably 8 to 150 cSt, preferably 10 to 100 cSt); a viscosity index of 120 or more (more preferably 130 or more, more preferably 140 or more); and a pour point of −20° C. or less (more preferably −30° C. or less, more preferably −40° C. or less).

High Purity Hydrocarbon Fluids

In another embodiment, the nonfunctionalized plasticizer (NFP) is a high purity hydrocarbon fluid of lubricating viscosity comprising a mixture of C20 to C120 paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant base stock or oil, which includes:

hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and hydroisomerized synthetic waxes, such as Fischer-Tropsch waxes (i.e., the high boiling point residues of Fischer-Tropsch synthesis, including waxy hydrocarbons);

or mixtures thereof. Most preferred are lubricant base stocks or oils derived from hydrocarbons synthesized in a Fischer-Tropsch process as part of an overall Gas-to-Liquids (GTL) process.

In one embodiment, the mixture of paraffins has a naphthenic content of less than 40 wt %, preferably less than 30 wt %, preferably less than 20 wt %, preferably less than 15

TABLE C

Commercial Examples of Oligomers of C4 olefin(s)

| Grade | KV @ 100° C., cSt | VI | Pour Point, ° C. | Specific gravity | Flash Point, ° C. |
|---|---|---|---|---|---|
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | +3 | 0.903 | 230 |
| Innovene Indopol H-25 | 52 | 87 | −23 | 0.869 | ~150 |
| Innovene Indopol H-50 | 108 | 90 | −13 | 0.884 | ~190 |
| Innovene Indopol H-100 | 218 | 121 | −7 | 0.893 | ~210 |
| Infineum C9945 | 11 | 74* | −34 | 0.854 | 170 |
| Infineum C9907 | 78 | 103* | −15 | 0.878 | 204 |
| Infineum C9995 | 230 | 131* | −7 | 0.888 | 212 |
| Infineum C9913 | 630 | 174* | +10 | 0.888 | 240 |

*Estimated based on the kinematic viscosity at 100° C. and 38° C.

This invention also relates to plasticized polyolefin compositions comprising one or more polyolefins, preferably polypropylene, and one or more non-functionalized plasticizers where the non-functionalized plasticizer comprises a polyalphaolefin comprising oligomers of C5 to C18 olefins (preferably C6 to C14, more preferably C8 to C12, more preferably C10); having a kinematic viscosity of 5 cSt or more at 100° C. (preferably 8 cSt or more, preferably 10 cSt or more at 100° C.); a viscosity index of 120 or more (preferably 130 or more); and a pour point of −10° C. or less (preferably −20° C. or less, preferably −30° C. or less).

This invention also relates to plasticized polypropylene compositions comprising polypropylene and one or more non-functionalized plasticizers where the non-functionalized plasticizer comprises oligomers of linear olefins having 5 to 18 carbon atoms (preferably 6 to 14 carbon atoms, more preferably 8 to 12 carbon atoms, more preferably 10 carbon atoms); a kinematic viscosity at 100° C. of 5 to 300 cSt wt %, preferably less than 10 wt %, preferably less than 5 wt %, preferably less than 2 wt %, preferably less than 1 wt % (based on the total weight of the hydrocarbon mixture); and/or a normal paraffins content of less than 5 wt %, preferably less than 4 wt %, preferably less than 3 wt %, preferably less than 1 wt % (based on the total weight of the hydrocarbon mixture); and/or an aromatic content of 1 wt % or less, preferably 0.5 wt % or less; and/or a saturates level of 90 wt % or higher, preferably 95 wt % or higher, preferably 98 wt % or higher, preferably 99 wt % or higher; and/or the percentage of carbons in chain-type paraffinic structures (CP) of 80% or more, preferably 90% or more, preferably 95% or more, preferably 98% or more; and/or a branched paraffin:normal paraffin ratio greater than about 10:1, preferably greater than 20:1, preferably greater than 50:1, preferably greater than 100:1, preferably greater than 500:1, preferably greater than 1000:1; and/or sidechains with 4 or more carbons making up less than 10% of all sidechains, preferably less than 5%, preferably less than 1%; and/or sidechains with 1 or 2 carbons making up at least 50% of all sidechains, preferably at least 60%, preferably at least 70%, preferably at least 80%, preferably at least 90%, preferably at least 95%, preferably at least 98%; and/or a sulfur content of 300 ppm or less, preferably 100 ppm or less, preferably 50 ppm or less, preferably 10 ppm or less (where ppm is on a weight basis); and/or a nitrogen content of 300 ppm or less, preferably 100 ppm or less, preferably 50 ppm or less, preferably 10 ppm or less (where ppm is on a weight basis); and/or a number-average molecular weight of 300 to 1800 g/mol, preferably 400 to 1500 g/mol, preferably 500 to 1200 g/mol, preferably 600 to 900 g/mol; and/or a kinematic viscosity at 40° C. of 10 cSt or more, preferably 25 cSt or more, preferably between about 50 and 400 cSt; and/or a kinematic viscosity at 100° C. ranging from 2 to 50 cSt, preferably 3 to 30 cSt, preferably 5 to 25 cSt, preferably 6 to 20 cSt, more preferably 8 to 16 cSt; and/or a viscosity index (VI) of 80 or greater, preferably 100 or greater, preferably 120 or greater, preferably 130 or greater, preferably 140 or greater, preferably 150 or greater, preferably 160 or greater, preferably 180 or greater; and/or a pour point of −5° C. or lower, preferably −10° C. or lower, preferably −15° C. or lower, preferably −20° C. or lower, preferably −25° C. or lower, preferably −30° C. or lower; and/or a flash point of 200° C. or more, preferably 220° C. or more, preferably 240° C. or more, preferably 260° C. or more; and/or a specific gravity (15.6° C./15.6° C.) of 0.86 or less, preferably 0.85 or less, preferably 0.84 or less; and/or an aniline point of 120° C. or more; and/or a bromine number of 1 or less.

In a preferred embodiment, the mixture of paraffins comprises a GTL base stock or oil. GTL base stocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and H2) derived from a suitable source, such as natural gas and/or coal. GTL base stocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL base stocks and oils can further comprise other hydroisomerized base stocks and base oils. Particularly preferred GTL base stocks or oils are those comprising mostly hydroisomerized F-T waxes and/or other liquid hydrocarbons obtained by a F-T synthesis process.

The synthesis of hydrocarbons, including waxy hydrocarbons, by F-T can involve any suitable process known in the art, including those involving a slurry, a fixed-bed, or a fluidized-bed of catalyst particles in a hydrocarbon liquid. The catalyst can be an amorphous catalyst, for example based on a Group VIII metal such as Fe, Ni, Co, Ru, and Re on a suitable inorganic support material, or a crystalline catalyst, for example a zeolitic catalyst. The process of making a lubricant base stock or oil from a waxy stock is characterized as a hydrodewaxing process. A hydrotreating step, while typically not required for F-T waxes, can be performed prior to hydrodewaxing if desired. Some F-T waxes can benefit from removal of oxygenates while others can benefit from oxygenates treatment prior to hydrodewaxing. The hydrodewaxing process is typically conducted over a catalyst or combination of catalysts at high temperatures and pressures in the presence of hydrogen. The catalyst can be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350, often used in conjunction with a Group VIII metal such as Pd or Pt. This process can be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL base stocks and oils, Fischer-Tropsch hydrocarbon derived base stocks and oils, and wax isomerate hydroisomerized base stocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents EP 324528, EP 532116, EP 532118, EP 537815, EP 583836, EP 666894, EP 668342, EP 776959; WPO patent applications WO 97/31693, WO 99/20720, WO 99/45085, WO 02/64710, WO 02/64711, WO 02/70627, WO 02/70629, WO 03/33320; and British Patents 1,350,257; 1,390,359; 1,429,494; and 1,440,230. Particularly favorable processes are described in European Patent Applications EP 464546 and EP 464547. Processes using Fischer-Tropsch wax feeds are described in U.S. Pat. Nos. 4,594,172; 4,943,672; 6,046,940; 6,103,099; 6,332,974; 6,375,830; and 6,475,960.

Desirable GTL-derived fluids are expected to become broadly available from several commercial sources, including Chevron, ConocoPhillips, ExxonMobil, Sasol, SasolChevron, Shell, Statoil, and Syntroleum.

This invention also relates to plasticized polyolefin compositions comprising one or more polyolefins and one or more non-functionalized plasticizers, where one or more NFP is a high purity hydrocarbon fluid derived from a GTL process comprising a mixture of paraffins of carbon number ranging from about C20 to C100, a molar ratio of isoparaffins:n-paraffins greater than about 50:1, the percentage of carbons in paraffinic structures (CP) of 98% or more, a pour point ranging from about −20 to −60° C., and a kinematic viscosity at 100° C. ranging from about 6 to 20 cSt.

As used herein, the following terms have the indicated meanings: "naphthenic" describes cyclic (mono-ring and/or multi-ring) saturated hydrocarbons (i.e., cycloparaffins) and branched cyclic saturated hydrocarbons; "aromatic" describes cyclic (mono-ring and/or multi-ring) unsaturated hydrocarbons and branched cyclic unsaturated hydrocarbons; "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and can be further hydrotreated to remove heteroatoms.

Group III Basestocks or Mineral Oils

In another embodiment, the NFP comprises a Group III hydrocarbon oil (also called a Group III lubricant basestock or Group III mineral oil). Preferably the NFP has a saturates levels of 90% or more (preferably 92% or more, preferably 94% or more, preferably 95% or more, preferably 98% or more); and a sulfur content less than 0.03% (preferably between 0.001 and 0.01%); and a VI of 120 or more (preferably 130 or more). Preferably the Group III hydrocarbon oil has a kinematic viscosity at 100° C. of 3 to 50, preferably 4 to 40 cSt, preferably 6 to 30 cSt, preferably 8 to 20; and/or a number average molecular weight of 300 to 5,000 g/mol, preferably 400 to 2,000 g/mol, more preferably 500 to 1,000 g/mol. Preferably the Group III hydrocarbon oil has a pour point of −10° C. or less, a flash point of 200° C. or more, and a specific gravity (15.6° C./15.6° C.) of 0.86 or less.

Desirable Group III basestocks are commercially available from a number of sources and include those described in Table D. The percentage of carbons in chain-type paraffinic structures (CP) in such liquids is greater than 80%.

TABLE D

Commercially available Group III Basestocks

| | KV @ 100° C., cSt | VI | Pour Point, ° C. | Specific gravity | Flash Point, ° C. |
|---|---|---|---|---|---|
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 | |
| VHVI 8[5] | 8.0 | 127 | −12 | 0.850 | 248 |
| Visom 4[6] | 4.0 | | | | 210 |
| Visom 6[6] | 6.6 | 148 | −18 | 0.836 | 250 | i) Available from ChevronTexaco (USA).
ii) Available from Neste Oil (Finland).
iii) Available from SK Corp (South Korea).
iv) Available from ConocoPhillips (USA)/S-Oil (South Korea).
v) Available from PetroCanada (Canada).
vi) Available from ExxonMobil (USA).

General Characteristics of Useful NFPs

In preferred embodiments, the NFP has a kinematic viscosity at 100° C. (KV100) of 4 cSt or more, preferably 5 cSt or more, preferably 6 to 5000 cSt, preferably 8 to 3000 cSt, preferably 10 to 1000 cSt, preferably 12 to 500 cSt, preferably 15 to 350 cSt, preferably 35 to 300 cSt, preferably 40 to 200 cSt, preferably 8 to 300 cSt, preferably 6 to 150 cSt, preferably 10 to 100 cSt, preferably less than 50 cSt, wherein a desirable range can be any combination of any lower KV100 limit with any upper KV100 limit described herein. In other embodiments, the NFP has a kinematic viscosity at 100° C. of less than 2 cSt.

In preferred embodiments, the NFP has a pour point of −10° C. or less, preferably −20° C. or less, preferably −30° C. or less, preferably −40° C. or less, preferably −45° C. or less, preferably −50° C. or less, preferably −10 to −100° C., preferably −15 to −80° C., preferably −15 to −75° C., preferably −20 to −70° C., preferably −25 to −65° C., preferably greater than −120° C., wherein a desirable range can be any combination of any lower pour point limit with any upper pour point limit described herein. In another embodiment, the NFP has a pour point of less than −30° C. when the kinematic viscosity at 40° C. is from 0.5 to 200 cSt. Most mineral oils, which typically include aromatic moieties and other functional groups, have a pour point of from 10 to −20° C. in the same kinematic viscosity range.

In a preferred embodiment, the NFP has a glass transition temperature (Tg) of −40° C. or less (preferably −50° C. or less, preferably −60° C. or less, preferably −70° C. or less, preferably −80° C. or less, preferably −45 to −120° C., preferably −65 to −90° C., wherein a desirable range can be any combination of any lower Tg limit with any upper Tg limit described herein.

In preferred embodiments, the NFP has a Viscosity Index (VI) of 90 or more, preferably 100 or more, preferably 110 or more, preferably 120 or more, preferably 130 or more, preferably 115 to 350, preferably 135 to 300, preferably 140 to 250, preferably 150 to 200, preferably 125 to 180, wherein a desirable range can be any combination of any lower VI limit with any upper VI limit described herein.

In preferred embodiments, the NFP has a flash point of 200° C. or greater, preferably 210° or greater, preferably 230° C. or greater, preferably 200 to 350° C., preferably 210 to 300° C., preferably 215 to 290° C., preferably 220 to 280° C., preferably 240 to 280° C., wherein a desirable range can be any combination of any lower flash point limit with any upper flash point limit described herein.

In preferred embodiments, the NFP has a specific gravity of 0.86 or less, preferably 0.855 or less, preferably 0.84 or less, preferably 0.78 to 0.86, preferably 0.79 to 0.855, preferably 0.80 to 0.85, preferably 0.81 to 0.845, preferably 0.82 to 0.84, wherein a desirable range can be any combination of any lower specific gravity limit with any upper specific gravity limit described herein.

In preferred embodiments, the NFP has a number-average molecular weight (Mn) of 250 g/mol or more, preferably 300 g/mol or more, preferably 500 g/mol or more, preferably 300 to 21,000 g/mol, preferably 300 to 10,000 g/mol, preferably 400 to 5,000 g/mol, preferably 500 to 3,000 g/mol, preferably 10 kg/mol or less, preferably 5 kg/mol or less, preferably 3 kg/mol or less, preferably 2 kg/mol or less, preferably 1 kg/mol or less, wherein a desirable range can be any combination of any lower Mn limit with any upper Mn limit described herein.

In preferred embodiments, the NFP has a low degree of color, such as typically identified as "water white", "prime white", "standard white", or "bright and clear," preferably an APHA color of 100 or less, preferably 80 or less, preferably 60 or less, preferably 40 or less, preferably 20 or less, as determined by ASTM D1209.

In other embodiments, any NFP can have an initial boiling point (ASTM D1160) of from 300 to 600° C. in one embodiment, and from 350 to 500° C. in another embodiment, and greater than 400° C. in yet another embodiment.

Any of the NFP's for use in the present invention can be described by any embodiment described herein, or any combination of the embodiments described herein. For example, in one embodiment, the NFP is a C6 to C200 paraffin having a pour point of less than −25° C. Alternately, the NFP comprises an aliphatic hydrocarbon having a kinematic viscosity of from 0.1 to 1000 cSt at 100° C. Alternately, the NFP is selected from isoparaffins and PAOs and blends thereof having from 8 to 25 carbon atoms. In another embodiment, the NFP of the present invention comprises C25 to C1500 paraffins, and C30 to C500 paraffins in another embodiment, and has a flash point of 200° C. or more and a pour point of −10° C. or less and a viscosity index of 120 or more. Alternately the NFP comprises C25 to C1500 paraffins, preferably C30 to C500 paraffins, and has a flash point of 200° C. or more and a pour point of −20° C. or less. Alternately the NFP comprises C25 to C1500 paraffins, preferably C30 to C500 paraffins, and has a flash point of 200° C. or more and a kinematic viscosity at 100° C. of 35 cSt or more. In another embodiment, the NFP consists essentially of C35 to C300 paraffins, preferably the NFP consists essentially of C40 to C250 paraffins, and has a flash point of 200° C. or more and a pour point of −10° C. or less and a viscosity index of 120 or more. Alternately the NFP consists essentially of C35 to C300 paraffins, preferably C40 to C250 paraffins, and has a flash point of 200° C. or more and a pour point of −20° C. or less. Alternately the NFP consists essentially of C35 to C300 paraffins, preferably C40 to C250 paraffins, and has a flash point of 200° C. or more and a kinematic viscosity at 100° C. of 35 cSt or more. Alternately the NFP has a flash point of 200° C. or more and a pour point of −20° C. or less. Alternately the NFP has a flash point of 200° C. or more and a kinematic viscosity at 100° C. of 35 cSt or more.

In a preferred embodiment, any NFP described herein has a flash point of 200° C. or more (preferably 210° C. or more) and a pour point of −20° C. or less (preferably −25° C. or less, more preferably −30° C. or less, more preferably −35° C. or less, more preferably −45° C. or less, more preferably −50° C. or less).

In another preferred embodiment, the NFP has a flash point of 220° C. or more (preferably 230° C. or more) and a pour point of −10° C. or less (preferably −25° C. or less, more preferably −30° C. or less, more preferably −35° C. or less, more preferably −45° C. or less, more preferably −50° C. or less).

In another preferred embodiment, the NFP has a kinematic viscosity at 100° C. of 35 cSt or more (preferably 40 cSt or more, preferably 50 cSt or more, preferably 60 cSt or more) and a specific gravity (15.6/15.6° C.) of 0.87 or less (preferably 0.865 or less, preferably 0.86 or less, preferably 0.855 or less) and a flash point of 200° C. or more (preferably 230° C. or more).

In another preferred embodiment, the NFP has a) a flash point of 200° C. or more, b) a specific gravity of 0.86 or less, and c1) a pour point of −10° C. or less and a viscosity index of 120 or more, or c2) a pour point of −20° C. or less, or c3) a kinematic viscosity at 100° C. of 35 cSt or more.

In another preferred embodiment, the NFP has a specific gravity (15.6/15.6° C.) of 0.85 or less (preferably between 0.80 and 0.85) and a kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or a number-average molecular weight (Mn) of at least 280 g/mol.

In another preferred embodiment, the NFP has a specific gravity (15.6/15.6° C.) of 0.86 or less (preferably between 0.81 and 0.855, preferably between 0.82 and 0.85) and a kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more) and/or a number-average molecular weight (Mn) of at least 420 g/mol.

In another preferred embodiment, the NFP has a specific gravity (15.6/15.6° C.) of 0.87 or less (preferably between 0.82 and 0.87) and a kinematic viscosity at 100° C. of 10 cSt or more (preferably 12 cSt or more, preferably 14 cSt or more, preferably 16 cSt or more, preferably 20 cSt or more, preferably 30 cSt or more, preferably 40 cSt or more) and/or a number-average molecular weight (Mn) of at least 700 g/mol.

In another preferred embodiment, the NFP has a specific gravity (15.6/15.6° C.) of 0.88 or less (preferably 0.87 or less, preferably between 0.82 and 0.87) and a kinematic viscosity at 100° C. of 15 cSt or more (preferably 20 cSt or more, preferably 25 cSt or more, preferably 30 cSt or more, preferably 40 cSt or more) and/or a number-average molecular weight (Mn) of at least 840 g/mol.

In another preferred embodiment the NFP has a kinematic viscosity at 100° C. of 3 to 3000 cSt, preferably 6 to 300 cSt, more preferably 8 to 100 cSt; and a number average molecular weight (Mn) of 300 to 21,000 g/mol, preferably 500 to 5,000 g/mol, more preferably 600 to 3,000 g/mol.

In another preferred embodiment the NFP has a kinematic viscosity at 100° C. of 3 to 500 cSt, preferably 6 to 200 cSt, more preferably 8 to 100 cSt, more preferably 3 to 25 cSt; and a number average molecular weight (Mn) of 300 to 10,000 g/mol, preferably 400 to 5,000 g/mol, more preferably 500 to 2,500 g/mol, more preferably 300 to 1,200 g/mol.

In another preferred embodiment the NFP has a kinematic viscosity at 100° C. of 3 to 100 cSt, preferably 4 to 50 cSt, more preferably 6 to 25 cSt, more preferably 3 to 15 cSt; and a number average molecular weight (Mn) of 300 to 3,000 g/mol, preferably 350 to 2,000 g/mol, more preferably 400 to 1,000 g/mol, more preferably 300 to 800 g/mol.

In another preferred embodiment, the NFP has a pour point of −25° C. or less, preferably between −30° C. and −90° C., and a kinematic viscosity in the range of from 20 to 5000 cSt at 40° C. In another preferred embodiment, the NFP has a pour point of −25° C. or less and a Mn of 400 g/mol or greater. Most mineral oils, which typically include functional groups, have a pour point of from 10° C. to −25° C. at the same viscosity and molecular weight ranges.

In another preferred embodiment the NFP has kinematic viscosity at 100° C. of 3 cSt or greater, preferably 6 cSt or greater, more preferably 8 cSt or greater, and one or more of the following properties:

a pour point of −10° C. or less, preferably −20° C. or less, preferably −30° C. or less, preferably −40° C. or less; and/or, a Viscosity Index of 120 or greater; and/or, a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less as determined by ASTM D1209; and/or a flash point of 200° C. or more, preferably 220° C. or more, preferably 240° C. or more; and/or a specific gravity (15.6° C.) of less than 0.86.

Most mineral oils at the same viscosity range have a pour point greater than −20° C. or an APHA color of greater than 20 or a specific gravity (15.6° C.) of 0.86 or more.

In another preferred embodiment, the NFP has a Viscosity Index of 120 or more and one or more of the following properties: a pour point of −10° C. or less, preferably −20° C. or less, preferably −30° C. or less, preferably −40° C. or less; and/or, a kinematic viscosity at 100° C. of 3 cSt or greater, preferably 6 cSt or greater, preferably 8 cSt or greater, preferably 10 cSt or greater; and/or, a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less, as determined by ASTM D1209; and/or a flash point of 200° C. or more, preferably 220° C. or more, preferably 240°

C. or more; and/or a specific gravity (15.6° C.) of less than 0.86.

Most mineral oils have a Viscosity Index of less than 120.

In another preferred embodiment, the NFP has a pour point of −20° C. or less, preferably −30° C. or less, and one or more of the following properties: a kinematic viscosity at 100° C. of 3 cSt or greater, preferably 6 cSt or greater, preferably 8 cSt or greater, preferably 10 cSt or more; and/or, a Viscosity Index of 120 or greater, preferably 130 or greater; and/or, a low degree of color, such as typically identified as "water white", "prime white", "standard white", or "bright and clear," preferably APHA color of 100 or less, preferably 80 or less, preferably 60 or less, preferably 40 or less, preferably 20 or less, preferably 15 or less as determined by ASTM D 1209; a flash point of 200° C. or more, preferably 220° C. or more, preferably 240° C. or more; and/or a specific gravity (15.6° C.) of less than 0.86.

Most mineral oils have a kinematic viscosity at 100° C. of less than 6 cSt, or an APHA color of greater than 20, or a flash point less than 200° C. when their pour point is less than −20° C.

In another preferred embodiment the NFP has a glass transition temperature (Tg) that cannot be determined by ASTM E 1356 or, if it can be determined, then the Tg according to ASTM E 1356 is less than 0° C., preferably less than −10° C., more preferably less than −20° C., more preferably less than −30° C., more preferably less than −40° C., and, preferably, also has one or more of the following properties: an initial boiling point as determined by ASTM D 1160 greater than 300° C., preferably greater than 350° C., preferably greater than 400° C.; and/or a pour point of −10° C. or less, preferably −15° C. or less, preferably −25° C. or less, preferably −35° C. or less, preferably −45° C. or less; and/or a specific gravity (ASTM D 4052, 15.6/15.6° C.) of less than 0.88, preferably less than 0.86, preferably less than 0.84, preferably from 0.80 to 0.88, preferably from 0.82 to 0.86; and/or a final boiling point as determined by ASTM D1160 of from 300° C. to 800° C., preferably from 400° C. to 700° C., preferably greater than 500° C.; and/or a weight average molecular weight (Mw) between 30,000 and 400 g/mol preferably between 15,000 and 500 g/mol, more preferably between 5,000 and 600 g/mol; and/or a number average molecular weight (Mn) between 10,000 and 400 g/mol, preferably between 5,000 and 500 g/mol, more preferably between 2,000 and 600 g/mol; and/or a flash point as measured by ASTM D 92 of 200° C. or greater; and/or a specific gravity (15.6° C.) of less than 0.86.

In certain particularly preferred embodiments, the NFP has a specific gravity of 0.86 or less (preferably 0.855 or less, preferably 0.85 or less), and one or more of the following: a VI of 120 or more (preferably 135 or more, preferably 140 or more), and/or a flash point of 200° C. or more (preferably 220° C. or more, preferably 240° C. or more).

In certain particularly preferred embodiments, the NFP has a pour point of −10° C. or less (preferably −15° C. or less, preferably −20° C. or less, preferably −25° C. or less), a VI of 120 or more (preferably 135 or more, preferably 140 or more), and optionally a flash point of 200° C. or more (preferably 220° C. or more, preferably 240° C. or more).

In certain particularly preferred embodiments, the NFP has a pour point of −20° C. or less (preferably −25° C. or less, preferably −30° C. or less, preferably −40° C. or less) and one or more of the following: a flash point of 200° C. or more (preferably 220° C. or more, preferably 240° C. or more), and/or a VI of 120 or more (preferably 135 or more, preferably 140 or more), and/or a KV100 of 4 cSt or more (preferably 6 cSt or more, preferably 8 cSt or more, preferably 10 cSt or more), and/or a specific gravity of 0.86 or less (preferably 0.855 or less, preferably 0.85 or less).

In certain particularly preferred embodiments, the NFP has a KV100 of 4 cSt or more (preferably 5 cSt or more, preferably 6 cSt or more, preferably 8 cSt or more, preferably 10 cSt or more), a specific gravity of 0.86 or less (preferably 0.855 or less, preferably 0.85 cSt or less), and a flash point of 200° C. or more (preferably 220° C. or more, preferably 240° C. or more).

In a preferred embodiment, the NFP has a flash point of 200° C. or more (preferably 220° C. or more, preferably 240° C. or more), a pour point of −10° C. or less (preferably −15° C. or less, preferably −20° C. or less, preferably −25° C. or less), a specific gravity of 0.86 or less (preferably 0.855 or less, preferably 0.85 or less), a KV100 of 4 cSt or more (preferably 5 cSt or more, preferably 6 cSt or more, preferably 8 cSt or more, preferably 10 cSt or more), and optionally a VI of 100 or more (preferably 120 or more, preferably 135 or more).

In a preferred embodiment, the NFP has a KV100 of 35 cSt or more (preferably 40 or more) and a specific gravity of 0.86 or less (preferably 0.855 or less), and optionally one or more of the following: a flash point of 200° C. or more (preferably 220° C. or more, preferably 240° C. or more), and/or a pour point of −10° C. or less (preferably −15° C. or less, preferably −20° C. or less, preferably −25° C. or less).

In a preferred embodiment, the NFP has a flash point of 200° C. or more (preferably 210° C. or more, preferably 220° C. or more), a pour point of −10° C. or less (preferably −20° C. or less, preferably −30° C. or less), and a KV100 of 6 cSt or more (preferably 8 cSt or more, preferably 10 cSt or more, preferably 15 cSt or more).

In a preferred embodiment, the NFP has a pour point of −40° C. or less (preferably −50° C. or less) and a specific gravity of 0.84 or less (preferably 0.83 or less).

In a preferred embodiment, the percentage of carbons in chain-type paraffins (CP) for any NFP is at least 80% (preferably at least 85%, more preferably at least 90%, even more preferably at least 95%, even more preferably at least 98%, most preferably at least 99%).

Preferred compositions of the present invention can be characterized in that the glass transition temperature (Tg) of the composition decreases by at least 1° C. (preferably at least 2° C., preferably at least 3° C., preferably at least 4° C., preferably at least 5° C., preferably at least 6° C., preferably at least 7° C., preferably at least 8° C., preferably at least 9° C., preferably at least 10° C.) for every 1 wt % of NFP present in the composition, while the peak melting and crystallization temperatures of the polyolefin remain within 5° C. (preferably within 4° C., preferably within 3° C., preferably within 2° C.) of their values for the unplasticized polyolefin.

Preferred compositions of the present invention can be characterized in that the glass transition temperature (Tg) of the plasticized composition is at least 2° C. (preferably at least 4° C., preferably at least 6° C., preferably at least 8° C., preferably at least 10° C., preferably at least 12° C., preferably at least 15° C., preferably at least 20° C., preferably at least 25° C., preferably at least 30° C.) lower than that of the unplasticized polyolefin, while the peak melting and crystallization temperatures of the polyolefin remain within 5° C. (preferably within 4° C., preferably within 3° C., preferably within 2° C.) of their values for the unplasticized polyolefin.

Preferred compositions of the present invention can be characterized in that the glass transition temperature (Tg) of at least one propylene polymer in the composition decreases by at least 1° C. (preferably at least 2° C., preferably at least 3° C., preferably at least 4° C., preferably at least 5° C., preferably at least 6° C., preferably at least 7° C., preferably at least 8° C., preferably at least 9° C., preferably at least 10°

C.) for every 1 wt % of NFP present in the composition, while the peak melting and crystallization temperatures of the polyolefin remain within 5° C. (preferably within 4° C., preferably within 3° C., preferably within 2° C.) of their values for the unplasticized polyolefin.

Preferred compositions of the present invention can be characterized in that the glass transition temperature (Tg) of at least one propylene polymer in the plasticized composition is at least 2° C. (preferably at least 4° C., preferably at least 6° C., preferably at least 8° C., preferably at least 10° C., preferably at least 12° C., preferably at least 15° C., preferably at least 20° C., preferably at least 25° C., preferably at least 30° C.) lower than that of the unplasticized polyolefin, while the peak melting and crystallization temperatures of the polyolefin remain within 5° C. (preferably within 4° C., preferably within 3° C., preferably within 2° C.) of their values for the unplasticized polyolefin.

Preferred compositions of the present invention can be characterized in that the plasticized composition decreases less than 3% (preferably less than 2%, preferably less than 1%) in weight when permanence of the NFP is determined by ASTM D1203 (0.25 mm thick sheet, 300 hours in dry 70° C. oven). Weight loss here refers to the reduction in weight in excess of that measured for the unplasticized composition under the same test conditions.

Preferred NFP's of this invention are characterized in that, when blended with the polyolefin to form a plasticized composition, the NFP is miscible with the polyolefin as indicated by no change in the number of tan-delta peaks in the Dynamic Mechanical Thermal Analysis (DMTA) trace as compared to the unplasticized polyolefin DMTA trace (the "trace" is the plot of tan-delta vs temperature). Lack of miscibility is indicated by an increase in the number of tan-delta peaks in DMTA trace over those in the unplasticized polyolefin.

For purpose of this invention and the claims thereto, unless otherwise noted, the following tests shown in Tables E-G should be used for the indicated property:

TABLE E

| Polyolefin Characterization Test Methods | |
|---|---|
| Melt Index (MI) | ASTM D 1238 (190° C./2.16 kg) |
| Melt Flow Rate (MFR) | ASTM D 1238 (230° C./2.16 kg) |
| Density | ASTM D 1505 |
| Glass Transition Temperature ($T_g$) | DMTA (see Experimental Methods) |
| Melting Point ($T_m$) | DSC (see Experimental Methods) |
| Crystallization Point ($T_c$) | DSC (see Experimental Methods) |
| Heat of Fusion ($H_f$) | DSC (see Experimental Methods) |
| % Crystallinity | DSC (see Experimental Methods) |
| $M_n$ and $M_w$ | SEC-3D (see Experimental Methods) |
| Branching Index (g') | SEC-3D (see Experimental Methods) |
| Intrinsic Viscosity | ASTM D 1601 (135° C. in decalin) |

TABLE F

| Mechanical Property Test Methods | |
|---|---|
| Tensile Properties | ASTM D 638 |
| Heat Deflection Temperature | ASTM D 648 (66 psi) |
| Vicat Softening Temperature | ASTM D 1525 (200 g) |
| Gardner Impact Strength | ASTM D 5420 |
| Izod Impact Strength | ASTM D 256 (A) |
| 1% Secant Flexural Modulus | ASTM D 790 (A) |
| Rockwell Hardness | ASTM D 785 (R scale) |

TABLE G

| Physical Property Test Methods | |
|---|---|
| Kinematic Viscosity (KV) | ASTM D 445 |
| Viscosity Index (VI) | ASTM D 2270 |
| Pour Point | ASTM D 97 |
| Specific Gravity and Density | ASTM D 4052 (15.6/15.6° C.) |
| Flash Point | ASTM D 92 |
| Mn | GC (if KV100 of 10 cSt or less) or GPC (if KV100 is more than 10 cSt) (see Experimental Methods) |
| Glass Transition Temperature (Tg) | ASTM 1356 |
| Branch Paraffin: N-paraffin ratio | 13C-NMR (see Experimental Methods) |
| Wt % mono-methyl species | 13C-NMR (see Experimental Methods) |
| % side chains with X number of carbons | 13C-NMR (see Experimental Methods) |
| Boiling/Distillation Range | ASTM D 1160 |
| Carbon Type Composition (CA, CN, CP) | ASTM D 2140 (see Experimental Methods) |
| Saturates Content | ASTM D 2007 |
| Sulfur Content | ASTM D 2622 |
| Nitrogen Content | ASTM D 4629 |
| Bromine Number | ASTM D 1159 (or ASTM D 2710 if so directed by ASTM D 1159) |
| Aniline Point | ASTM D 611 |
| Color | ASTM D 1209 (APHA Color) |

Selectively Hydrogenated Block Copolymers

The selectively hydrogenated block copolymers according to the present invention can be characterized as having: (i) terminal polymeric blocks of a vinyl aromatic monomer; and (ii) a central polymeric block which can be obtained by preparing the block copolymer using an olefin, preferably a conjugated diolefin, and subsequently selectively hydrogenating said central polymeric block.

In a preferred embodiment the end-blocks of these copolymers are polymer blocks of styrene. Other vinyl aromatic hydrocarbons, including alphamethyl styrene, various alkyl-substituted styrenes, alkoxy-substituted styrenes, vinyl naphthalene, vinyl toluene and the like, can be substituted for styrene.

The midblock is at least one olefin, preferably a conjugated diolefin which is subsequently hydrogenated. By "subsequently hydrogenated" is meant that the conjugated diolefin midblock is selectively hydrogenated after incorporation into the polymer. Suitable hydrogenated block copolymers can be prepared by techniques per se well-known in the art, such as those described in the aforementioned U.S. Pat. No. 4,904,731, and references incorporated therein. A particularly preferred midblock comprises, consists essentially of, or consists of ethylene/butene-1 copolymer or ethylene/propylene copolymer.

In addition to selectively hydrogenated SEBS, other block copolymers which can be selectively hydrogenated to provide useful components include SIS (styrene-isoprene-styrene), SBS (styrene-butadiene-styrene), and star-branched SIS and SBS compounds, all of which are per se well-known in the art.

In an embodiment, block copolymers which can be hydrogenated to form the hydrogenated block copolymers useful as midblocks in the polymeric composition of this invention will have the following general formula: Bx-(A-B)y-Az, where A is a poly(monoalkenyl) block and B is a poly(conjugated diene) block; x and z are, independently, integers equal to 0 or 1; y is a whole number from 1 to about 25; provided, however, that z+y≧2.

In general, while not critical to the characterization, each polymeric block A can have the same or a different weight average molecular weight within the range from about 4,000 to about 50,000 and each polymeric block B can have the same or a different weight average molecular weight within the range from about 10,000 to about 200,000. In a preferred embodiment, each polymeric block A will have approximately the same weight average molecular weight within the range from about 5,000 to about 10,000 and each polymeric block B will have approximately the same weight average molecular weight within the range from about 25,000 to about 100,000.

In general, the block copolymers useful in the present invention can be hydrogenated using any of the methods known in the prior art to be suitable for such hydrogenation. In an embodiment, the conditions used to hydrogenate the block copolymers useful in this invention can be selected to insure that at least 50%, preferably at least 80% and most preferably at least 95% of the ethylenic unsaturation remaining in the conjugated diolefin polymer blocks after preparation is saturated as a result of the hydrogenation. The hydrogenation conditions will also be selected so as to insure that less than 20%, preferably less than 10% and most preferably less than 5% of the aromatic unsaturation in the monoalkenyl aromatic hydrocarbon polymer blocks is hydrogenated. Suitable hydrogenation methods are well-known in the art, such as discussed in the aforementioned U.S. Pat. No. 4,904,731 (as well as numerous other references such as Statutory Invention Registration US H1956 H), and the aforementioned conditions can be selected by one of ordinary skill in the art in possession of this disclosure.

Specific examples of selectively hydrogenated block copolymers useful in the present invention include the KRATON® G polymers commercially available from Shell.

Polypropylene

The polypropylene component of the blend is selected from polypropylene homopolymer, polypropylene copolymers, and blends thereof. The homopolymer can be atactic polypropylene, isotactic polypropylene, syndiotactic polypropylene and blends thereof. The copolymer can be a random copolymer, a statistical copolymer, a block copolymer, and blends thereof. In a preferred embodiment the polypropylene is at least one atactic homopolymer or copolymer of propylene.

As used herein, the term "polypropylene" means a polymer made of at least 50% propylene units, preferably at least 70% propylene units, more preferably at least 80% propylene units, even more preferably at least 90% propylene units, even more preferably at least 95% propylene units or 100% propylene units.

The method of making the polypropylene is not critical, as it can be made by slurry, solution, gas phase or other suitable processes, and by using catalyst systems appropriate for the polymerization of polyolefins, such as Ziegler-Natta-type catalysts, metallocene-type catalysts, other appropriate catalyst systems or combinations thereof.

In a preferred embodiment the propylene is a homopolymer or copolymer made using Zeigler Natta catalysts. In another embodiment the propylene polymers are made using metallocene catalysts. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts,* 100 CHEM. REV. 1253-1345 (2000); and I, II METALLOCENE-BASED POLYOLEFINS (Wiley & Sons 2000).

It will be recognized by one of ordinary skill in the art that other preferred embodiments include combinations of embodiments specified herein, e.g., for the polypropylene, a preferred embodiment includes an atactic propylene homopolymer made using a Zeigler Natta catalyst.

Preferred propylene homopolymers and copolymers useful in this invention typically can also be described by one or more of the following characteristics: (a) an Mw of 30,000 to 2,000,000 g/mol preferably 50,000 to 1,000,000, more preferably 90,000 to 500,000, as measured by GPC as described below in the test methods; (b) an Mw/Mn of 1 to 40, preferably 1.6 to 20, more preferably 1.8 to 10, more preferably 1.8 to 3 as measured by GPC as described below in the test methods; (c) a Tm (second melt) of 30 to 200° C., preferably 30 to 185° C., preferably 50 to 175, more preferably 60 to 170 as measured by the DSC method described below in the test methods; (d) a crystallinity of 5 to 80%, preferably 10 to 70, more preferably 20 to 60% as measured by the DSC method described below in the test methods; (e) a glass transition temperature (Tg) of −40° C. to 20° C., preferably −20° C. to 10° C., more preferably −10° C. to 5° C. as measured by the DMTA method described below in the test methods; (f) a heat of fusion (Hf) of 180 J/g or less, preferably 20 to 150 J/g, more preferably 40 to 120 J/g as measured by the DSC method described below in the test methods; (g) a crystallization temperature (Tc) of 15 to 120° C., preferably 20 to 115° C., more preferably 25 to 110° C., preferably 60 to 145° C., as measured by the method described below in the test methods; (h) a heat deflection temperature of 45 to 140° C., preferably 60 to 135° C., more preferably 75 to 125° C. as measured by the method described below in the test methods; (i) a Rockwell hardness (R scale) of 25 or more, preferably 40 or more, preferably 60 or more, preferably 80 or more, preferably 100 or more, preferably from 25 to 125; (j) a percent crystallinity of at least 30%, preferably at least 40%, alternatively at least 50%, as measured by the method described below in the test methods; (k) a percent amorphous content of at least 50%, alternatively at least 60%, alternatively at least 70%, even alternatively between 50 and 95%, or 70% or less, preferably 60% or less, preferably 50% or less as determined by subtracting the percent crystallinity from 100; and (l) a branching index (g') of 0.2 to 2.0, preferably 0.5 to 1.5, preferably 0.7 to 1.1, as measured by the method described below.

In an embodiment, the polypropylene is a propylene homopolymer. In one preferred embodiment the propylene homopolymer has a molecular weight distribution (Mw/Mn) of up to 40, preferably ranging from 1.5 to 10, and from 1.8 to 7 in another embodiment, and from 1.9 to 5 in yet another embodiment, and from 2.0 to 4 in yet another embodiment. In another embodiment the propylene homopolymer has a Gardner impact strength, tested on 0.125 inch disk at 23° C., that can range from 20 in-lb to 1000 in-lb in one embodiment, and from 30 in-lb to 500 in-lb in another embodiment, and from 40 in-lb to 400 in-lb in yet another embodiment. In yet another embodiment, the 1% secant flexural modulus can range from 100 MPa to 2300 MPa, and from 200 MPa to 2100 MPa in another embodiment, and from 300 MPa to 2000 MPa in yet another embodiment, wherein a desirable polypropylene can exhibit any combination of any upper flexural modulus limit with any lower flexural modulus limit. The melt flow rate (MFR) (ASTM D 1238, 230° C., 2.16 kg) of preferred propylene polymers range from 0.1 dg/min to 2500 dg/min in one embodiment, and from 0.3 to 500 dg/min in another embodiment.

In an embodiment, the polypropylene homopolymer or propylene copolymer useful in the present invention has some level of isotacticity. Thus, in one embodiment, a polypropylene comprising isotactic polypropylene is a useful polymer in the invention of this patent, and similarly, highly isotactic polypropylene is useful in another embodiment. As used herein, "isotactic" is defined as having at least 10% isotactic pentads according to analysis by $^{13}$C-NMR as described in the test methods below. As used herein, "highly isotactic" is defined as having at least 60% isotactic pentads according to analysis by $^{13}$C-NMR. In a desirable embodiment, the polypropylene is a polypropylene homopolymer having at least 85% isotacticity, and at least 90% isotacticity in yet another embodiment.

In another embodiment, the polypropylene comprises a polypropylene homopolymer having at least 85% syndiotacticity, and at least 90% syndiotacticity in yet another embodiment. As used herein, "syndiotactic" is defined as having at least 10% syndiotactic pentads according to analysis by $^{13}$C-NMR as described in the test methods below. As used herein, "highly syndiotactic" is defined as having at least 60% syndiotactic pentads according to analysis by $^{13}$C-NMR.

In another embodiment the polypropylene comprises a propylene homopolymer that is isotactic, highly isotactic, syndiotactic, highly syndiotactic, atactic, or mixtures thereof Atactic polypropylene is defined to be less than 10% isotactic or syndiotactic pentads. Preferred atactic polypropylenes typically have an Mw of 20,000 up to 1,000,000.

Preferred propylene polymers that are useful in this invention include those sold under the tradenames ACHIEVE™ and ESCORENE™ by ExxonMobil Chemical Company in Houston, Tex.

In another embodiment of the invention, the polypropylene is a propylene copolymer, either random, or block, of propylene derived units and units selected from ethylene and $C_4$ to $C_{20}$ α-olefin derived units, typically from ethylene and $C_4$ to $C_{10}$ α-olefin derived units in another embodiment. The ethylene or $C_4$ to $C_{20}$ α-olefin derived units are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_4$ to $C_{20}$ α-olefin derived units in any combination of any upper wt % limit with any lower wt % limit described herein. The propylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 in yet another embodiment, wherein a desirable copolymer can comprise any upper molecular weight limit with any lower molecular weight limit described herein.

Particularly desirable propylene copolymers have a molecular weight distribution (Mw/Mn) ranging from 1.5 to 10, and from 1.6 to 7 in another embodiment, and from 1.7 to 5 in yet another embodiment, and from 1.8 to 4 in yet another embodiment. The Gardner impact strength, tested on 0.125 inch disk at 23° C., of the propylene copolymer can range from 20 in-lb to 1000 in-lb in one embodiment, and from 30 in-lb to 500 in-lb in another embodiment, and from 40 in-lb to 400 in-lb in yet another embodiment. In yet another embodiment, the 1% secant flexural modulus of the propylene copolymer ranges from 100 MPa to 2300 MPa, and from 200 MPa to 2100 MPa in another embodiment, and from 300 MPa to 2000 MPa in yet another embodiment, wherein a desirable polypropylene can exhibit any combination of any upper flexural modulus limit with any lower flexural modulus limit. The melt flow rate (MFR) (ASTM D 1238, 230° C., 2.16 kg) of propylene copolymer ranges from 0.1 dg/min to 2500 dg/min in one embodiment, and from 0.3 to 500 dg/min in another embodiment.

In another embodiment the polypropylene can be a propylene copolymer comprising propylene and one or more other monomers selected from the group consisting of ethylene and $C_4$ to $C_{20}$ linear, branched or cyclic monomers, and in some embodiments is a $C_4$ to $C_{12}$ linear or branched alpha-olefin, preferably butene, pentene, hexene, heptene, octene, nonene, decene, dodecene, 4-methyl-pentene-1,3-methyl pentene-1, 3,5,5-trimethyl-hexene-1, and the like. The monomers can be present at up to 50 weight %, preferably from 0 to 40 weight %, more preferably from 0.5 to 30 weight %, more preferably from 2 to 30 weight %, more preferably from 5 to 20 weight %.

Preferred linear alpha-olefins useful as comonomers for the propylene copolymers useful in this invention include $C_3$ to $C_8$ alpha-olefins, more preferably 1-butene, 1-hexene, and 1-octene, even more preferably 1-butene. Preferred linear alpha-olefins useful as comonomers for the butene copolymers useful in this invention include $C_3$ to $C_8$ alpha-olefins, more preferably propylene, 1-hexene, and 1-octene, even more preferably propylene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to C1 to C10 alkyl groups. Additionally two adjacent substitutions can be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non-aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure can also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

In another embodiment the propylene component comprises a random copolymer, also known as an "RCP," comprising propylene and up to 20 mole % of ethylene or a $C_4$ to $C_{20}$ olefin, preferably up to 20 mole % ethylene.

In another embodiment, the polypropylene component comprises an impact copolymer (ICP) or block copolymer. Propylene impact copolymers are commonly used in a variety of applications where strength and impact resistance are desired such as molded and extruded automobile parts, household appliances, luggage and furniture. Propylene homopolymers alone are often unsuitable for such applications because they are too brittle and have low impact resistance particularly at low temperature, whereas propylene impact copolymers are specifically engineered for applications such as these.

A typical propylene impact copolymer contains at least two phases or components, e.g., a homopolymer component and a copolymer component. The impact copolymer can also comprise three phases such as a PP/EP/PE combination with the PP continuous and a dispersed phase with EP outside and PE inside the dispersed phase particles. These components are usually produced in a sequential polymerization process wherein the homopolymer produced in a first reactor is transferred to a second reactor where copolymer is produced and incorporated within the matrix of the homopolymer component. The copolymer component has rubbery characteristics and provides the desired impact resistance, whereas the homopolymer component provides overall stiffness.

Another important feature of ICP's is the amount of amorphous polypropylene they contain. In certain embodiments, it is useful to characterize ICPs according to the invention as having low amorphous polypropylene, preferably less than 3% by weight, more preferably less than 2% by weight, even more preferably less than 1% by weight and most preferably there is no measurable amorphous polypropylene. Percent amorphous polypropylene is determined by the method described below.

Preferred impact copolymers can be a reactor blend (in situ blend) or a post reactor (ex-situ) blend. In one embodiment, a suitable impact copolymer comprises from 40% to 95% by weight Component A and from 5% to 60% by weight Component B based on the total weight of the impact copolymer; wherein Component A comprises propylene homopolymer or copolymer, the copolymer comprising 10% or less by weight ethylene, butene, hexene or octene comonomer; and wherein Component B comprises propylene copolymer, wherein the copolymer comprises from 5% to 70% by weight ethylene, butene, hexene and/or octene comonomer, and from about 95% to about 30% by weight propylene. In one embodiment of the impact copolymer, Component B consists essentially of propylene and from about 30% to about 65% by weight ethylene. In another embodiment, Component B comprises ethylene-propylene copolymers, ethylene-propylene-diene terpolymers, ethylene-acrylate copolymers, ethylene-vinyl acetate, styrene-butadiene copolymers, ethylene-acrylic ester copolymers, polybutadiene, polyisoprene, natural rubber, isobutylene, hydrocarbon resin (the hydrocarbon resin being characterized by a molecular weight less than 5000, a $T_g$ of about 50 to 100° C. and a softening point, Ring and Ball, as measured by ASTM E-28, of less than about 140° C.), rosin ester, and mixtures thereof. In another embodiment, Component B has a molecular weight distribution of less than 3.5. In yet another embodiment, Component B has a weight average molecular weight of at least 20,000. Impact copolymers have been previously disclosed in, for example, U.S. Pat. Nos. 6,342,566 and 6,384,142.

Component B is most preferably a copolymer consisting essentially of propylene and ethylene although other propylene copolymers, ethylene copolymers or terpolymers can be suitable depending on the particular product properties desired. For example, propylene/butene, hexene or octene copolymers, and ethylene/butene, hexene or octene copolymers can be used, and propylene/ethylene/hexene-1 terpolymers can be used. In a preferred embodiment though, Component B is a copolymer comprising at least 40% by weight propylene, more preferably from about 80% by weight to about 30% by weight propylene, even more preferably from about 70% by weight to about 35% by weight propylene. The comonomer content of Component B is preferably in the range of from about 20% to about 70% by weight comonomer, more preferably from about 30% to about 65% by weight comonomer, even more preferably from about 35% to about 60% by weight comonomer. Most preferably Component B consists essentially of propylene and from about 20% to about 70% ethylene, more preferably from about 30% to about 65% ethylene, and most preferably from about 35% to about 60% ethylene.

For other Component B copolymers, the comonomer contents will need to be adjusted depending on the specific properties desired. For example, for ethylene/hexene copolymers, Component B should contain at least 17% by weight hexene and at least 83% by weight ethylene.

Component B, preferably has a narrow molecular weight distribution Mw/Mn, i.e., lower than 5.0, preferably lower than 4.0, more preferably lower than 3.5, even more preferably lower than 3.0 and most preferably 2.5 or lower. These molecular weight distributions should be obtained in the absence of visbreaking or peroxide or other post reactor treatment molecular weight tailoring. Component B preferably has a weight average molecular weight (Mw as determined by GPC) of at least 100,000, preferably at least 150,000, and most preferably at least 200,000.

Component B preferably has an intrinsic viscosity greater than 1.00 dl/g, more preferably greater than 1.50 dl/g and most preferably greater than 2.00 dl/g. The term "intrinsic viscosity" or "IV" is used conventionally herein to mean the viscosity of a solution of polymer such as Component B in a given solvent at a given temperature, when the polymer composition is at infinite dilution. According to the ASTM standard test method D 1601-78, IV measurement involves a standard capillary viscosity measuring device, in which the viscosity of a series of concentrations of the polymer in the solvent at the given temperature are determined. For Component B, decalin is a suitable solvent and a typical temperature is 135° C. From the values of the viscosity of solutions of varying concentrations, the "value" at infinite dilution can be determined by extrapolation.

Component B preferably has a composition distribution breadth index (CDBI) of greater than 60%, more preferably greater than 65%, even more preferably greater than 70%, even more preferably greater than 75%, still more preferably greater than 80%, and most preferably greater than 85%. CDBI defines the compositional variation among polymer chains in terms of ethylene (or other comonomer) content of the copolymer as a whole. A measure of composition distribution is the "Composition Distribution Breadth Index" ("CDBI") as defined in U.S. Pat. No. 5,382,630 which is hereby incorporated by reference. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

Component B of the ICPs preferably has low crystallinity, preferably less than 10% by weight of a crystalline portion, more preferably less than 5% by weight of a crystalline portion. Where there is a crystalline portion of Component B, its composition is preferably the same as or at least similar to (within 15% by weight) the remainder of Component B in terms of overall comonomer weight percent.

The preferred melt flow rate or MFR of these ICP's depends on the desired end use but is typically in the range of from about 0.2 dg/min to about 200 dg/min, more preferably from about 5 dg/min to about 100 dg/min. Significantly, high MFRs, i.e., higher than 50 dg/min are obtainable. The ICP preferably has a melting point (Tm) of at least 145° C., preferably at least 150° C., more preferably at least 152° C., and most preferably at least 155° C.

The ICPs comprise from about 40% to about 95% by weight Component A and from about 5% to about 60% by weight Component B, preferably from about 50% to about 95% by weight Component A and from about 5% to about 50% Component B, even more preferably from about 60% to about 90% by weight Component A and from about 10% to about 40% by weight Component B. In the most preferred embodiment, the ICP consists essentially of Components A and B. The overall comonomer (preferably ethylene) content of the total ICP is preferably in the range of from about 2% to about 30% by weight, preferably from about 5% to about 25% by weight, even more preferably from about 5% to about 20% by weight, still more preferably from about 5% to about 15% by weight comonomer.

In another embodiment a preferred impact copolymer composition is prepared by selecting Component A and Component B such that their refractive indices (as measured by ASTM D 542-00) are within 20% of each other, preferably within 15%, more preferably 10%, even more preferably within 5% of each other. This selection produces impact copolymers with outstanding clarity. In another embodiment a preferred impact copolymer composition is prepared by selecting a blend of Component A and an NFP, and a blend of Component B and an NFP such that refractive indices of the blends (as measured by ASTM D 542-00) are within 20% of each other, preferably within 15%, more preferably 10%, even more preferably within 5% of each other.

In yet another embodiment, the Gardner impact strength, tested on 0.125 inch disk at −29° C., of the propylene impact copolymer ranges from 20 in-lb to 1000 in-lb, and from 30 in-lb to 500 in-lb in another embodiment, and from 40 in-lb to 400 in-lb in yet another embodiment. Further, the 1% secant flexural modulus of the propylene impact copolymer can range from 100 MPa to 2300 MPa in one embodiment, and from 200 MPa to 2100 MPa in another embodiment, and from 300 MPa to 2000 MPa in yet another embodiment, wherein a desirable polypropylene can exhibit any combination of any upper flexural modulus limit with any lower flexural modulus limit. The melt flow rate (MFR) (ASTM D 1238, 230° C., 2.16 kg) of desirable homopolymers ranges from 0.1 dg/min to 2500 dg/min in one embodiment, and from 0.3 to 500 dg/min in another embodiment.

In another embodiment polymers that are useful in this invention include homopolymers and random copolymers of propylene having a heat of fusion as determined by Differential Scanning Calorimetry (DSC) of less than 50 J/g, a melt index (MI) of less than 20 dg/min and or an MFR of 20 dg/min or less, and contains stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 2 wt % to 25 wt % polymerized ethylene units, based on the total weight of the polymer; has a narrow composition distribution; has a melting point (Tm) of from 25° C. to 120° C., or from 35° C. to 80° C.; has a heat of fusion within the range having an upper limit of 50 J/g or 25 J/g and a lower limit of 1 J/g or 3 J/g; has a molecular weight distribution Mw/Mn of from 1.8 to 4.5; and has a melt index (MI) of less than 20 dg/min, or less than 15 dg/min. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow composition distribution if it meets the fractionation test described above.

A particularly preferred polymer useful in the present invention is an elastic polymer with a moderate level of crystallinity due to stereoregular propylene sequences. The polymer can be: (A) a propylene homopolymer in which the stereoregularity is disrupted in some manner such as by regioinversions; (B) a random propylene copolymer in which the propylene stereoregularity is disrupted at least in part by comonomers; or (C) a combination of (A) and (B).

In one embodiment, the polymer further includes a non-conjugated diene monomer to aid in vulcanization and other chemical modification of the blend composition. The amount of diene present in the polymer is preferably less than 10% by weight, and more preferably less than 5% by weight. The diene can be any non-conjugated diene which is commonly used for the vulcanization of ethylene propylene rubbers including, but not limited to, ethylidene norbomene, vinyl norbornene, and dicyclopentadiene.

In one embodiment, the polymer is a random copolymer of propylene and at least one comonomer selected from ethylene, $C_4$-$C_{12}$ α-olefins, and combinations thereof. In a particular aspect of this embodiment, the copolymer includes ethylene-derived units in an amount ranging from a lower limit of 2%, 5%, 6%, 8%, or 10% by weight to an upper limit of 20%, 25%, or 28% by weight. This embodiment will also include propylene-derived units present in the copolymer in an amount ranging from a lower limit of 72%, 75%, or 80% by weight to an upper limit of 98%, 95%, 94%, 92%, or 90% by weight. These percentages by weight are based on the total weight of the propylene and ethylene-derived units; i.e., based on the sum of weight percent propylene-derived units and weight percent ethylene-derived units being 100%. The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=82.585−111.987X+30.045 $X^2$, wherein X is the ratio of the peak height at 1155 $cm^{-1}$ and peak height at either 722 $cm^{-1}$ or 732 $cm^{-1}$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128-1130. Different but similar methods are equally functional for this purpose and well known to those skilled in the art.

Comonomer content and sequence distribution of the polymers can be measured by $^{13}C$ nuclear magnetic resonance ($^{13}C$ NMR), and such method is well known to those skilled in the art.

In one embodiment, the polymer is a random propylene copolymer having a narrow composition distribution. In another embodiment, the polymer is a random propylene copolymer having a narrow composition distribution and a melting point of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution (i.e., randomness) of the copolymer can be determined by $^{13}C$ NMR, which locates the comonomer residues in relation to the neighboring propylene residues. The intermolecular composition distribution of the copolymer is determined by thermal fractionation in a solvent. A typical solvent is a saturated hydrocarbon such as hexane or heptane. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow composition distribution if it meets the fractionation test described above. To produce a copolymer having the desired randomness and narrow composition, it is beneficial if (1) a single-site metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of the polymers can be expressed in terms of heat of fusion. Embodiments of the present invention include polymers having a heat of fusion, as determined by DSC, ranging from a lower limit of 1.0 J/g, or 3.0 J/g, to an upper limit of 50 J/g, or 10 J/g. Without wishing to be bound by theory, it is believed that the polymers of embodiments of the present invention have generally isotactic, crystallizable propylene sequences, and the above heats of fusion are believed to be due to the melting of these crystalline segments.

The crystallinity of the polymer can also be expressed in terms of crystallinity percent. The thermal energy for the highest order of polypropylene is estimated at 207 J/g. That is, 100% crystallinity is equal to 207 J/g. Preferably, the polymer has a polypropylene crystallinity within the range having an upper limit of 65%, 40%, 30%, 25%, or 20%, and a lower limit of 1%, 3%, 5%, 7%, or 8%.

The level of crystallinity is also reflected in the melting point. The term "melting point," as used herein, is the highest peak highest meaning the largest amount of polymer being reflected as opposed to the peak occurring at the highest temperature among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The polymer preferably has a melting point by DSC ranging from an upper limit of 110° C., 105° C., 90° C., 80° C., or 70° C., to a lower limit of 0° C., 20° C., 25° C., 30° C., 35° C., 40° C., or 45° C.

In an embodiment, the polypropylene used in the invention have a weight average molecular weight (Mw) within the range having an upper limit of 5,000,000 g/mol, 1,000,000 g/mol, or 500,000 g/mol, and a lower limit of 10,000 g/mol, 20,000 g/mol, or 80,000 g/mol, and a molecular weight distribution Mw/Mn (MWD), sometimes referred to as a "polydispersity index" (PDI), ranging from a lower limit of 1.5, 1.8, or 2.0 to an upper limit of 40, 20, 10, 5, or 4.5, with a range of from any upper limit to any lower limit being contemplated as preferred embodiments. In one embodiment, the polymer has a Mooney viscosity, ML(1+4) @ 125° C., of 100 or less, 75 or less, 60 or less, or 30 or less. Mooney viscosity, as used herein, can be measured as ML(1+4) @ 125° C. according to ASTM D1646, unless otherwise specified.

The polymers used in embodiments of the present invention can have a tacticity index (m/r) ranging from a lower limit of 4 or 6 to an upper limit of 8, 10, or 12. The tacticity index, expressed herein as "m/r", is determined by $^{13}C$ nuclear magnetic resonance (NMR). The tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically can have a ratio approaching infinity, and many by-product atactic polymers have sufficient isotactic content to result in ratios of greater than 50.

In one embodiment, the polymer has isotactic stereoregular propylene crystallinity. The term "stereoregular" as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer. The triad tacticity (mm fraction) of a propylene copolymer can be determined from a $^{13}C$ NMR spectrum of the propylene copolymer as described in WO 2004/014997.

Fillers/Additives

In certain embodiments, the elastomeric composition can comprise fillers, additives, and the like. Suitable fillers include titanium dioxide, calcium carbonate, barium sulfate, silica, silicon dioxide, carbon black, sand, glass beads or glass fibers, mineral aggregates, talc, clay, wollastonite, and the like. In a preferred embodiment, the fillers described above can be present at 20 wt % or less (based upon the weight of the composition), preferably 10 wt % or less, preferably 5 wt % or less, preferably between 0.5 and 5 wt %. In another embodiment, the composition does not comprise calcium carbonate. By does not comprise is meant that the calcium carbonate is present at less than 0.5 weight %, preferably less than 0.01 wt %.

The polymeric composition of this invention can further comprise typical additives per se known in the art such antioxidants, adjuvants, and/or adhesion promoters. Preferred antioxidants include phenolic antioxidants, such as Irganox 1010, Irganox, 1076 both available from Ciba-Geigy. Other preferred additives include block, antiblock, pigments, processing aids, UV stabilizers, neutralizers, lubricants, surfactants and/or nucleating agents can also be present in one or more than one layer in the films. Other preferred additives include polydimethylsiloxane, dyes, waxes, calcium stearate, carbon black, low molecular weight resins and glass beads. Preferred adhesion promoters include polar acids, polyaminoamides (such as Versamid 115, 125, 140, available from Henkel), urethanes (such as isocyanate/hydroxy terminated polyester systems, e.g. bonding agent TN/Mondur Cb-75 (Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins.

In another embodiment the polymeric composition can be combined with less than 3 wt. % anti-oxidant, less than 3 wt. % flow improver, less than 10 wt. % wax, and or less than 3 wt. % crystallization aid.

Other optional components that can be combined with the polymeric composition as disclosed herein include other additives such as surfactants, fillers, color masterbatches, and the like.

An important subclass of "fillers" or "additives" includes nanoclays. In embodiments the elastomeric composition can include a nanoclay (the combination of a polymer and a nanoclay is referred to as a nanocomposite).

The organoclay can comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

The organoclay can be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

The organoclay is preferably present in the nanocomposite at from 0.1 to 50 wt %, based on the total weight of the nanocomposite.

While preferred amounts of certain specific filler/additives and certain classes of filler/additives have been suggested above, more generally (absent specific directions otherwise given herein) the compositions of this invention can optionally have one or more fillers/additives, preferably in the amount of less than 30 weight %, or less than 25 wt. %, or less than 20 wt. %, or less than 15 wt. %, preferably less than 10 wt. %, more preferably less than 5 wt. %, or in other embodiments less than 2 wt %, or less than 1 wt %, based upon the total weight of the various components and the total weight of the filler/additives. While not critical to the characterization of a "composition comprising a filler/additive", which means that one or more fillers and/or additives are added, a lower limit can be 100 ppm, 500 ppm, 1000 ppm, 0.01 wt %, 0.1 wt %, or similar amounts. In some cases it can be preferable for there to be no fillers/additives, or in other cases preferred embodiments can be directed to the absence of specific fillers/additives, e.g., some preferred embodiments have no carbonates, no inorganic fillers, and so on. Filler/additives in the nature of unavoidable impurities can of course be present in the case where no filler/additives are purposefully added but in some embodiments it can be useful to further purify ingredients to avoid filler/additives as much as possible. One of ordinary skill in the art, in possession of the present disclosure, can determine the nature and amount of these optional ingredients by routine experimentation.

Blending of the Components

The components can be blended using conventional equipment and methods, such a by blending the individual components and subsequently melt mixing in a mixer, or by mixing the components together directly in a mixer, such as a Banbury mixer, a Haake mixer, a Brabender internal mixer, or a single or twin-screw extruder including a compounding extruder and a side-arm extruder used directly or indirectly downstream of a polymerization process. The composition can then be extruded into pellets. The blending per se would be well within the skill of the ordinary artisan. The pellets can then be used in the final process, e.g., thermoformed or otherwise molded or extruded into a product, such as a film, sheet, or other article.

In one or more embodiments, the blend comprises at least one low molecular weight polyolefin in an amount of about 1.0 wt % to about 90 wt %, based on the total weight of the composition. In one or more embodiments, the blend comprises at least one low molecular weight polyolefin in an amount of about 5.0 wt % to about 50 wt %, based on the total weight of the composition. Preferably, the blend comprises at least one low molecular weight polyolefin in an amount of about 10 wt % to about 30 wt %, based on the total weight of the composition. In one or more embodiments, the blend comprises at least one low molecular weight polyolefin in the amount of less than 50 wt %, less than 40 wt %, less than 30 wt %, less than 25 wt %, less than 20 wt %, less than 15 wt %, or less than 10 wt %.

In one or more embodiments, the blend comprises at least one selectively hydrogenated block copolymer in an amount of about 1.0 wt % to about 90 wt %, preferably of from about 10 wt % to about 30 wt %, preferably of about 50 wt % to 70 wt %, based on the total weight of the composition. Preferably, the at least one selectively hydrogenated block copolymer is or includes a block copolymer having terminal polymeric blocks of a vinyl aromatic monomer and a central polymeric block prepared originally with a conjugated diolefin and subsequently hydrogenated.

In one or more embodiments, the blend comprises at least one polypropylene in the amount of about 1.0 wt % to about 90 wt %, preferably of about 5.0 wt % to about 50 wt %, preferably of about 10 wt % to about 30 wt %, based on the total weight of the composition. In one or more embodiments, the blend comprises at least one polypropylene in the amount of less than 50 wt %, less than 40 wt %, less than 30 wt %, less than 25 wt %, less than 20 wt %, less than 15 wt %, or less than 10 wt %.

In one or more embodiments, the blend comprises about 5 wt % to about 50 wt % of at least one low molecular weight polyolefin; about 10 wt % to about 30 wt % of at least one selectively hydrogenated block copolymer having terminal polymeric blocks of a vinyl aromatic monomer and a central polymeric block prepared originally with a conjugated diolefin and subsequently hydrogenated; and about 5.0 wt % to about 50 wt % of at least one polypropylene.

In one or more embodiments, the blend comprises about 10 wt % to about 30 wt % of at least one low molecular weight polyolefin; about 50 wt % to about 70 wt % of at least one selectively hydrogenated block copolymer having terminal polymeric blocks of a vinyl aromatic monomer and a central polymeric block prepared originally with a conjugated diolefin and subsequently hydrogenated; and about 10 wt % to about 30 wt % of at least one polypropylene.

Experimental Methods

Dynamic Mechanical Thermal Analysis (DMTA)

The glass transition temperature (Tg) can be measured using dynamic mechanical thermal analysis (DMTA). This test provides information about the small-strain mechanical response (relaxation behavior) of a sample as a function of temperature over a temperature range that includes the glass transition region and the visco-elastic region prior to melting.

Typically, samples are tested using a three point bending configuration (TA Instruments DMA 2980). A solid rectangular compression molded bar is placed on two fixed supports; a movable clamp applied a periodic deformation to the sample midpoint at a frequency of 1 Hz and amplitude of 20 µm. The sample is initially cooled to −130° C. then heated to 60° C. at a heating rate of 3° C./min. In some cases, compression molded bars are tested using other deformation configurations, namely dual cantilever bending and tensile elongation (Rheometrics RSAII). The periodic deformation under these configurations is applied at a frequency of 1 Hz and strain amplitude of 0.05%. The sample is cooled to −130° C. and then heated to 60° C. at a rate of 2° C./min. The slight difference in heating rates does not influence the glass transition temperature measurements significantly.

The output of these DMTA experiments is the storage modulus (E') and loss modulus (E"). The storage modulus measures the elastic response or the ability of the material to store energy, and the loss modulus measures the viscous response or the ability of the material to dissipate energy. Tan-delta is the ratio of E"/E' and gives a measure of the damping ability of the material. The beginning of the broad glass transition (β-relaxation) is identified as the extrapolated tangent to the tan-delta peak. In addition, the peak temperature and area under the peak are also measured to more fully characterize the transition from glassy to visco-elastic region. Thus the glass transition temperature is the peak temperature associated with the β-relaxation peak.

Differential Scanning Calorimetry (DSC)

Crystallization temperature (Tc) and melting temperature (Tm) are measured using Differential Scanning Calorimetry (DSC) using commercially available equipment such as a TA Instruments 2920 DSC. Typically, 6 to 10 mg of molded polymer or plasticized polymer is sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed for onset of transition and peak temperature. The melting temperatures reported are the peak melting temperatures from the second heat unless otherwise specified. For polymers displaying multiple peaks, the melting point (or melting temperature) is defined to be the peak melting temperature (i.e., associated with the largest endothermic calorimetric response in that range of temperatures) from the DSC melting trace; likewise, the crystallization temperature is defined to be the peak crystallization temperature (i.e., associated with the largest exothermic calorimetric response in that range of temperatures) from the DSC crystallization trace.

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the heat of fusion for the homopolymer of the major monomer component. These values for H° are to be obtained from the *Polymer Handbook, Fourth Edition*, published by John Wiley and Sons, New York 1999, except that a value of 290 J/g is used as the equilibrium heat of fusion (H°) for 100% crystalline polyethylene, a value of 140 J/g is used as the equilibrium heat of fusion (H°) for 100% crystalline polybutene, and a value of 207 J/g (H°) is used as the heat of fusion for a 100% crystalline polypropylene.

Crystallization half time at 125° C. was measured on a Perkin Elmer Pyris I DSC. The sample was melted at 200° C. for 10 min; cooled to 160° C. at 150° C./min and then to 140° C. at 40° C./min; held at 140° C. for 45 min; heated again to 200° C. at 150° C./min and held there for 10 min; cooled to 145° C. at 150° C./min and then to 125° C. at 40° C./min; and held at 125° C. for 45 min to acquire crystallization data. The crystallization half-time is the time required for half of the final crystallinity to develop, as measured by $\Delta H_c$; that is, if the final $\Delta H_c$ after 45 min is X J/g, the crystallization half time is the time required for $\Delta H_c$ to reach X/2 J/g. Crystallization half time at 140° C. was measured identically except the final temperature was 140° C. instead of 125° C.

Size-Exclusion Chromatography of Polymers (SEC-3D)

Molecular weight (weight-average molecular weight, Mw, number-average molecular weight, Mn, and molecular weight distribution, Mw/Mn or MWD) can be determined using a High Temperature Size Exclusion Chromatograph (either from Waters Corporation or Polymer Laboratories), equipped with a differential refractive index detector (DRI), an online light scattering (LS) detector, and a viscometer. Experimental details not described below, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns are preferably used. The nominal flow rate is 0.5 cm3/min, and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration ranges from 1.0 to 2.0 mg/ml, with lower concentrations being used for higher molecular weight samples. Prior to running each sample the DRI detector and the injector can be purged. Flow rate in the apparatus is then increased to 0.5 ml/minute, and the DRI is allowed to stabilize for 8-9 hours before injecting the first sample. The LS laser is turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the light scattering (LS) analysis. Units on parameters throughout this description of the SEC method are such that concentration is expressed in g/cm³, molecular weight is expressed in g/mole, and intrinsic viscosity is expressed in dL/g.

The light scattering detector can be a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention and the claims thereto, $A_2$=0.0006 for propylene polymers and 0.001 otherwise], $P(\theta)$ is the form factor for a monodisperse random coil (M. B. Huglin, LIGHT SCATTERING FROM POLYMER SOLUTIONS, Academic Press, 1971), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and $\lambda$=690 nm. For purposes of this invention and the claims thereto (dn/dc)=0.104 for propylene polymers and 0.1 otherwise.

A high temperature Viscotek Corporation viscometer, which has four capillaries arranged in a Wheatstone bridge configuration with two pressure transducers, can be used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [$\eta$], at each point in the chromatogram is calculated from the following equation:

$$\eta_s = c[\eta] + 0.3(c[\eta])^2$$

where c is concentration and was determined from the DRI output.

The branching index (g') can be calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{k M_v^\alpha}$$

where, for purpose of this invention and claims thereto, $\alpha$=0.695 for ethylene, propylene, and butene polymers; and k=0.000579 for ethylene polymers, k=0.000262 for propylene polymers, and k=0.000181 for butene polymers. $M_v$ is the viscosity-average molecular weight based on molecular weights determined by LS analysis.

13C-NMR Spectroscopy

Polymer microstructure can be determined by $^{13}$C-NMR spectroscopy, including the concentration of isotactic and syndiotactic diads ([m] and [r]), triads ([mm] and [rr]), and pentads ([mmmm] and [rrrr]). Samples can be dissolved in $d_2$-1, 1, 2, 2-tetrachloroethane. Spectra are recorded at 125° C. using a NMR spectrometer of 75 or 100 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, $^{13}$C-NMR Method", Academic Press, New York, 1977. The percent of methylene sequences of two in length, % $(CH_2)_2$, were calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments were based on H. N. Cheng and J. A. Ewen, Makromol. Chem. 1989, 190, 1931.

Fluid Properties

Pour Point is preferably measured by ASTM D 97.

Kinematic Viscosity (KV) is preferably measured by ASTM D 445.

Specific gravity is preferably determined by ASTM D 4052, at the temperature specified.

Viscosity index (VI) is preferably determined by ASTM D 2270.

Color can be determined on the APHA scale by ASTM D 1209. Note that an APHA color of 100 corresponds to a Saybolt color (ASTM D 156) of about +10; an APHA color of 20 corresponds to a Saybolt color of about +25; and an APHA color of 0 corresponds to a Saybolt color of about +30.

Carbon type composition can be determined by ASTM D 2140, and gives the percentage of aromatic carbons ($C_A$), naphthenic carbons ($C_N$), and paraffinic carbons ($C_P$) in the fluid. Specifically, $C_A$ is the wt % of total carbon atoms in the fluid that are in aromatic ring-type structures; $C_N$ is the wt % of total carbon atoms in the fluid that are in saturated ring-type structures; and $C_P$ is the wt % of total carbon atoms in the fluid that are in paraffinic chain-type structures. ASTM D 2140 involves calculating a "Viscosity Gravity Constant" (VGC) and "Refractivity Intercept" (RI) for the fluid, and determining the carbon type composition from a correlation based on these two values. However, this method is known to fail for highly paraffinic oils, because the VGC and RI values fall outside the correlation range. Therefore, for purposes of this invention, the following protocol is used: If the calculated VGC (ASTM D 2140) for a fluid is 0.800 or greater, the carbon type composition including $C_P$ is determined by ASTM D 2140. If the calculated VGC (ASTM D 2140) is less than 0.800, the fluid is considered to have $C_P$ of at least 80%. If the calculated VGC (ASTM D 2140) is less than 0.800 but greater than 0.765, then ASTM D 3238 is used to determine the carbon type composition including $C_P$. If application of ASTM D 3238 yields unphysical quantities (e.g., a negative $C_A$ value), then $C_P$ is defined to be 100%. If the calculated VGC (ASTM D 2140) for a fluid is 0.765 or less, then $C_P$ is defined to be 100%.

Number-Average Molecular Weight (Mn)

The number-average molecular weight ($M_n$) can be determined by one of two methods. For samples having a kinematic viscosity at 100° C. of 10 cSt or less, Gas Chromatography (GC) with a mass spectrometer detector is preferred. Such GC method is generally described in "Modern Practice of Gas Chromatography", R. L. Grob and E. F. Barry, Wiley-Interscience, 3rd Edition (July 1995). For samples having a kinematic viscosity at 100° C. of more than 10 cSt, Gel Permeation Chromatography (GPC) using polystyrene standards is preferred. Such GPC method is generally described in "Modern Size Exclusion Liquid Chromatographs", W. W. Yan, J. J. Kirkland, and D. D. Bly, J. Wiley & Sons (1979).

Permanence

Permanence of the NFP can be determined by ASTM D1203, by measuring the weight loss from the plasticized composition in the form of a 0.25 mm thick sheet, after 300 hours in dry 70° C. oven. Permanence is 100% minus the Corrected % weight loss, where Corrected % weight loss=(% weight loss for the plasticized composition)−(% weight loss for the unplasticized composition under the same test conditions), % weight loss=100×(W−Wo)/Wo, W=weight after drying and Wo is the weight before drying. The unplasticized composition is the same composition as the plasticized composition but without NFP added.

Methods for Determining NFP Content in Blend

The preferred method to determine the NFP content (weight percent basis) in a blend is the Extraction method. Otherwise, the CRYSTAF method is used, unless the CRYSTAF soluble fraction for the unplasticized polyolefin is greater than 30% in which case the NMR method is used. In event of conflict between the Extraction method and the Crystaff method for the NMR method, the Extraction method is preferred. All these methods are solution methods. The latter two involve constructing a model based on a calibration curve (or set of calibration curves) of measured parameter(s) as a function of modifier concentration. The calibration blends are prepared using the same polymer and modifier as the blend(s) under investigation but at known modifier concentrations. This set of calibrants should number at least five, and include the neat polymer as well as at least one modifier concentration above the maximum for the blend(s) under investigation but not greater than 50 weight percent modifier. The blend(s) under investigation are analyzed under the same conditions as the calibrants, and the modifier content determined by applying the model.

Extraction Method

This method involves Soxhlet extraction, wherein at least a majority of the NFP is extracted with refluxing n-heptane. Analysis of the base polymer is also required because it can contain low molecular weight and/or amorphous material that is soluble in refluxing n-heptane. The level of plasticizer in the blend is determined by correcting its extractables level, in weight percent, by the extractables level for the base polymer, as described below.

The Soxhlet extraction apparatus consists of a 400 ml Soxhlet extractor, with a widened overflow tube (to prevent siphoning and to provide constant flow extraction); a metal screen cage fitted inside the main Soxhlet chamber; a Soxhlet extraction thimble (Whatman, single thickness, cellulose) placed inside the screen cage; a condenser with cooling water and drain; and a one-neck 1000 ml round bottom flask with appropriately sized stir bar and heating mantle.

The procedure is as follows. Dry the Soxhlet thimbles in a 95° C. oven for about 60 minutes. Weigh the dry thimble directly after removal from oven; record this weight as A: Thimble Weight Before, in g. Weigh out 15-20 grams of sample (either in pellet or ground pellet form) into the thimble; record as B: Polymer Weight, in g. Place the thimble containing the polymer in the Soxhlet apparatus. Pour about 300 ml of HPLC-grade n-heptane into the round bottom flask with stir bar and secure the flask on the heating mantle. Connect the round bottom flask, the Soxhlet, and the condenser in series. Pour more n-heptane down through the center of the condenser into the Soxhlet main chamber until the solvent level is just below the top of the overflow tube. Turn on the cooling water to the condenser. Turn on the heating mantle and adjust the setting to generate a rolling boil in the round bottom flask and maintain a good reflux. Allow to reflux for 16 hours. Turn the heat off but leave the cooling system on. Allow the system to cool down to room temperature. Disassemble the apparatus. Remove the thimble and rinse with a small amount of fresh n-heptane. Allow to air dry in the laboratory hood, followed by oven drying at 95° C. for 90 minutes. Weigh the thimble containing the polymer directly after removal from oven; record as C: Polymer/Thimble Weight After, in g.

The quantity of extract is determined by calculating the weight loss from the sample, W=(A+B−C), in g. The extractables level, E, in weight percent, is then calculated by E=100 (W/B). The plasticizer content in the blend, P, in weight percent, is calculated by P=E(blend)−E(base polymer).

Crystallization Analysis Fractionation (CRYSTAF)

This method involves dissolving a sample in a solvent at high temperature, then cooling the solution slowly to cause fractionation of the sample based on solubility. For semi-crystalline samples, including blends, solubility depends primarily on crystallizability: portions of the sample that are more crystalline will precipitate out of solution at a higher temperature than portions of the sample that are less crystalline. The relative amount of sample in solution as a function of temperature is measured using an infrared (IR) detector to obtain the cumulative solubility distribution. The soluble fraction (SF) is defined as the IR signal at the lowest temperature divided by the IR signal when all the sample is dissolved at high temperature, and corresponds to the weight fraction of sample that has not crystallized.

In the case of a NFP in a thermoplastic polyolefin, the NFP is mostly or entirely amorphous and therefore contributes predominantly or exclusively to the SF. Thus, the SF will be larger for blends with higher NFP content. This relationship is exploited to determine the NFP content of a blend of known composition (polymer and NFP types) but unknown concentration. A calibration curve that describes the trend in SF as a function of NFP content is developed by making a series of blends of known concentration using the same polymer and NFP directly in the CRYSTAF vessels, and then running these blends under the same operating conditions as used for blends of unknown concentration. This series of a minimum of five calibrants must include the neat (unplasticized) polymer, and at least one NFP concentration above and one NFP concentration below the concentration of the unknown sample(s) in order to reliably apply the calibration curve to the unknown sample(s). Typically, a linear fit of the calibration points is found to provide a good representation of the SF as a function of NFP content (i.e., $R^2>0.9$); if necessary, a quadratic fit is used to improve the representation of the trend (i.e., $R^2 > 0.9$); if a quadratic fit is still insufficient then more calibrants are run to increase the density of points in the range of interest, and the fit is limited to a narrow enough range that a robust representation of the trend in the range of interest is achieved (i.e., $R^2 > 0.9$). This calibration curve is applied to the SF values measured for the blend(s) under investigation to calculate their respective fluid contents.

A typical CRYSTAF procedure is as follows. A commercial CRYSTAF 200 instrument (Polymer Char S. A., Valencia, Spain) with five stirred stainless steel vessels of 60 mL volume is used. Approximately 30 mg of sample are dissolved for 60 min at 160° C. in 30 mL of 1,2-dichlorobenzene stabilized with 2 g/4 L of butylated hydroxytoluene. The solution is equilibrated for 45 min at 100° C. The crystallization process is carried out by lowering the temperature of the vessels from 100° C. to 30° C. at a rate of 0.2° C./min. A dual wavelength infrared detector with a heated flow through cell maintained at 150° C. is used to measure the polymer concentration in solution at regular intervals during the crystallization cycle; the measuring wavelength is 3.5 µm and the reference wavelength is 3.6 µm.

If the soluble fraction for the unplasticized polyolefin is greater than 30% when analyzed in 1,2-dichlorobenzene as described above, then phenyl ether should be used as the solvent. In this case, the temperatures must be adjusted in the CRYSTAF protocol: the dissolution temperature is 160° C., the equilibration temperature is 160° C., the temperature scan is 160° C. to 80° C., and the detector is maintained at 180° C. Otherwise, the protocol is identical. If the soluble fraction of the unplasticized polyolefin is still greater than 30%, then the NMR method should be used.

Nuclear Magnetic Resonance (NMR)

Another method to determine the amount of NFP in a blend is high-temperature solution-phase $^{13}C$ nuclear magnetic resonance (HTS-CNMR). The composition is determined using the reference spectra of the neat polymer and neat NFP, as well as spectra for a set of calibration blends (i.e., prepared from the neat polymer and NFP at known wt % NFP). The spectra are analyzed to determine a set of one or more diagnostic resonances or clusters of resonances that increase or decrease in strength monotonically with increasing NFP content. The corresponding peaks are integrated and their fractional contribution to the total integral calculated as a function of NFP content (weight %) to generate a set of calibration curves. A chemometrics model is developed using these calibration curves to provide a method to calculate the NFP content. The number of diagnostic resonances is chosen to allow the model to predict NFP content with a precision of 1 wt % or better over the calibration range. For a general description of chemometrics and how to develop a chemometrics model, see *Chemometric Techniques for Quantitative Analysis* by Richard Kramer (Marcel Dekker, 1998). The blend(s) of unknown concentration are then run following the same HTS-CNMR procedure as used for the calibrants, and the results analyzed according to the model to determine the weight % NFP.

A typical HTS-CNMR procedure is as follows. Samples are prepared in 1,1,2,2-tetrachloroethane-$d_2$, with chromium acetylacetonate [Cr(acac)$_3$] added as a relaxation agent to accelerate data acquisition. The Cr(acac)$_3$ concentration in the stock solvent is approximately 15 mg/ml. Sample concentrations are between 10 and 15 weight %. Free induction decays of 15,000 transients are accumulated at a temperature of 120° C. on a Varian UnityPlus 500 using a 10 mm broadband probe. Spectra are acquired with a 90° carbon excitation pulse, and inverse-gated WALTZ-16 proton decoupling. An acquisition time of approximately 1 second and recycle delay of 3.5 seconds are used to allow quantitative integration. Solvent choice and sample concentration can be adjusted to accommodate different solubility and to minimize spectral interference based on the specific composition of the blend. See *Carbon-13 NMR Spectroscopy: High-Resolution Methods and Applications in Organic Chemistry and Biochemistry*, 3rd edition, Eberhard Breitmaier and Wolfgang Voelter (VCH, 1990) for a general description of CNMR techniques.

End-Uses

Compositions according to the present invention are particularly useful in wire and cable insulation. In this regard, the compositions according to the present invention are particularly useful for such applications because inter alia they are easily processed, thermally stable material without using an appreciable amount of antioxidant, which can effect resistivity of insulation.

Compositions according to the invention are also particularly useful in formed goods for use in the food and medical industries. In this regard, the compositions according to the present invention are particularly useful for such applications because inter alia they are readily injection molded and can also be readily extruded into films. They have essentially no taste and do not require nitrosamines (or vulcanizing agents) or phthalate plasticizers (and thus in preferred embodiments the compositions do not contain these ingredients) and furthermore because of this the parts made of these compositions are relatively "clean-burning". The compositions are also stable to electromagnetic radiation, particularly gamma-radiation (and thus also do not require stabilization agents with respect to electromagnetic radiation).

Compositions according to the invention are also particularly useful in flexible formed decorative and structural automotive parts such as instrument panels, seat material, bumper parts, and the like. In this regard, the compositions according to the present invention are particularly useful because inter alia they are readily injection molded and can also be readily extruded into films, and because of their stability to electromagnetic radiation, particularly UV radiation, without the necessity of stabilizers.

Preferred Embodiments

Preferred embodiments of the invention include: (A) a composition comprising: (i) at least one low molecular weight polyolefin; (ii) a block copolymer obtainable by selectively hydrogenating a block copolymer having terminal polymeric blocks of a vinyl aromatic monomer and a mid-block prepared originally with an olefin and subsequently hydrogenated; and (iii) polypropylene, or even more preferred such a composition with the proviso that when (i) is a PAO having a molecular weight of between about 400 and 1000 g/mole, either: (a) (iii) is a homopolymer characterized by an MFR>2 g/10 min, preferably >5 g/10 min, still more preferably >10 g/10 min, yet more preferably >20 g/10 min, yet still more preferably >30 g/10 min, wherein the MFR is preferably measured by ASTM D1238 (230° C./2.16 kg); (b) (iii) is a copolymer; or (c) (iii) is a polymer or copolymer made by a metallocene catalyst; or (d) the composition does not contain calcium carbonate; and also other more preferred embodiments (which can be combined in numerous ways as would be readily apparent to one of ordinary skill in the art in possession of the present disclosure) selected from: a composition wherein (ii) is further characterized by end-blocks having Mn greater than about 10,000, preferably greater than about 12,000, still more preferably greater than 15,000, and mid-blocks having Mn greater than about 75,000, preferably greater than about 80,000 (optional characterizations which can otherwise be expressed as Mn/1000 of >10/>75/>10, >12/>75/>12, >15/>75/>15, >10/>80/>10, >12/>80/>12, >15/>80/>15)(note: Mn is determined by GPC methods set forth herein, and said GPC methods can have an error as high as 10%), and/or wherein (ii) is further characterized by a vinyl aromatic monomer content of greater than 15 wt %, preferably 20 wt % or greater (an thus providing, as an example of the permissible combinations of embodiments that would be clear to one of ordinary skill in the art in possession of the present disclosure, an embodiment characterizable as a proviso that when (ii) comprises at least one SEBS, said SEBS is further characterized by at least one of the following: (a) end-blocks having Mn greater than about 10,000 and mid-blocks having Mn greater than about 75,000; and (b) a styrenic content of greater than about 15 wt %, based on the weight of the block copolymer); wherein the at least one low molecular weight polyolefin is selected from oligomers of C3-C18 alphaolefins, C3-C14 alpha olefins, C3-C12 alphaolefins, C6-C14 alphaolefins, C6-C12 alphaolefins, C8-C12 alphaolefins, or wherein the at least one low molecular weight polyolefin is selected from oligomers of C10 alpha olefins; wherein the at least one low molecular weight polyolefin has a number average molecular weight of from greater than about 100 g/mol and less than about 2,000 g/mol, or a number average molecular weight of greater than 1000 g/mol, or a number average molecular weight of 2000 g/mol or greater (with limits on Mn of less then 21,000 g/mol and other limits set forth herein, such as upper limits for PAOs of 10,000, 3,000, and so forth, which can be applied in general for ingredient (i) of the invention); wherein the at least one low molecular weight polyolefin is liquid at 25° C.; wherein (ii) is selected from selectively hydrogenated SIS, SBS, star-branched SIS, and star-branched SBS; wherein the polypropylene component is at least one polypropylene selected from atactic polypropylene, isotactic polypropylene, syndiotactic polypropylene, and mixtures thereof; wherein said polypropylene component is at least one polypropylene selected from polypropylene produced using a Zeigler Natta catalyst, a polypropylene produced using a metallocene catalyst, or mixtures thereof; wherein said at least one low molecular weight polyolefin is a non-functional plasticizer (NFP) characterized as a liquid with no distinct melting point above 0° C. and a kinematic viscosity at 25° C. of 30,000 cSt or less, and further characterized by at least one of the parameters selected from the following: (a) kinematic viscosity at 100° C. ($KV_{100}$)<400 cSt; (b) Flash Point>200° C.; (c) Pour Point<−25° C.; (d) Specific Gravity of 0.85 or less; a distillation range having a difference between the upper temperature and the lower temperature of 40° C. or less; and (e) a final boiling point of from 115° C. to 500° C. (or wherein said NFP is characterized by at least two of said parameters, or wherein said NFP is characterized by at least three of said parameters, or wherein said NFP is characterized by at least four of said parameters, or wherein said NFP is characterized by all of said parameters, any of the aforementioned still further characterized by the case where said NFP is produced using a metallocene catalyst, wherein said NFP is produced using a reduced metal oxide catalyst, or wherein said NFP is produced using a zeolite catalyst, or a mixture of these materials as the NFP); wherein said at least one low molecular weight polyolefin is selected from Group III hydrocarbon oil basestocks, GTL-derived basestocks, polyisobutenes, wax isomerate lubricant oil basestocks, ethylene/butene copolymers, and mixtures thereof; and particularly preferred would be any of the aforementioned limitations or combinations thereof wherein said composition is characterized by the absence of at least one of vulcanizing agents, phthlate plasticizers, and UV and gamma radiation stabilizers, and/or the composition does not contain calcium carbonate or even case where the composition does not contain any filler or wherein the composition is further characterized as consisting essentially of (i), (ii), and (iii), or even cases where the composition is characterized as consisting of (i), (ii), and (iii), wherein the terms "consisting essentially of" and "consisting of" take there ordinary meaning in the patent literature; wherein said composition is characterized by parameters selected from at least one of the following, measured after aging at 125° C. in air for 5 days, wherein the decrease is measured relative to the original sample prior to aging:

(a) decrease in 100% Modulus of <15%, preferably <10%;
(b) decrease in Tensile Strength of <55%, preferably <45%;
(c) decrease in Elongation at Break of <25%, preferably <20%, still more preferably <15%; and (d) decrease in Toughness of <60%, preferably <50%, still more preferably <45%, and still more preferably such a composition characterized by at least two of said parameters, or characterized by at least three of said parameters, or characterized by all four of said parameters, or characterized by each of said "preferably" parameters (a)-(d), and so on; and also (B) an article comprising the composition according to any one of the preceding limitations or combinations thereof, and particularly thermoformed articles comprising such compositions, and also articles (whether formed using a thermoforming step or not using a thermoforming step) characterized as comprising an insulation material and a material insulated by said insulation material, wherein said insulation material comprises the composition according to any one of the limitations or combination of limitation set forth herein, particularly wherein said material insulated by said insulation material is selected from the group consisting of wire, cable, fiber, and combinations thereof; and also (C) a thermoforming process comprising thermoforming an article from a composition comprising an elastomeric material, the improvement comprising providing a composition according to any one of the limitations set forth in (A) of this paragraph, or combinations of those limitations, especially a thermoforming operation including injection molding and/or extrusion.

In another embodiment, this invention relates to:

1. A composition comprising:
   (i) at least one low molecular weight polyolefin;
   (ii) a block copolymer obtainable by selectively hydrogenating a block copolymer having terminal polymeric blocks of a vinyl aromatic monomer and a mid-block prepared originally with an olefin and subsequently hydrogenated; and
   (iii) polypropylene;
   (iv) with the proviso that when (i) is a PAO having a molecular weight of between about 400 and 1000 g/mole, either:
      (a) (iii) is a homopolymer characterized by an MFR greater than 2 g/10 min,
      (b) (iii) is a copolymer; or
      (c) (iii) is a polymer or copolymer made by a metallocene catalyst; or
      (d) the composition does not contain calcium carbonate.

2. The composition of Paragraph 1, wherein (ii) is further characterized by at least one of (a) end-blocks having Mn greater than about 10,000; and (b) mid-blocks having Mn greater than about 75,000.

3. The composition of Paragraph 1 or 2, wherein (ii) is further characterized by a vinyl aromatic monomer content of greater than 15 wt %, based on the weight of the block copolymer.

4. The composition of Paragraph 1, 2, or 3 wherein (ii) comprises at least one SEBS, said SEBS characterized by at least one of the following: (a) end-blocks having Mn greater than about 10,000 and mid-blocks having Mn greater than about 75,000; and (b) a styrenic content of greater than 15 wt %, based on the weight of the block copolymer.

5. The composition of any of Paragraphs 1 to 4, wherein the at least one low molecular weight polyolefin is selected from oligomers of C3-C14 alpha olefins.

6. The composition of any of Paragraphs 1 to 5, wherein the at least one low molecular weight polyolefin has a number average molecular weight of from greater than about 100 g/mol and less than about 2,000 g/mol.

7. The composition of any of Paragraphs 1 to 6, wherein the at least one low molecular weight polyolefin is a liquid at 25° C.

8. The composition of any of Paragraphs 1 to 7, wherein (ii) is selected from selectively hydrogenated SIS, SBS, star-branched SIS, and star-branched SBS.

9. The composition of any of Paragraphs 1 to 8, wherein the polypropylene is selected from atactic polypropylene, isotactic polypropylene, syndiotactic polypropylene, and mixtures thereof.

10. The composition of any of Paragraphs 1 to 9, wherein said polypropylene is selected from polypropylene produced using a Zeigler Natta catalyst, a polypropylene produced using a metallocene catalyst, or mixtures thereof.

11. The composition of any of Paragraphs 1 to 10, wherein said at least one low molecular weight polyolefin is a non-functional plasticizer (NFP) characterized as a liquid with no distinct melting point above 0° C. and a kinematic viscosity at 25° C. of 30,000 cSt or less, and further characterized by at least one parameter selected from the following: (a) kinematic viscosity at 100° C. ($KV_{100}$)<400 cSt; (b) Flash Point >200° C.; (c) Pour Point←25° C.; (d) Specific Gravity of 0.85 or less; a distillation range having a difference between the upper temperature and the lower temperature of 40° C. or less; and (e) a final boiling point of from 115° C. to 500° C.

12. The composition according to Paragraph 11, wherein said NFP is characterized by at least two of said parameters.

13. The composition according to Paragraph 11, wherein said NFP is characterized by at least three of said parameters.

14. The composition according to Paragraph 11, wherein said NFP is characterized by at least four of said parameters.

15. The composition according to any of Paragraphs 11 to 14, wherein said NFP is characterized by all of said parameters.

16. The composition according to any of Paragraphs 11 to 15, wherein said NFP is produced using a metallocene catalyst.

17. The composition according to any of Paragraphs 11 to 16, wherein said NFP is produced using a reduced metal oxide catalyst.

18. The composition according to any of Paragraphs 11 to 17, wherein said NFP is produced using a zeolite catalyst.

19. The composition of any of Paragraphs 1 to 18, wherein said at least one low molecular weight polyolefin is selected from Group III hydrocarbon oil basestocks, GTL-derived basestocks, polyisobutenes, wax isomerate lubricant oil basestocks, ethylene/butene copolymers, and mixtures thereof.

20. The composition of any of Paragraphs 1 to 19, wherein said composition does not contain calcium carbonate.

21. The composition of any of Paragraphs 1 to 20, wherein said composition does not contain vulcanizing agents, phthalate plasticizers, and UV and gamma radiation stabilizers.

22. The composition of any of Paragraphs 1 to 21, further comprising one or more parameters selected from the following:
    (a) decrease in 100% Modulus of less than 15%
    (b) decrease in Tensile Strength of less than 55%
    (c) decrease in Elongation at Break of less than 25%; and
    (d) decrease in Toughness of less than 60%,
    wherein the parameters are measured after aging at 125° C. in air for 5 days, and the decrease is measured relative to the original sample prior to aging:

23. The composition of Paragraph 1, further comprising one or more parameters selected from the following:
    (a) decrease in 100% Modulus of less than 10%;
    (b) decrease in Tensile Strength of less than 45%;
    (c) decrease in Elongation at Break of less than 15%; and
    (d) decrease in Toughness of less than 45%,
    wherein the parameters are measured after aging at 125° C. in air for 5 days, and the decrease is measured relative to the original sample prior to aging:

24. The composition of Paragraph 22 or 23, characterized by at least two of said parameters.

25. The composition of Paragraph 22 or 23, characterized by at least three of said parameters.

26. The composition of Paragraph 22 or 23, characterized by all four of said parameters.

27. The composition of any of Paragraphs 1 to 26, wherein the at least one low molecular weight polyolefin has a number average molecular weight of greater than about 1,000 g/mol.

28. An article comprising the composition of any of Paragraphs 1 to 27.

29. A thermoformed article comprising the composition according to any of Paragraphs 1 to 27.

30. An article comprising an insulation material and a material insulated by said insulation material, wherein said insulation material comprises the composition according to any of paragraphs 1 to 27.

31. The article according to Paragraph 28, wherein said material insulated by said insulation material is selected from the group consisting of wire, cable, fiber, and combinations thereof.

32. A thermoforming process comprising thermoforming an article from a composition comprising an elastomeric material, the improvement comprising providing a composition according to any of Paragraphs 1 to 27.

33. The thermoforming process according to Paragraph 32, said thermoforming process selected from injection molding and extrusion.

34. The composition of any of paragraphs 1 to 27, wherein the at least one low molecular weight polyolefin is a PAO having a molecular weight of between about 400 and 1000 g/mole and the polypropylene is a homopolymer characterized by an MFR greater than 2 g/10 min.

35. The composition of any of paragraphs 1 to 27, wherein the at least one low molecular weight polyolefin is a PAO having a molecular weight of between about 400 and 1000 g/mole and the polypropylene is a homopolymer characterized by an MFR greater than 5 g/10 min.

36. The composition of any of paragraphs 1 to 27, wherein the at least one low molecular weight polyolefin is a PAO having a molecular weight of between about 400 and 1000 g/mole and the polypropylene is a homopolymer characterized by an MFR greater than 10 g/10 min.

37. The composition of any of paragraphs 1 to 27, wherein the at least one low molecular weight polyolefin is a PAO having a molecular weight of between about 400 and 1000 g/mole and the polypropylene is a homopolymer characterized by an MFR greater than 20 g/10 min.

38. The composition of any of paragraphs 1 to 27, wherein the at least one low molecular weight polyolefin is a PAO having a molecular weight of between about 400 and 1000 g/mole and the polypropylene is a homopolymer characterized by an MFR greater than 30 g/10 min.

EXAMPLES

The following examples are intended to illustrate the invention with particular detail. Numerous modifications and variations are possible, and it is to be understood that within the scope of the appended claims, the invention can be practiced otherwise than as specifically described herein. Ingredients in the tables below are given in wt % for the total weight of ingredients (i), (ii), and (iii) according to the invention (and calcium carbonate in Table 7), whereas the wt % of Irganox antioxidant is relative to the total base composition of (i), (ii), and (iii) (and calcium carbonate, where present).

Two Kraton® G polymers (SEBSs) and the other components used in this invention are described in Table A below.

TABLE A1

| Material | $M_n$/1000 | Wt % End-Block | Vol % End-Block | $T_g$, ° C. | $T_m$, ° C. | Pour Point, ° C. |
|---|---|---|---|---|---|---|
| Kraton G ® 1650 | 17-86-17 | 28 | 24.6 | −60 | 34 | — |
| Kraton G ® 1657 | 5.5-70-5.5 | 14 | 11.5 | −65 | 8 | — |
| SpectraSyn 10 | 0.72 | — | — | — | — | −54 |
| Sunpar 150 | 0.70 | — | — | — | — | −15 |
| EB Copolymer | 4.4 | — | — | — | — | — |

The $C_4$ content of the EB copolymer is about 47 wt %. A homopolypropylene, PP 3155 (no nucleating agent; only stabilizers; Melt Flow Rate (MFR)=35 (230° C./2.16 kg; ASTM D1238; available from ExxonMobil Chemical Company), was also used. The GPC molecular weights of this polypropylene are $M_n$=64,000, $M_w$=304,000 and $M_z$=1,145,000.

The characterization information of the SEBS polymers is summarized in the above table. The numerical pre-factors represent number average molecular weight (Mn) of the block in 1000 gm mol$^{-1}$. A Waters GPC using THF as carrier or permeation solvent equipped with UV and DRI detectors was used to determine $M_n$. The composition of the block copolymers (expressed as wt % end-block) was obtained by $^1$H NMR using a Varian XL 400 with deuterated chloroform as the solvent. Thermal characterization of the block copolymers was performed using a Perkin Elmer Pyris I DSC with sub-ambient capability at a heating rate of 10° C./min. These SEBS polymers were obtained from Shell Chemical Company and used as received. Molecular weights of the polypropylene and the EB copolymer was measured by a Waters 150C GPC (column set: 3 Polymer Labs PLgel Mixed-B LS or equivalent)-using 1,2,4-trichlorobenzene as the permeation solvent (polymer concentration~3-4 mg/ml).

The blends were mixed thoroughly and homogeneously in a Brabender mixer. First, the mixer was heated to 190° C. PP 3155 was added, followed by Irganox 2215. SEBS was then added and the temperature was raised to 240° C. The temperature was then lowered to 210° C. and SpectraSyn 10, Sunpar 150 or ethylene/butene copolymer (EBC) was added slowly until the fluid or EBC was all incorporated in the blend.

Blends recovered from the Brabender were compression-molded into sheets of thickness about 2 mm between Teflon-coated aluminum foil by using a heated hydraulic press at a temperature of 180° C., a molding time of 25 min, and a press force of 10,000 lb. Micro-dumbbell specimens (the base is ~1 cm×1 cm and the center, narrow strip is ~0.6 cm×0.2 cm) were cut from these sheets and stress-strain measurements under tension were performed in an Instron tester. Measurements using triplicate samples (conditioned under ambient conditions for 24 hr prior to tests) were performed at room temperature and at a separation speed of 2"/min=850 μm/s. The stress was calculated based on the undeformed cross-sectional area of the test specimen. Strain measurements were based on clamp separation. The tensile toughness was measured as the total area under the stress-strain curve.

DMTA (Dynamic Mechanical Thermal Analysis) probes the small-strain mechanical response (relaxation behavior) of samples in the solid-state as a function of temperature over a temperature range that included the viscoelastic region prior to melting. The output is the storage modulus E' and loss modulus E". The storage modulus measures the elastic response or the ability of the material to store energy, and the loss modulus measures the viscous response or the ability of the material to dissipate energy. The ratio of E"/E' (loss tangent) gives a measure of the damping ability of the material. Energy dissipation mechanisms (i.e., relaxation modes) show up as peaks in loss tangent and are associated with a drop in E' as a function of temperature. The uncertainty associated with reported values of E' is expected to be on the order of ±10% due to experimental variability. DMTA was used to measure the glass transition temperatures, Tg1's and Tg2's, of the TPE compositions, assigned based on the loss tangent maximum. The instrument used was the Rheometrics Solid Analyzer RSA II in tension mode (0.5% strain, 1 Hz frequency, 2° C./min heating rate, and a temperature range of ca. −100 to 150° C.). Molded samples had dimensions of about 23 mm×6.42 mm×0.7 mm and were conditioned under ambient conditions for 24 hr before the DMTA runs.

A portable hardness Type A durometer (Shore® Instrument & Mfg. Co., Inc., Freeport, N.Y.) was used to measure hardness. The instantaneous value was reported. The high-temperature softening behavior was tested using a CEAST HDT 300 VICAT. A needle of 1-mm2 area was applied with a force of 200 g to the specimen surface submerged in the heat transfer fluid, Dow 220, while the temperature was raised at a heating rate of 120° C./hr. The temperature at which the needle penetrated 1-mm into the sample was reported as the Vicat softening point.

The crystallization temperature Tc and melting temperature Tm of all polymeric materials except the Kraton G polymer and EBC were measured using an TA Instruments MDSC 2920. Typically, 6-10 mg of polymeric material was sealed in an aluminum pan and loaded into the instrument at room temperature. All runs were carried out in a nitrogen environment. Melting data (first heat) were acquired by heating the sample to at least 30° C. above its melting temperature at a heating rate of 10° C./min. This provides information on the melting behavior under as-blended conditions, which can be influenced by thermal history. The sample was then held for 10 min at this temperature to destroy its thermal history. Crystallization data was acquired by cooling the sample from the melt to at least 50° C. below the crystallization temperature at a cooling rate of 10° C./min. The sample was then held at 25° C. for 10 min and finally heated at 10° C./min to acquire additional melting data (second heat). This provides information about the melting behavior after a controlled thermal history. The endothermic melting transition (first and second heat) and exothermic crystallization transition were analyzed for the occurrence of peak temperature. The Tm's reported are the peak melting temperatures from the second heat.

Thermal characterization of the block copolymers was performed using a Perkin-Elmer Pyris I DSC with sub-ambient capability at a heating rate of 10° C./min. Temperature was varied between −100 to 200° C. A thermal scan of the EBC was performed using a modulated DSC (DSC 2910, TA Instruments). The encapsulated sample was first heated at 10° C./min to 200° C. and was held at this temperature for 2 min.

It was then cooled at 10° C./min to −100° C. and was held at this temperature for 5 min. The thermogram was recorded at a heating rate of 10° C./min (modulated at ±0.5° C./min) up to the final temperature of 200° C.

The permanence of the fluid in the polymer was studied by TGA.10 A Perkin-Elmer TGA 7 was used to measure the weight loss from a sample purged by nitrogen with a flow rate of 20 ml/min. Test specimens of 10-mil thickness and 5-mg weight were prepared by compression molding between Teflon-coated aluminum foil by using a heated hydraulic press at a temperature of 180° C., a molding time of 25 min, and a press force of 10,000 lb. In the TGA, temperature was ramped from ambient to 150° C. at 150° C./min then held at 150° C. for 2 hr. The weight loss over this time period was recorded.

Various samples in accordance with one or more embodiments described were prepared. The samples were prepared according to the formulations shown in the following Tables.

Referring to Table 1, by adding SpectraSyn 10 to Kraton G 1650, the hydrogenated block copolymer (Sample-1) was transformed into a soft composition, Sample-2, with lower values of hardness, 100% modulus, tensile strength, toughness and Vicat. Only the elongation at break was enhanced. However, the replacement of some SEBS in Sample-2 by polypropylene PP 3155 produced a composition, Sample-3, with medium levels of performance in contrast to Sample-1 and Sample-2. Table 2 shows the data when the Sunpar oil was used in Kraton® G 1650, (Samples-4 and 5). Table 3 shows the data when the SEBS is Kraton® G 1657 and the NFP is SpectraSyn 10.

TABLE 1

| Formulation | Sample-1 | Sample-2 | Sample-3 |
|---|---|---|---|
| Kraton ® G 1650 | 100 | 80 | 64 |
| PP 3155 | — | — | 16 |
| SpectraSyn 10 | — | 20 | 20 |
| Irganox 2215 | — | 0.08 | 0.08 |
| Hardness | 81A | 55A | 64A |
| 100% Modulus MPa | 2.82 | 1.19 | 2.13 |
| Tensile Strength, MPa | 19.3 | 7.32 | 13.1 |
| Elongation at Break, % | 630 | 920 | 730 |
| Toughness, MPa | 64 | 47 | 60 |
| Vicat, 200 g, ° C. | 112 | 79 | 93 |

TABLE 2

| Formulation | Sample-4 | Sample-5 |
|---|---|---|
| Kraton G ® 1650 | 80 | 64 |
| PP 3155 | — | 16 |
| Sunpar 150 | 20 | 20 |
| Irganox 2215 | 0.08 | 0.08 |
| Hardness | 53A | 63A |
| 100% Modulus MPa | 1.72 | 2.30 |
| Tensile Strength, MPa | 6.83 | 19.2 |
| Elongation at Break, % | 760 | 840 |
| Toughness, MPa | 38 | 91 |
| Vicat, 200 g, ° C. | 80 | 91 |

From each of the molded pads of the formulations in Tables 1-3, three dumbbells were cut and aged in an oven at 125° C. for 5 days in air. All the dumbbells for Sample-6, Sample-2, Sample-7, Sample-8 and Sample-4 were either melted or severely distorted in the oven. Only those of Sample-1, Sample-3 and Sample-5 remained intact. Stress-strain measurements of these aged dumbbells were performed. The results are shown in Table 4. How much these stress-strain properties lost after aging were calculated by:

$$\Delta(\text{Stress-Strain Property}) = \{[(\text{Stress-Strain Property})_{Aged} - (\text{Stress-Strain Property})_{Unaged}]$$

$$(\text{Stress-Strain Property})_{Unaged}\} \times 100\% \quad (1)$$

Except the minor deficiency in 100% modulus, Sample-3 (based on SpectraSyn 10) retained a larger portion of its stress-strain performance than Sample-5 (based on Sunpar 150). Sample-3 ($T_g$=−53° C.) had better low temperature mechanical properties than Sample-5 ($T_g$=−48° C.), where $T_g$ was the glass transition temperature of the polymeric composition. This particular transition temperature of the polymeric composition was measured by DMTA (Dynamic Mechanical Thermal Analysis). It was determined from the location of the loss tangent maximum. The instrument used was the Rheometrics Solid Analyzer RSA II in the tension mode (0.1% strain, 1 Hz frequency, and 2° C./min heating rate). The sample had a dimension of about 23 mm×6.42 mm×0.7 mm after loading. After molding, the samples were conditioned under ambient conditions for 24 hr before the DMTA runs. The $T_g$ of Sample-1 (the neat Kraton® G 1650) is −45° C. Sample-2 ($T_g$=−52° C.) also had better low temperature mechanical properties than Sample-4 ($T_g$=−48° C.).

TABLE 3

| Formulation | Sample-6 | Sample-7 | Sample-8 |
|---|---|---|---|
| Kraton ® G 1657 | 100 | 80 | 64 |
| PP 3155 | — | — | 16 |
| SpectraSyn 10 | — | 20 | 20 |
| Irganox 2215 | — | 0.08 | 0.08 |
| Hardness | 53A | 40A | 48A |
| 100% Modulus MPa | 1.20 | 0.57 | 0.82 |
| Tensile Strength, MPa | 8.50 | 3.64 | 2.15 |
| Elongation at Break, % | 870 | 1000 | 780 |
| Toughness, MPa | 39 | 22 | 18 |
| Vicat, 200 g, ° C. | 69 | 49 | 53 |

TABLE 4

| Aged 125° C. for 5 days | | | |
|---|---|---|---|
| Formulation | Sample-1 | Sample-3 | Sample-5 |
| Kraton ® G 1650 | 100 | 64 | 64 |
| PP 3155 | — | 16 | 16 |
| SpectraSyn 10 | — | 20 | — |
| Sunpar 150 | — | — | 20 |
| Irganox 2215 | — | 0.08 | 0.08 |
| 100% Modulus MPa | 2.38 | 1.97 | 2.14 |
| Tensile Strength, MPa | 5.72 | 7.98 | 8.19 |
| Elongation at Break, % | 380 | 650 | 580 |
| Toughness, MPa | 19 | 37 | 35 |
| Δ(100% Modulus), % | −16 | −7.5 | −7.0 |
| Δ(Tensile Strength), % | −70 | −39 | −57 |
| Δ(Elongation at Break), % | −40 | −11 | −31 |
| Δ(Toughness), % | −70 | −38 | −62 |

Table 5 shows the data when an ethylene/butene (EB) copolymer was used in a composition with Kraton® G 1650. Table 6 shows the data when the SEBS is Kraton® G 1657 and the fluid was the EB copolymer.

TABLE 5

| Formulation | Sample-1 | Sample-9 | Sample-10 |
|---|---|---|---|
| Kraton ® G 1650 | 100 | 80 | 64 |
| PP 3155 | — | — | 16 |

TABLE 5-continued

| Formulation | Sample-1 | Sample-9 | Sample-10 |
|---|---|---|---|
| EB Copolymer (EBC) | — | 20 | 20 |
| Irganox 2215 | — | 0.08 | 0.08 |
| Hardness | 81A | 61A | 71A |
| 100% Modulus MPa | 2.82 | 1.69 | 2.65 |
| Tensile Strength, MPa | 19.3 | 13.5 | 13.7 |
| Elongation at Break, % | 630 | 1100 | 810 |
| Toughness, MPa | 64 | 87 | 74 |
| Vicat, 200 g, °C. | 112 | 86 | 97 |

TABLE 6

| Formulation | Sample-6 | Sample-11 | Sample-12 |
|---|---|---|---|
| Kraton ® G 1657 | 100 | 80 | 64 |
| PP 3155 | — | — | 16 |
| EB Copolymer (EBC) | — | 20 | 20 |
| Irganox 2215 | — | 0.08 | 0.08 |
| Hardness | 53A | 50A | 55A |
| 100% Modulus MPa | 1.20 | 0.64 | 0.80 |
| Tensile Strength, MPa | 8.50 | 7.28 | 4.73 |
| Elongation at Break, % | 870 | 1200 | 1100 |
| Toughness, MPa | 39 | 43 | 36 |
| Vicat, 200 g, °C. | 69 | 55 | 56 |

Except for the stress-strain properties of Sample-5, both the stress-strain properties and Vicat's of the EBC-containing formulations (Kraton® G 1650 or 1657) in Tables 5-6 outperformed those of the SpectraSyn 10- or Sunpar 150-containing formulations (Kraton® G 1650 or 1657) in Tables 1-3.

Table 7 shows some formulations filled with Omyacarb 2 (a calcium carbonate filler from Omya California Inc., Lucerne Valley, Calif.). The SEBS polymer (Kraton® G 1651) had a 33 wt % styrene end-block. PP 4152F2 was polypropylene homopolymer having an MFR=2 g/10 min (230° C./2.16 kg; ISO 1133) available from ExxonMobil Chemical Company. For the molded pad of each formulation in Table 7, three dumbbells were cut and aged in an oven at 125° C. for 5 days. Stress-strain measurements of these aged dumbbells were carried out. The results are shown in Table 8. How much these stress-strain properties lost after aging was calculated by the Δ(Stress-Strain Property) equation given above. After aging, most or all of the stress-strain properties have been lost as reported in Table 8.

TABLE 7

| Formulation | Sample-13 | Sample-14 |
|---|---|---|
| Kraton ® G 1651 | 30 | 32 |
| PP 4152F2 | 20 | 14 |
| SpectraSyn 10 | 35 | 38 |
| Omyacarb 2, OMYA (CaCO$_3$) | 15 | 16 |
| Irganox 2215 | 0.05 | 0.05 |
| Hardness | 88A | 90A |
| 100% Modulus, MPa | 7.70 | 5.08 |
| Tensile Strength, MPa | 8.64 | 11.1 |
| Elongation at Break, % | 300 | 380 |
| Toughness, MPa | 38 | 37 |
| Vicat, 200 g, °C. | 157 | 161 |

TABLE 8

| Aged 125° C. for 5 days | | |
|---|---|---|
| Formulation | Sample-13 | Sample-14 |
| 100% Modulus, MPa | 0 | 0 |
| Tensile Strength, MPa | 0.32 | 0 |

TABLE 8-continued

| Aged 125° C. for 5 days | | |
|---|---|---|
| Formulation | Sample-13 | Sample-14 |
| Elongation at Break, % | 90 | 0 |
| Toughness, MPa | 0.42 | 0 |
| Δ(100% Modulus), % | −100 | −100 |
| Δ(Tensile Strength), % | −96 | −100 |
| Δ(Elongation at Break), % | −70 | −100 |
| Δ(Toughness), % | −99 | −100 |

Test specimens for mechanical property testing were injection-molded following ASTM D618 as closely as possible, and tested at room temperature (23±2° C.).

Tensile properties were determined according to ASTM D638, including Young's modulus, yield stress and yield strain, break stress (also called tensile strength) and break strain, and the stress at given strain values (also called, for example, the 10%, 50%, or 100% modulus for the strain at 10, 50, and 100% strain, respectively). Injection-molded tensile bars were of ASTM D638 Type IV geometry, tested at a speed of 2 inch/min. Break properties were reported only if a majority of test specimens broke before a strain of about 2000%, which is the maximum strain possible on the load frame used for testing. 1% secant modulus (also called flexural modulus herein) was determined according to ASTM D790A, using injection molded flexural bars on a 2-inch support span.

Heat deflection temperature was determined according to ASTM D 648, at 66 psi, on injection-molded specimens. VICAT softening temperature was determined according to ASTM D 1525, using a 200 g load.

Notched Izod impact strength was determined according to ASTM D256, at the specified temperature. A TMI Izod Impact Tester was used. Pairs of specimens were cut from injection-molded ASTM D790 flexural bars; the rectangular bar had a width of about 1.3 cm and a thickness of about 0.3 cm. The notch was oriented such that the impact occurred on the notched side of the specimen (following Procedure A of ASTM D256) in most cases; where specified, the notch orientation was reversed (following Procedure E of ASTM D256) and referred to as "Reverse Notched Izod" (RNI) or "Un-notched Izod" (UNI) impact. All specimens were assigned a thickness of 0.122 inch for calculation of the impact resistance. All breaks were complete, unless specified otherwise.

All patents and patent applications, test procedures (such as ASTM methods, ISO methods, and the like), and other documents cited herein are fully incorporated by reference to the extent such disclosure is not inconsistent with this invention and for all jurisdictions in which such incorporation is permitted. When numerical lower limits and numerical upper limits are listed herein, ranges from any lower limit to any upper limit are contemplated. Parameters given in the claims are measured according to the methods set forth herein for the relevant parameter or in the absence of a stated method can be determined by one of ordinary skill in the art using known method.

Trade names used herein are indicated by a ™ symbol or ® symbol, indicating that the names can be protected by certain trademark rights, e.g., they can be registered trademarks in various jurisdictions.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A thermoplastic elastomer composition comprising:
   (i) at least one low molecular weight polyalphaolefin comprising oligomers of $C_5$ to $C_{18}$ olefins, wherein the polyalphaolefin has a number average molecular weight, Mn, of 300 to 15,000 g/mol, a kinematic viscosity of 10 cSt or more at 100° C., a pour point of −20° C. or less according to ASTM D97, a flash point of 200° C. or more according to ASTM D56, a specific gravity of 0.855 or less, and a viscosity index of 130 or more;
   (ii) 10.0 to 30.0 wt % of a block copolymer obtainable by selectively hydrogenating a block copolymer having terminal polymeric blocks of a vinyl aromatic monomer and a mid-block prepared originally with an olefin and subsequently hydrogenated; and
   (iii) 5.0 to 50.0 wt % of polypropylene having a weight average molecular weight, Mw, of 30,000 to 2,000,000 g/mol;
   wherein the wt % are based on the total weight of the composition; and
   (iv) with the proviso that when (i) is a PAO having a number average molecular weight, Mn, of between about 400 and 1000 g/mole:
      (a) (iii) is a homopolymer characterized by an MFR greater than 2 g/10 min under 2.16 kg load, or
      (b) (iii) is a copolymer; or
      (c) (iii) is a polymer or copolymer made by a metallocene catalyst; or
      (d) the composition does not contain calcium carbonate; and
   (v) wherein the composition after aging at 125° C. in air for 5 days has all of the following parameters:
      (a) decrease in 100% Tensile Modulus of less than 15%;
      (b) decrease in Tensile Strength of less than 55%;
      (c) decrease in Elongation at Break of less than 25%; and
      (d) decrease in Toughness of less than 60%,
   and the decrease is measured relative to the original sample prior to aging.

2. The composition of claim 1, wherein (ii) is further characterized by at least one of (a) end-blocks having Mn greater than about 10,000; and (b) mid-blocks having Mn greater than about 75,000.

3. The composition of claim 1, wherein (ii) is further characterized by a vinyl aromatic monomer content of greater than 15 wt %, based on the weight of the block copolymer.

4. The composition of claim 1, wherein (ii) comprises at least one SEBS, said SEBS characterized by at least one of the following: (a) end-blocks having Mn greater than about 10,000 and mid-blocks having Mn greater than about 75,000; and (b) a styrenic content of greater than 15 wt %, based on the weight of the block copolymer.

5. The composition of claim 1, wherein the at least one low molecular weight polyalphaolefin has an Mn of from greater than about 600 g/mol and less than about 3,000 g/mol.

6. The composition of claim 1, wherein the at least one low molecular weight polyalphaolefin is a liquid at 25° C.

7. The composition of claim 1, wherein (ii) is selected from selectively hydrogenated SIS, SBS, star-branched SIS, and star-branched SBS.

8. The composition of claim 1, wherein the polypropylene is selected from atactic polypropylene, isotactic polypropylene, syndiotactic polypropylene, and mixtures thereof.

9. The composition of claim 1, wherein said polypropylene is selected from polypropylene produced using a Zeigler Natta catalyst, a polypropylene produced using a metallocene catalyst, or mixtures thereof.

10. The composition of claim 1, wherein said at least one low molecular weight polyalphaolefin is a non-functional plasticizer (NFP) characterized as a liquid with no distinct melting point above 0° C. and a kinematic viscosity at 25° C. of 30,000 cSt or less, and further characterized by at least one parameter selected from the following: (a) kinematic viscosity at 100° C. ($KV_{100}$)<400 cSt; (b) Flash Point>200° C.; (c) Pour Point<−25° C.; (d) Specific Gravity of 0.85 or less; a distillation range having a difference between the upper temperature and the lower temperature of 40° C. or less; and (e) a final boiling point of from 115° C. to 500° C.

11. The composition according to claim 10, wherein said NFP is characterized by at least two of said parameters.

12. The composition according to claim 10, wherein said NFP is characterized by at least three of said parameters.

13. The composition according to claim 10, wherein said NFP is characterized by at least four of said parameters.

14. The composition according to claim 10, wherein said NFP is characterized by all of said parameters.

15. The composition according to claim 10, wherein said NFP is produced using a metallocene catalyst.

16. The composition according to claim 10, wherein said NFP is produced using a reduced metal oxide catalyst.

17. The composition according to claim 10, wherein said NFP is produced using a zeolite catalyst.

18. The composition of claim 1, wherein said composition does not contain calcium carbonate.

19. The composition of claim 1, wherein said composition does not contain vulcanizing agents, phthalate plasticizers, and UV and gamma radiation stabilizers.

20. The composition of claim 1, wherein:
   (a) the decrease in 100% Tensile Modulus is less than 10%;
   (b) the decrease in Tensile Strength is less than 45%;
   (c) the decrease in Elongation at Break is less than 15%; and
   (d) the decrease in Toughness is less than 45%.

21. The composition of claim 1, characterized by at least two of said parameters.

22. The composition of claim 1, characterized by at least three of said parameters.

23. The composition of claim 1, characterized by all four of said parameters.

24. The composition of claim 1, wherein the at least one low molecular weight polyalphaolefin has an Mn of greater than about 1,000 g/mol.

25. An article comprising the composition of claim 1.

26. A thermoformed article comprising the composition according to claim 1.

27. An article comprising an insulation material and a material insulated by said insulation material, wherein said insulation material comprises the composition according to claim 1.

28. The article according to claim 27, wherein said material insulated by said insulation material is selected from the group consisting of wire, cable, fiber, and combinations thereof.

29. A thermoforming process comprising thermoforming an article from a composition comprising an elastomeric material, the improvement comprising providing a composition according to claim 1.

30. The thermoforming process according to claim 29, said thermoforming process selected from injection molding and extrusion.

31. The composition of claim 1, wherein the at least one low molecular weight polyalphaolefin has an Mn of between about 400 and 1000 g/mole and the polypropylene is a homopolymer characterized by an MFR greater than 2 g/10 min.

32. The composition of claim 1, wherein the at least one low molecular weight polyalphaolefin has an Mn of between about 400 and 1000 g/mole and the polypropylene is a homopolymer characterized by an MFR greater than 5 g/10 min.

33. The composition of claim 1, wherein the at least one low molecular weight polyalphaolefin has an Mn of between about 400 and 1000 g/mole and the polypropylene is a homopolymer characterized by an MFR greater than 10 g/10 min.

34. The composition of claim 1, wherein the at least one low molecular weight polyalphaolefin has an Mn of between about 400 and 1000 g/mole and the polypropylene is a homopolymer characterized by an MFR greater than 20 g/10 min.

35. The composition of claim 1, wherein the at least one low molecular weight polyalphaolefin has an Mn of between about 400 and 1000 g/mole and the polypropylene is a homopolymer characterized by an MFR greater than 30 g/10 min.

36. The composition of claim 1, wherein the polypropylene is present in an amount of at least 14 wt % based on the weight of the overall composition.

37. A thermoplastic elastomer composition comprising:
(i) at least one low molecular weight polyalphaolefin comprising oligomers of $C_5$ to $C_{18}$ olefins, wherein the polyalphaolefin has a number average molecular weight, Mn, of 300 to 15,000 g/mol, a kinematic viscosity of 10 cSt or more at 100° C., a pour point of −20° C. or less according to ASTM D97, a flash point of 200° C. or more according to ASTM D56, a specific gravity of 0.855 or less, and a viscosity index of 130 or more;
(ii) 50.0 to 70.0 wt % of a block copolymer obtainable by selectively hydrogenating a block copolymer having terminal polymeric blocks of a vinyl aromatic monomer and a mid-block prepared originally with an olefin and subsequently hydrogenated; and
(iii) 5.0 to 50.0 wt % of polypropylene having a weight average molecular weight, Mw, of 30,000 to 2,000,000 g/mol;
wherein the wt % are based on the total weight of the composition; and
(iv) with the proviso that when (i) is a PAO having a number average molecular weight, Mn, of between about 400 and 1000 g/mole:
  (a) (iii) is a homopolymer characterized by an MFR greater than 2 g/10 min under 2.16 kg load, or
  (b) (iii) is a copolymer; or
  (c) (iii) is a polymer or copolymer made by a metallocene catalyst; or
  (d) the composition does not contain calcium carbonate; and
(v) wherein the composition after aging at 125° C. in air for 5 days has all of the following parameters:
  (a) decrease in 100% Tensile Modulus of less than 15%;
  (b) decrease in Tensile Strength of less than 55%;
  (c) decrease in Elongation at Break of less than 25%; and
  (d) decrease in Toughness of less than 60%,
and the decrease is measured relative to the original sample prior to aging.

* * * * *